US011424653B2

(12) United States Patent
Chang

(10) Patent No.: US 11,424,653 B2
(45) Date of Patent: Aug. 23, 2022

(54) DC MOTOR-DYNAMO FOR BIDIRECTIONAL ENERGY CONVERSION BETWEEN MECHANICAL AND ELECTRICAL ENERGY

(71) Applicant: Chun-Jong Chang, Zhubei (TW)

(72) Inventor: Chun-Jong Chang, Zhubei (TW)

( * ) Notice: Subject to any disclaimer, the term of this patent is extended or adjusted under 35 U.S.C. 154(b) by 395 days.

(21) Appl. No.: 16/706,847

(22) Filed: Dec. 9, 2019

(65) Prior Publication Data

US 2020/0195074 A1 Jun. 18, 2020

(30) Foreign Application Priority Data

Dec. 13, 2018 (TW) ................................ 107144965
Dec. 13, 2018 (TW) ................................ 107216927

(51) Int. Cl.
| | | |
|---|---|---|
| H02K 3/04 | (2006.01) | |
| H02K 1/12 | (2006.01) | |
| H02K 1/22 | (2006.01) | |
| H02J 7/00 | (2006.01) | |
| H02K 21/24 | (2006.01) | |
| H02K 1/18 | (2006.01) | |
| H02K 3/47 | (2006.01) | |
| H02K 3/46 | (2006.01) | |
| H02K 21/02 | (2006.01) | |

(52) U.S. Cl.
CPC ................ *H02K 3/04* (2013.01); *H02K 1/12* (2013.01); *H02K 1/22* (2013.01); *H02J 7/0068* (2013.01); *H02K 1/18* (2013.01); *H02K 1/182* (2013.01); *H02K 3/46* (2013.01); *H02K 3/47* (2013.01); *H02K 21/026* (2013.01); *H02K 21/24* (2013.01)

(58) Field of Classification Search
CPC ............ H02K 1/12; H02K 1/18; H02K 1/182; H02K 1/22; H02K 21/026; H02K 21/24; H02K 3/04; H02K 3/46; H02K 3/47
USPC ......... 310/49.02, 49.05, 49.07, 49.22, 49.42, 310/68 R, 71, 156.82
See application file for complete search history.

(56) References Cited

U.S. PATENT DOCUMENTS

| | | | | |
|---|---|---|---|---|
| 2,339,228 A | * | 1/1944 | Weydell ................. | H02K 23/52 310/127 |
| 2,769,106 A | * | 10/1956 | Dembowski ........... | H02K 19/20 310/168 |
| 3,344,338 A | * | 9/1967 | Sparrow ................ | H02K 19/38 310/179 |
| 4,644,206 A | * | 2/1987 | Smith .................... | H02K 51/00 310/102 R |
| 5,404,063 A | * | 4/1995 | Mills ..................... | H02K 23/40 310/216.074 |
| 5,864,198 A | * | 1/1999 | Pinkerton .............. | H02K 19/38 310/179 |

(Continued)

*Primary Examiner* — Rashad H Johnson

(57) ABSTRACT

This present utility model provides a novel DC dynamo which is characterized by making the magnetic lines of flux pass through an air gap between the rotator and the stator in the same direction, thus the most of armature coils can always receive the electromotive force of the same polarity in the same direction. Therefore, bidirectional energy conversion between the mechanical energy and the electrical energy of the armature coils in series can still proceed in the absence of commutators and induced the armature to generate sufficient electromotive force to conveniently regulate suitable terminal voltages and the ratios of the rotating speed and the moving speed thereof.

30 Claims, 60 Drawing Sheets

(56) References Cited

U.S. PATENT DOCUMENTS

| | | | | |
|---|---|---|---|---|
| 5,892,311 | A * | 4/1999 | Hayasaka | H02K 1/278 |
| | | | | 310/158 |
| 5,926,083 | A * | 7/1999 | Asaoka | H01F 3/10 |
| | | | | 336/178 |
| 5,977,684 | A * | 11/1999 | Lin | H02K 31/00 |
| | | | | 310/216.106 |
| 6,121,705 | A * | 9/2000 | Hoong | H02K 16/02 |
| | | | | 310/113 |
| 2002/0096957 | A1 * | 7/2002 | Wei | H02K 23/12 |
| | | | | 310/180 |
| 2002/0116961 | A1 * | 8/2002 | Kim | D06F 37/40 |
| | | | | 68/23.7 |
| 2002/0117926 | A1 * | 8/2002 | Joong | B61F 3/16 |
| | | | | 310/191 |
| 2006/0279164 | A1 * | 12/2006 | Blum | H02K 55/06 |
| | | | | 310/52 |
| 2008/0136294 | A1 * | 6/2008 | Powers | H02K 21/029 |
| | | | | 322/29 |
| 2009/0045691 | A1 * | 2/2009 | Ichiyama | H02K 21/14 |
| | | | | 322/29 |
| 2009/0054202 | A1 * | 2/2009 | Yamakado | B60K 6/52 |
| | | | | 477/6 |
| 2010/0164422 | A1 * | 7/2010 | Shu | H02K 21/029 |
| | | | | 318/540 |
| 2010/0252341 | A1 * | 10/2010 | Shu | B60L 7/14 |
| | | | | 180/65.21 |
| 2014/0265988 | A1 * | 9/2014 | Lee | H02K 47/00 |
| | | | | 318/495 |
| 2018/0337581 | A1 * | 11/2018 | Linares | H02K 5/146 |
| 2020/0127546 | A1 * | 4/2020 | Chang | H02K 99/00 |
| 2020/0195074 | A1 * | 6/2020 | Chang | H02K 21/227 |
| 2021/0152105 | A1 * | 5/2021 | Froelich | B60K 1/02 |
| 2021/0265885 | A1 * | 8/2021 | Takahashi | H02K 21/22 |
| 2021/0273511 | A1 * | 9/2021 | Takahashi | H02K 1/02 |
| 2021/0288531 | A1 * | 9/2021 | Takahashi | H02K 21/22 |
| 2021/0328488 | A1 * | 10/2021 | Takahashi | H02K 1/2786 |
| 2021/0367465 | A1 * | 11/2021 | Takahashi | H02K 1/2786 |
| 2021/0384802 | A1 * | 12/2021 | Tamura | H02K 21/14 |
| 2021/0384808 | A1 * | 12/2021 | Tamura | H02K 3/04 |
| 2021/0408881 | A1 * | 12/2021 | Shin | H02K 1/143 |
| 2022/0006340 | A1 * | 1/2022 | Hunstable | H02P 6/10 |

* cited by examiner

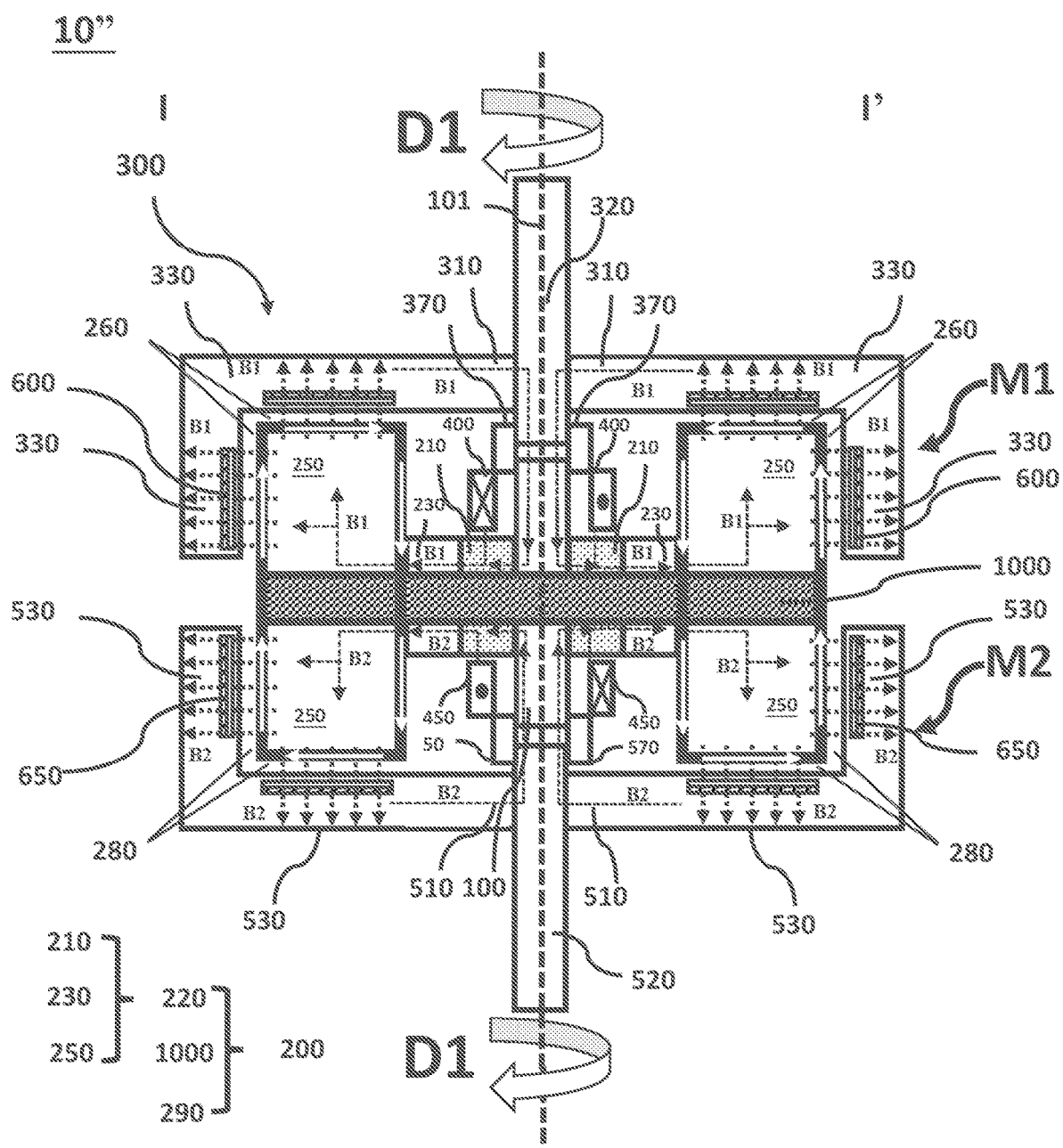
FIG. 1C″

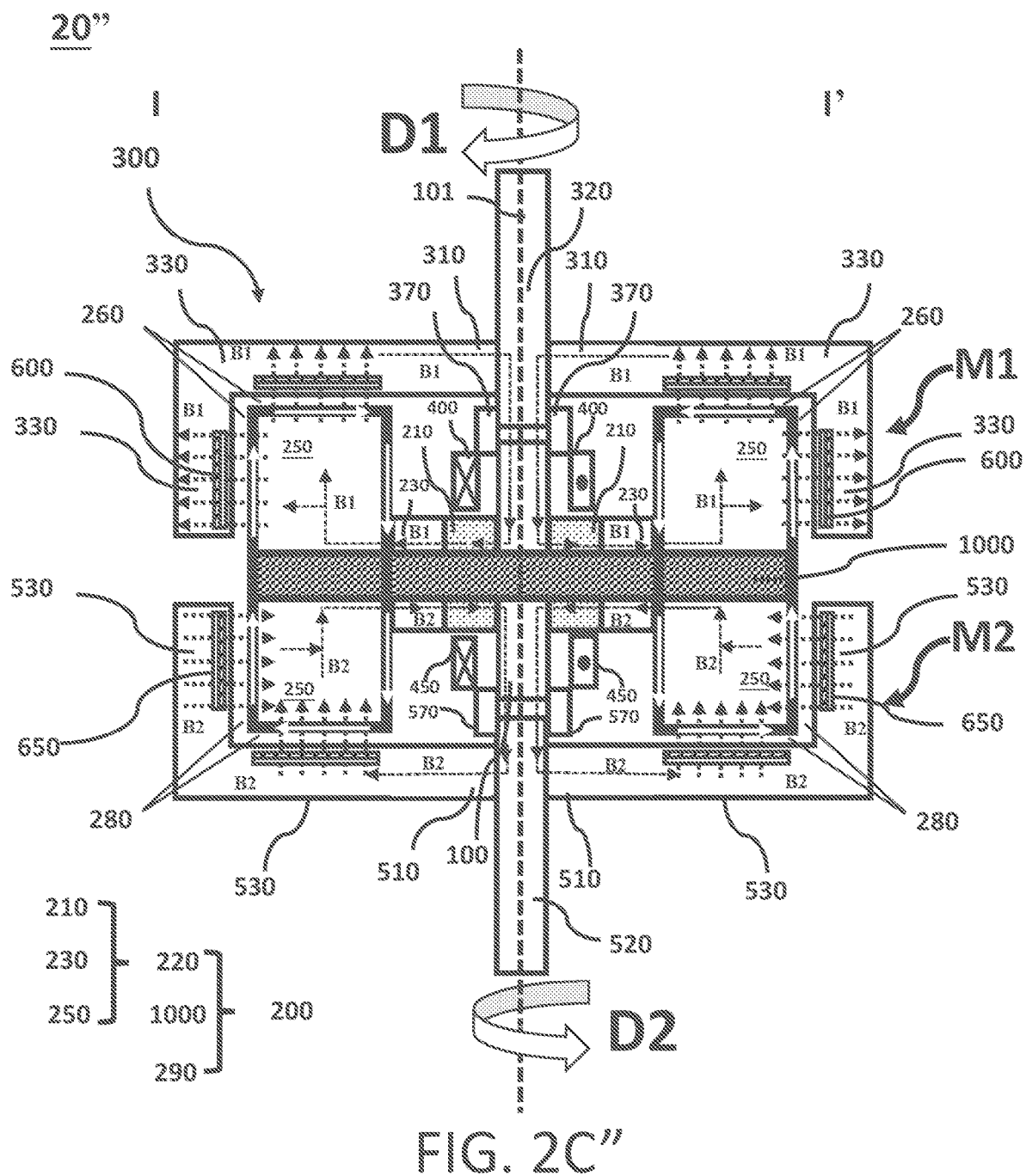
FIG. 2C"

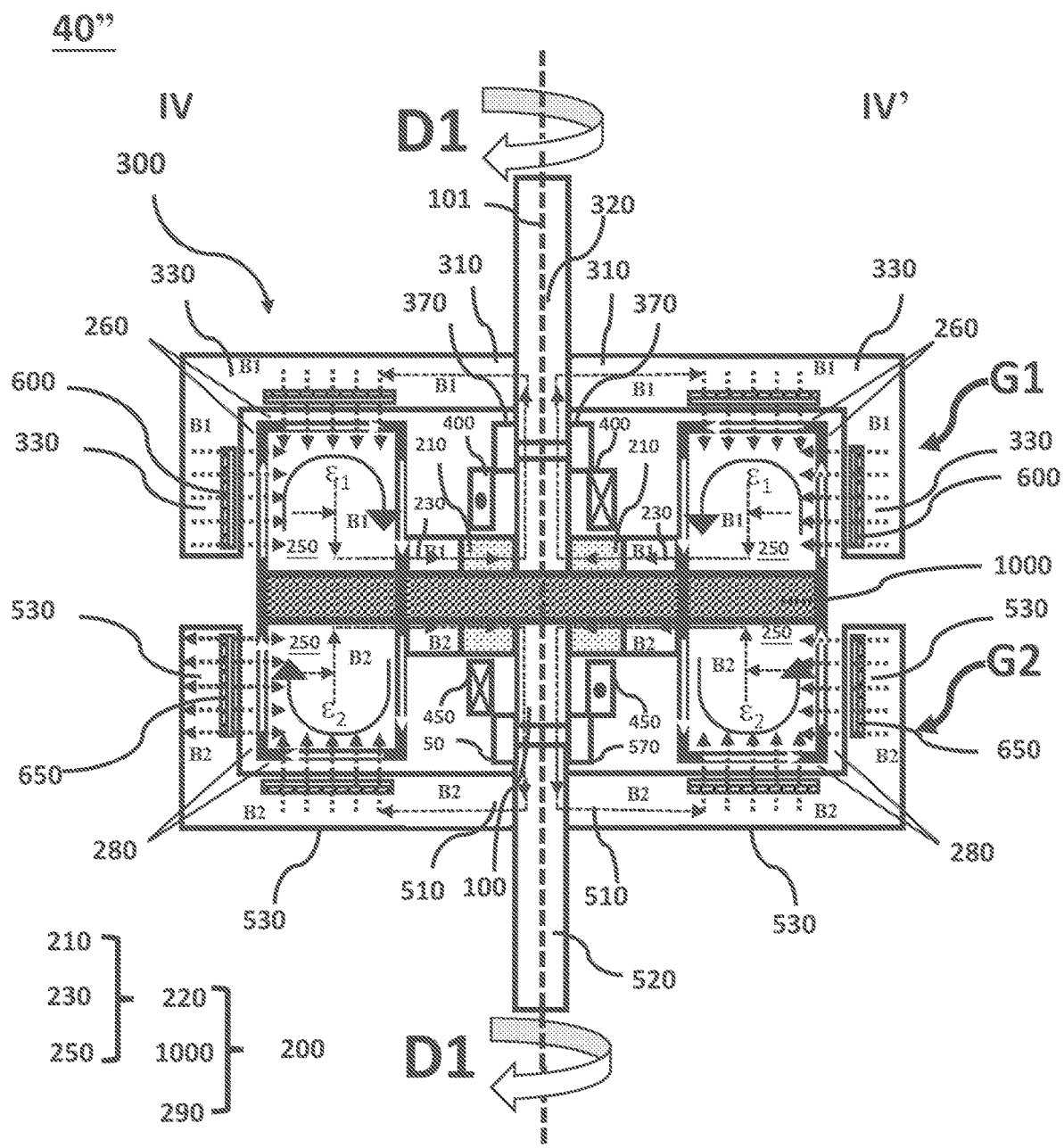
FIG. 4C″

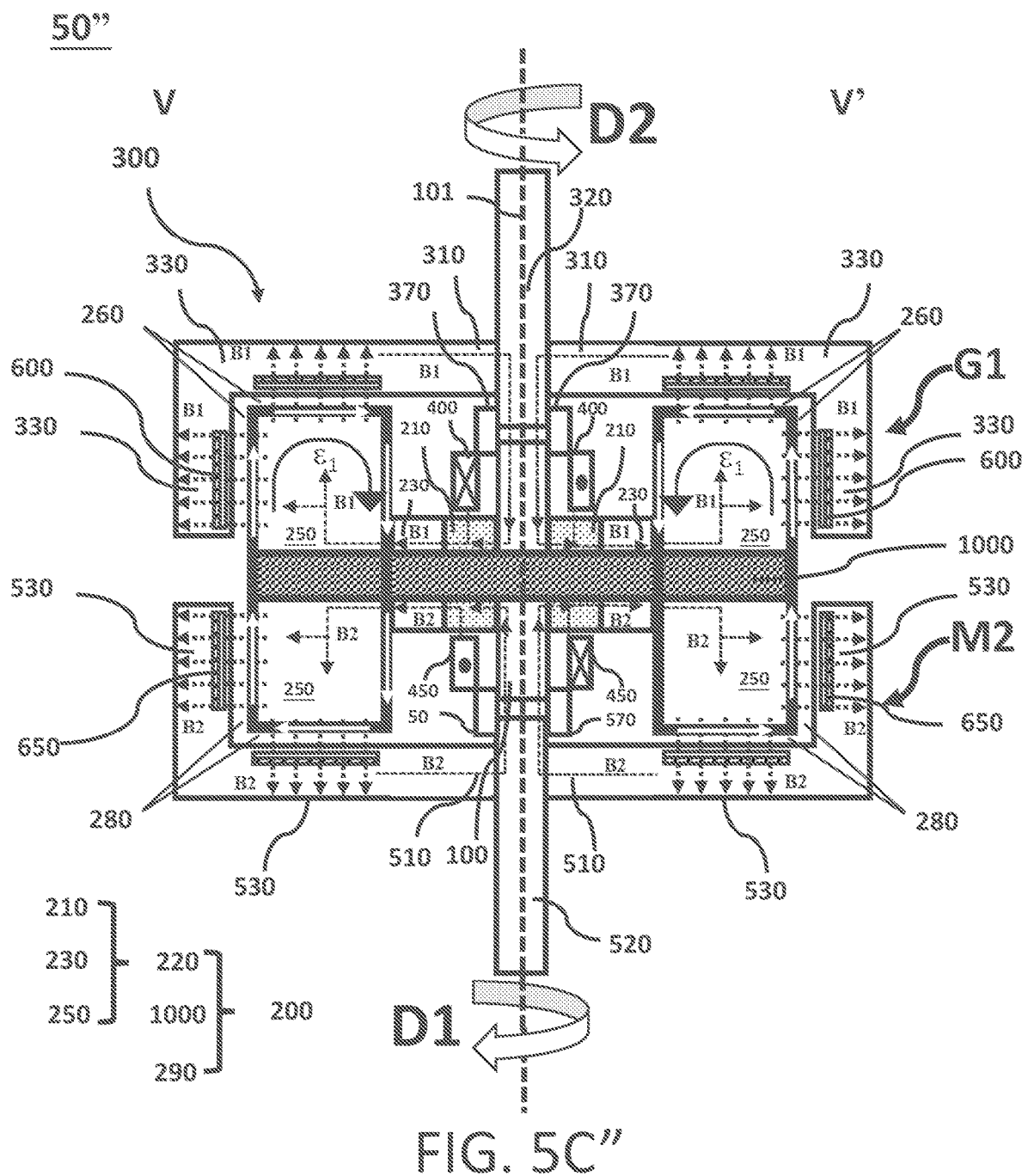
FIG. 5C″

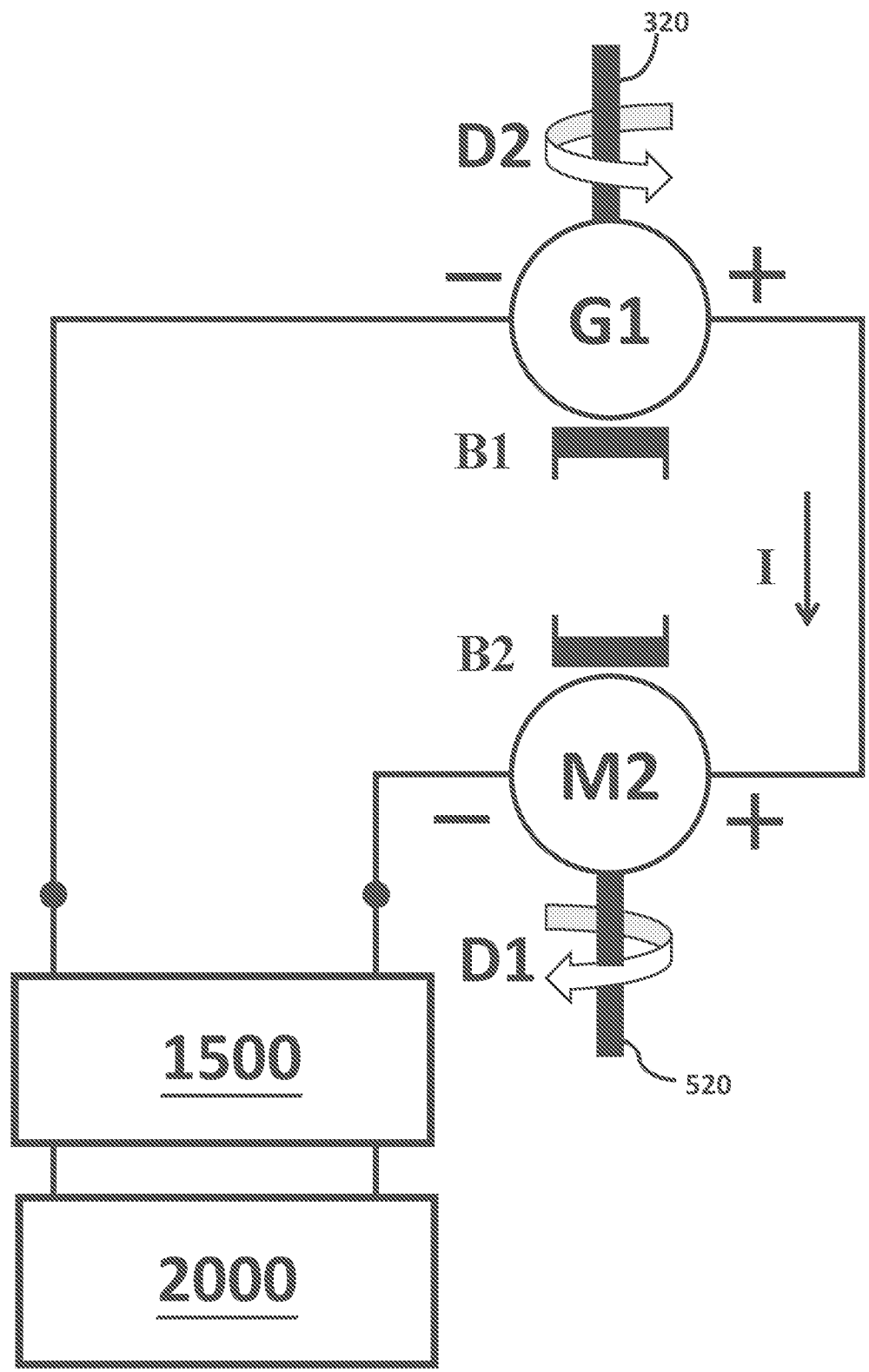
FIG. 5D″

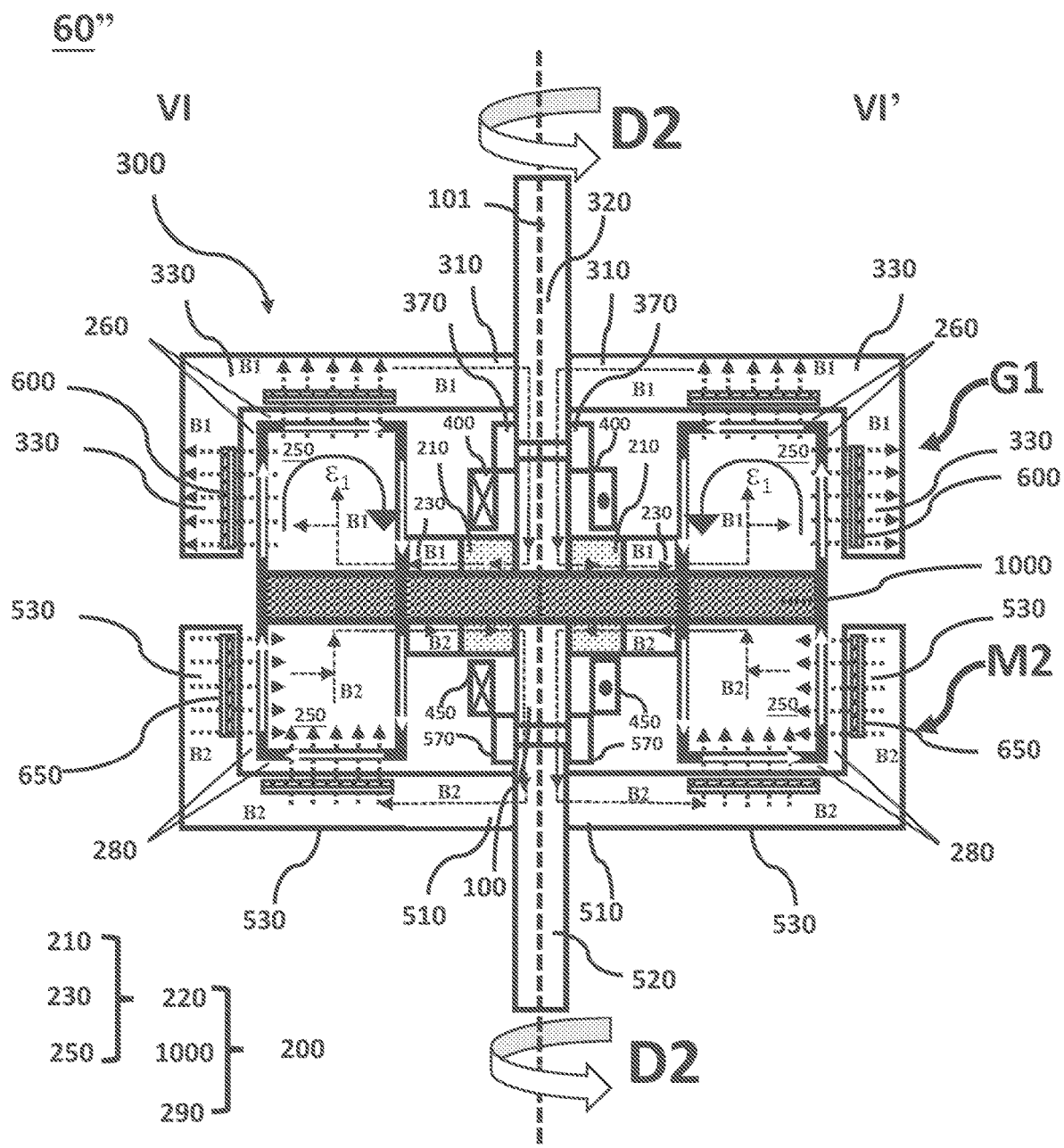
FIG. 6C″

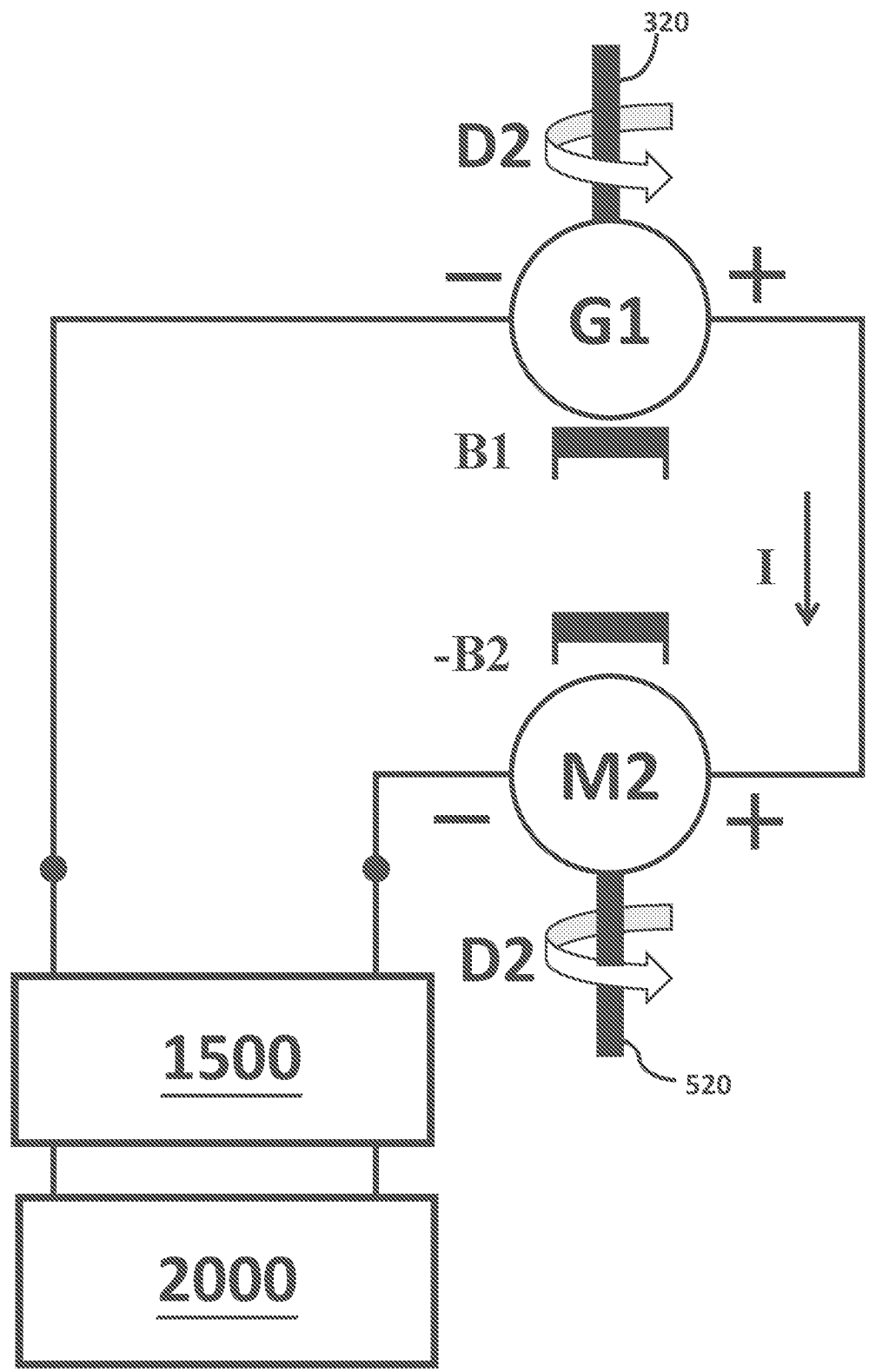
FIG. 6D″

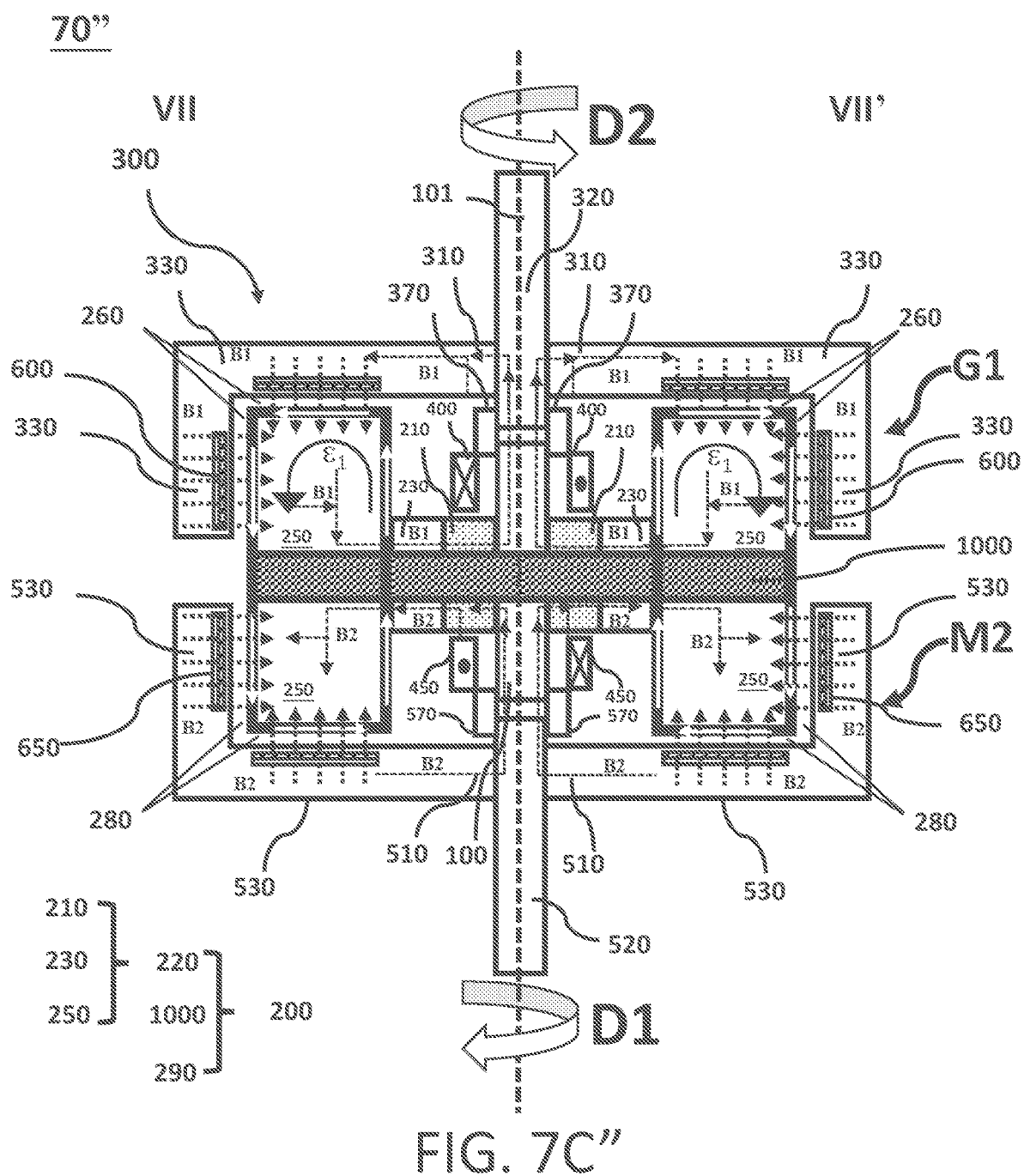
FIG. 7C″

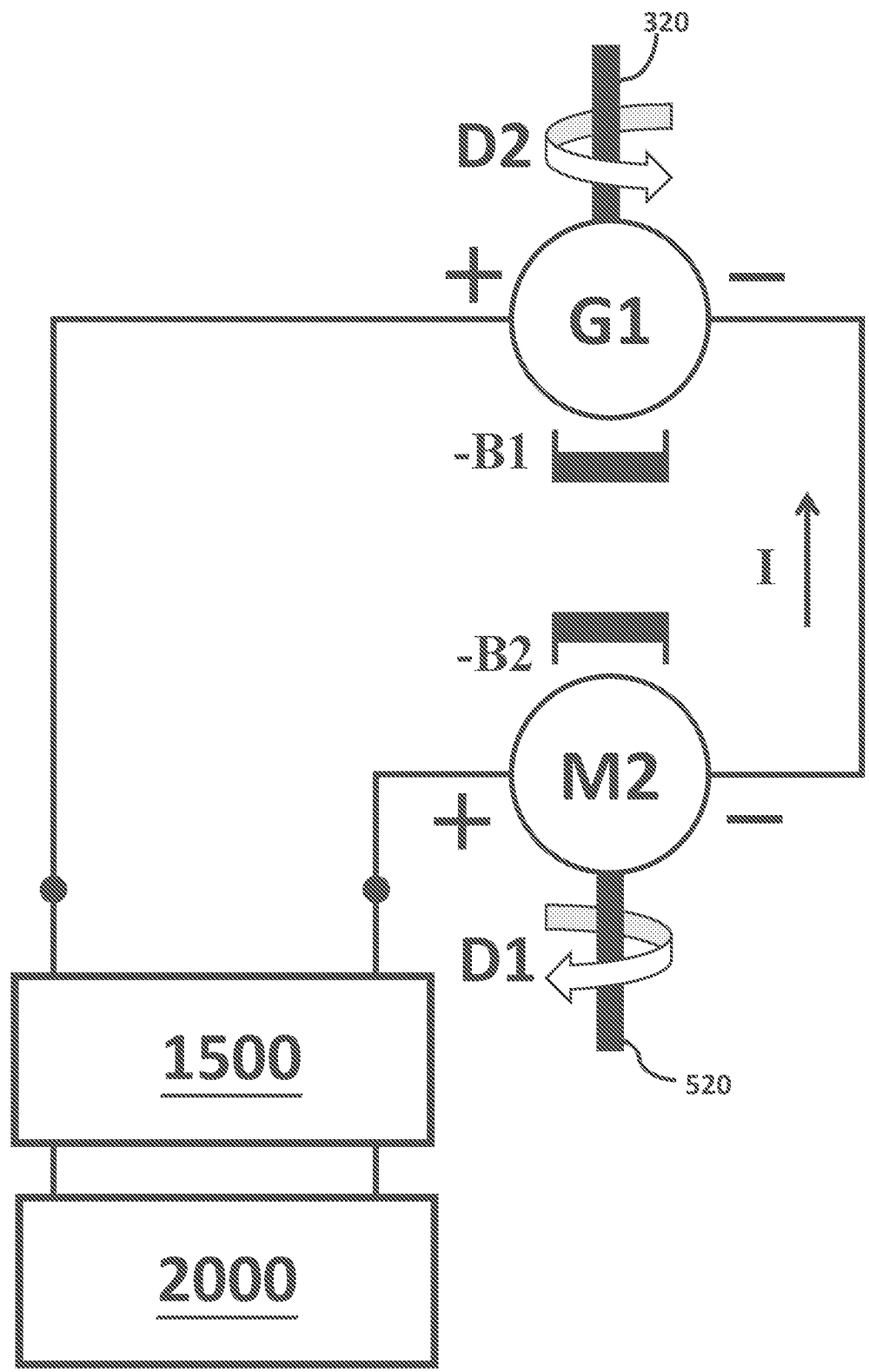
FIG. 7D″

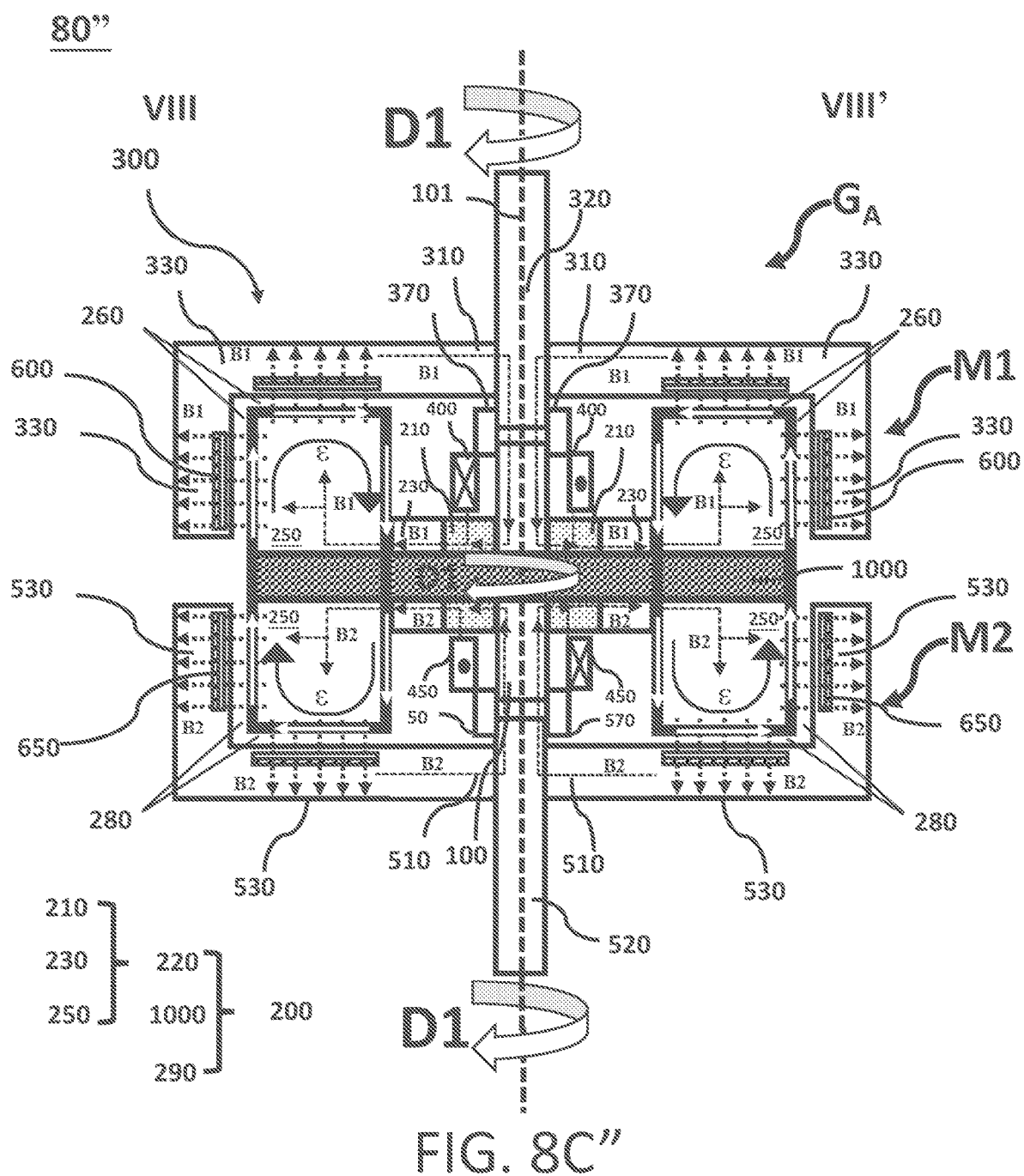
FIG. 8C"

DC MOTOR-DYNAMO FOR BIDIRECTIONAL ENERGY CONVERSION BETWEEN MECHANICAL AND ELECTRICAL ENERGY

This application claims the benefit of TW invention patent application No. 107144965, filed on Dec. 13, 2018, and TW utility model patent application No. 107216927, filed on Dec. 13, 2018, and the entireties of which are incorporated by references herein.

BACKGROUND OF THE UTILITY MODEL

Field of the Invention

The present utility model relates to a DC dynamo and particularly relates to a commutatorless DC dynamo.

Description of the Related Art

The conventional DC dynamo usually includes commutators (i.e. rectifier) to always keep the magnetic field of the rotor perpendicular to the magnetic field of the stator during rotation to generate a greatest torque. Meanwhile, the DC dynamos continuously head the lists of rotation speed controlling and servo controlling fields owing to advantages of voltage proportion to the rotation speed and hence naturally easy to control. The brushless DC dynamo (BLDC dynamo) is now very popular in the market, which has a structure like a permanent-magnet variable frequency synchronous AC dynamo, wherein the rotatable angle of the stator is determined by a so-called multiple phase magnetic field, for example three phases magnetic field, thus the permanent rotor can be rotated by a magnetic field with variable rotation velocities to serve as a motor; or, the electromotive force induced by a permanent rotor can be transformed into AC power by a multiphase coil, such as a three phase coil, to serve as a generator. However, the VVVF control method of state-of-the-art BLDC is too complex and unnatural, so a novel brushless DC dynamo with a working mode more close to that of the convention DC dynamo is highly expected.

The traditional mechanical power transmission is used to determine the gear ratio of the gears on the primary and secondary side axles, or the chain ratio of the primary and secondary gears; In recent years, various mechanical continuously variable transmissions (CVTs) have been widely used in vehicle gearboxes. Its main structural knife uses a flexible steel belt to transfer power between the two cone wheels on the primary and secondary sides. The flexible steel belt transforms the transmission of different radius parts of the primary and secondary side cone wheels to achieve the effect of infinitely variable speed. Only the frictional energy consumption and mechanical loss of the mechanical transmission are the main disadvantages of the CVT.

Walter-Leonard motor speed control system is an important example of the common practice of early electric variable-speed drive systems. The use of a DC motor is easy to use the characteristics of controlling the voltage of the other field and controlling the rotation speed with the armature voltage. The prime mover drives the DC generator to generate power and controls the output voltage of the armature by excitation. Then the output drives another DC motor. The magnetic field ratio of the rotating electric machine can be adjusted to achieve the effect of continuous variable transmission.

In order to resolve the problems that the conventional DC dynamos are suffering, this present utility model provides a novel DC dynamo which is characterized by making the magnetic lines of flux pass through an air gap between the rotor and the stator in the same direction, thus the most of armature coils can always receive the electromotive force of the same polarity in the same direction. Therefore, bidirectional energy conversion between the mechanical energy and the electrical energy of the armature coils in series can still proceed in the absence of commutators and induced the armature to generate sufficient electromotive force to conveniently regulate suitable terminal voltages and the ratios of the rotating speed and the moving speed thereof.

SUMMARY OF THE UTILITY MODEL

A feature of this utility model provides A DC dynamo, comprising: a central axis; an armature apparatus with a first side (not labeled) and a second side (not labeled) opposite to each other and spaced by a low magnetic material layer or a non-magnetic material layer, comprising a body and a plurality of armature coils, and wherein the body includes a central body coupled to the central axis, a peripheral body surrounding the central body and a plurality of middle bodies for connecting the central body and the peripheral body, wherein the low magnetic material layer or the non-magnetic material layer is passed through by part of the armature coils, and the first side (not labeled) and the second side (not labeled) of the peripheral body are wound by part of the armature coils, and the number of the armature coils is equal or greater than 1; a first magnetic mechanism adjacent to the first side (not labeled) of the armature apparatus, comprising a first central area, a first peripheral area surrounding the first central area, wherein part or whole of the first peripheral area corresponds to the armature coils, and there is a first air gap between the first magnetic mechanism and the armature coils; a first magnetic field generator for generating a closed-loop first magnetic field between the first magnetic mechanism and the first armature apparatus, wherein the first magnetic lines of flux are flowing between the first magnetic mechanism and the first armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along with a virtual axis along with the same direction as that of the central axis; a second magnetic mechanism adjacent to the second side (not labeled) of the armature apparatus, comprising a second central area, a second peripheral area surrounding the second central area, wherein part or whole of the second peripheral area corresponds to the armature coils, and there is a second air gap between the second magnetic mechanism and the armature coils; a second magnetic field generator for generating a closed-loop second magnetic field between the second magnetic mechanism and the second armature apparatus, wherein the second magnetic lines of flux are flowing between the second magnetic mechanism and the second armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along with a virtual axis along with the same direction as that of the central axis; and a pair of armature electrodes with a substantially same polarity of electromotive force electrically interconnecting the armature coils and an outer system.

The DC dynamo as mentioned above, wherein the first magnetic field generator is an electromagnetic coil and/or a first permanent magnet.

The DC dynamo as mentioned above, wherein the first magnetic field generator is a first electromagnetic coil located between the first magnetic mechanism and the armature apparatus to generate a closed-loop first magnetic field, wherein almost all of the first magnetic lines of flux substantially and orthogonally pass through the first air gap from the armature coils to the first peripheral area of the first magnetic mechanism or substantially and orthogonally pass through the first air gap from the first peripheral area of the first magnetic mechanism to the armature coils.

The DC dynamo as mentioned above, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

The DC dynamo as mentioned above, wherein the second magnetic field generator is a second electromagnetic coil located between the second magnetic mechanism and the armature apparatus to generate a closed-loop second magnetic field, wherein almost all of the second magnetic lines of flux substantially and orthogonally pass through the second air gap from the armature coils to the second peripheral area of the second magnetic mechanism or substantially and orthogonally pass through the second air gap from the second peripheral area of the second magnetic mechanism to the armature coils.

The DC dynamo as mentioned above, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

The DC dynamo as mentioned above, the DC dynamo is a DC motor. The outer system is a power supply. The outer system comprises a control module and a battery module electrically connected to the control module, and the first magnetic mechanism and the second magnetic mechanism are driven by operation of the control module.

The DC dynamo as mentioned above, the DC Dynamo is a DC generator. The outer system is a battery module. The outer system comprises a control module and a battery module electrically connected to the control module, and the battery module is charged by operation of the control module.

Another of this invention provide another DC dynamo, comprising: a central axis; an armature apparatus with a first side (not labeled) and a second side (not labeled) opposite to each other and spaced by a low magnetic material layer or a non-magnetic material layer, comprising a body and a plurality of armature coils, and wherein the body includes a central body coupled to the central axis, a peripheral body surrounding the central body and a plurality of middle bodies for connecting the central body and the peripheral body, wherein the low magnetic material layer or the non-magnetic material layer is passed through by part of the armature coils, and the first side (not labeled) and the second side (not labeled) of the peripheral body are wound by part of the armature coils, and the number of the armature coils is equal or greater than 1; a first magnetic mechanism adjacent to the first side (not labeled) of the armature apparatus, comprising a first central area, a first peripheral area surrounding the first central area, wherein part or whole of the first peripheral area corresponds to the armature coils, and there is a first air gap between the first magnetic mechanism and the armature coils; a first magnetic field generator for generating a closed-loop first magnetic field between the first magnetic mechanism and the first armature apparatus, wherein the first magnetic lines of flux are flowing between the first magnetic mechanism and the first armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along with a virtual axis along with the same direction as that of the central axis; a second magnetic mechanism adjacent to the second side (not labeled) of the armature apparatus, comprising a second central area, a second peripheral area surrounding the second central area, wherein part or whole of the second peripheral area corresponds to the armature coils, and there is a second air gap between the second magnetic mechanism and the armature coils; a second magnetic field generator for generating a closed-loop second magnetic field between the second magnetic mechanism and the second armature apparatus, wherein the second magnetic lines of flux are flowing between the second magnetic mechanism and the second armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along with a virtual axis along with the same direction as that of the central axis; and a pair of armature electrodes with a substantially same polarity of electromotive force electrically interconnecting the armature coils and end-terminals of the pair of armature electrodes are connected to each other.

The DC dynamo as mentioned above, wherein the first magnetic field generator is a first electromagnetic coil and/or a first permanent magnet, and the second magnetic field generator is an second electromagnetic coil and/or a second permanent magnet The DC dynamo as mentioned above, wherein the first magnetic field generator is a first electromagnetic coil located between the first magnetic mechanism and the armature apparatus to generate a closed-loop first magnetic field, wherein almost all of the first magnetic lines of flux substantially and orthogonally pass through the first air gap from the armature coils to the first peripheral area of the first magnetic mechanism or substantially and orthogonally pass through the first air gap from the first peripheral area of the first magnetic mechanism to the armature coils.

The DC dynamo as mentioned above, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

The DC dynamo as mentioned above, wherein the second magnetic field generator is a second electromagnetic coil located between the second magnetic mechanism and the armature apparatus to generate a closed-loop second magnetic field, wherein almost all of the second magnetic lines of flux substantially and orthogonally pass through the second air gap from the armature coils to the second peripheral area of the second magnetic mechanism or substantially and orthogonally pass through the second air gap from the second peripheral area of the second magnetic mechanism to the armature coils.

The DC dynamo as mentioned above, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

The DC dynamo as mentioned above, wherein the DC dynamo is a DC generator-DC motor complex, and the first magnetic mechanism and the second magnetic mechanism are rotors, and the armature apparatus is a stator.

The DC dynamo as mentioned above, wherein the pair of armature electrodes of the DC dynamo are directly shorted to connect to each other, wherein the DC generator comprises the first magnetic mechanism, the first magnetic field generator and the armature coils in the first side (not labeled) of the armature apparatus, and the DC motor comprises the second magnetic mechanism, the second magnetic field generator and the armature coils in the second side (not labeled) of the armature apparatus, and the ratio of the density of the first magnetic lines of flux passing through the first air gap to the density of the second magnetic lines of flux passing through the second air gap is r1, and the ratio of the rotation speed of the DC generator to the rotation speed of the DC motor is r2, r1 and r2 are in reverse tendency or in substantially inverse proportion, thereby the rotation speed of the DC motor can be changed by adjusting the ratio of r1.

The DC dynamo as mentioned above, further comprises a diode connected between the end-terminals of the pair of armature electrodes to achieve the purpose of one-way short. The DC dynamo as mentioned above, further comprises an outer system connected between the end-terminals of the pair of armature electrodes, wherein the outer system comprises a control module and a battery module electrically connected to the control module. The DC dynamo as mentioned above, wherein the battery module provides a battery electromotive force to assist the DC generator of the DC dynamo to drive the second magnetic mechanism to rotate. The DC dynamo as mentioned above, wherein the battery module is charged by driving the second magnetic mechanism to rotate by the DC generator of the DC dynamo by operation of the control module.

The DC dynamo as mentioned above, wherein the DC generator-DC motor complex acts as a continuously variable transmission, wherein the first central area of the first magnetic mechanism further comprises a first rotation axis, and the second central area of the second magnetic mechanism further comprises a second rotation axis, and the first rotation axis can be driven to rotate by the first magnetic mechanism of the DC generator, and the second rotation axis can be driven to rotate by the second magnetic mechanism of the DC generator, wherein the first rotation axis can act as the power input axis of the continuously variable transmission, and the second rotation axis can act as the power output axis of the continuously variable transmission, and the rotation ratio of the first rotation axis to the second rotation axis and the rotation ratio of DC generator to the DC motor equals to r2, and the ratio of the density of the first magnetic lines of flux passing through the first air gap to the density of the second magnetic lines of flux passing through the second air gap is r1, r1 and r2 are in reverse tendency or in substantially inverse proportion, thereby the rotation ratio of the first rotation axis to the second rotation axis and the rotation ratio of DC generator to the DC motor equaling to r2 can be changed by adjusting the ratio of r1 to achieve the purpose of continuously variable transmission.

The DC dynamo as mentioned above, the DC dynamo is a DC generator-DC motor complex, wherein the first magnetic field in the first side (not labeled) of the armature coils passing through the first air gap from the armature coils to the first peripheral area of the first magnetic mechanism and the second magnetic field in the second side (not labeled) of the armature coils passing through the second air gap from the armature coils to the second peripheral area of the magnetic mechanism, or the first magnetic field in the first side (not labeled) of the armature coils passing through the first air gap from the first peripheral area of the first magnetic mechanism to the armature coils and the second magnetic field in the second side (not labeled) of the armature coils passing through the second air gap from the second peripheral area of the second magnetic mechanism to the armature coils, thereby the armature apparatus can be driven to rotate and generate an induced electromotive force to drive the first magnetic mechanism and the second magnetic mechanism to rotate in the same direction as that of the armature apparatus.

The DC dynamo as mentioned above, wherein the pair of armature electrodes of the DC dynamo are directly shorted to connect to each other, wherein the DC generator-DC motor complex comprises a DC generator and a DC motor, and the DC generator comprises the first magnetic mechanism, the first magnetic generator, the armature apparatus, the second magnetic generator and the second magnetic mechanism, and the DC motor comprises a first DC motor and a second DC motor, wherein the first DC motor comprises the first magnetic mechanism, the first magnetic generator and the armature coils in the first side (not labeled) of the armature apparatus, and the second DC motor comprises the second magnetic mechanism, the second magnetic generator and the armature coils in the second side (not labeled) of the armature apparatus. The DC dynamo as mentioned above can further comprises an outer system connected between the end-terminals of the pair of armature electrodes, wherein the outer system comprises a control module and a battery module electrically connected to the control module. The DC dynamo as mentioned above, wherein the battery module provides a battery electromotive force to assist the armature apparatus to rotate to generate an induced electromotive force to drive the first magnetic mechanism and the second magnetic mechanism to rotate in the same direction as that of the armature apparatus. The DC dynamo as mentioned above, wherein the induced electromotive force generated by the armature apparatus driven to rotate by the operation of the control module can simultaneously drive the first magnetic mechanism and the second magnetic mechanism to rotate in the same direction as that of the armature apparatus and charge to the battery module.

BRIEF DESCRIPTION OF THE DRAWINGS

FIG. 1C' is a cross-sectional view of the DC dynamo 10' of the embodiments 2 along with the sectional line I-I' as shown in FIG. 1B.

FIG. 1C" is a cross-sectional view of the DC dynamo 10" of the embodiments 3 along with the sectional line I-I' as shown in FIG. 1B.

FIG. 1D' is another equivalent circuit diagram of the DC dynamo 10, 10' and 10" of the embodiments 1, 2, and 3 according to this present invention.

FIG. 2C' is a cross-sectional view of the DC dynamo 20' of the embodiments 5 along with the sectional line II-II' as shown in FIG. 2B.

FIG. 2C" is a cross-sectional view of the DC dynamo 20" of the embodiments 6 along with the sectional line II-II' as shown in FIG. 2B.

FIG. 2D' is another equivalent circuit diagram of the DC dynamo 20, 20' and 20" of the embodiments 4, 5, and 6 according to this present invention.

FIG. 3C' is a cross-sectional view of the DC dynamo 30' of the embodiments 8 along with the sectional line as shown in FIG. 3B.

FIG. 3C" is a cross-sectional view of the DC dynamo 30" of the embodiments 9 along with the sectional line as shown in FIG. 3B.

FIG. 3D' is another equivalent circuit diagram of the DC dynamo 30, 30' and 30" of the embodiments 7, 8, and 9 according to this present invention.

FIG. 4C' is a cross-sectional view of the DC dynamo 40' of the embodiments 11 along with the sectional line IV-IV' as shown in FIG. 4B.

FIG. 4C" is a cross-sectional view of the DC dynamo 40" of the embodiments 12 along with the sectional line IV-IV' as shown in FIG. 4B.

FIG. 4D' is another equivalent circuit diagram of the DC dynamo 40, 40' and 40" of the embodiments 10, 11, and 12 according to this present invention.

FIG. 5C' is a cross-sectional view of the DC dynamo 50' of the embodiments 14 along with the sectional line V-V' as shown in FIG. 5B.

FIG. 5C" is a cross-sectional view of the DC dynamo 40" of the embodiments 15 along with the sectional line V-V' as shown in FIG. 5B.

FIG. 5D' is another equivalent circuit diagram of the DC dynamo 50, 50' and 50" of the embodiments 13, 14, and 15 according to this present invention.

FIG. 5D" is another equivalent circuit diagram of the DC dynamo 50, 50' and 50" of the embodiments 13, 14, and 15 according to this present invention.

FIG. 6C' is a cross-sectional view of the DC dynamo 60' of the embodiments 17 along with the sectional line VI-VI' as shown in FIG. 6B.

FIG. 6C" is a cross-sectional view of the DC dynamo 60" of the embodiments 18 along with the sectional line VI-VI' as shown in FIG. 6B.

FIG. 6D' is another equivalent circuit diagram of the DC dynamo 60, 60' and 60" of the embodiments 16, 17, and 18 according to this present invention.

FIG. 6D" is another equivalent circuit diagram of the DC dynamo 60, 60' and 60" of the embodiments 16, 17, and 18 according to this present invention.

FIG. 7C' is a cross-sectional view of the DC dynamo 70' of the embodiments 20 along with the sectional line VII-VII' as shown in FIG. 7B.

FIG. 7C" is a cross-sectional view of the DC dynamo 70" of the embodiments 21 along with the sectional line VII-VII' as shown in FIG. 7B.

FIG. 7D' is another equivalent circuit diagram of the DC dynamo 70, 70' and 70" of the embodiments 19, 20, and 21 according to this present invention.

FIG. 7D" is another equivalent circuit diagram of the DC dynamo 70, 70' and 70" of the embodiments 19, 20, and 21 according to this present invention.

FIG. 8C' is a cross-sectional view of the DC dynamo 80' of the embodiments 23 along with the sectional line VIII-VIII' as shown in FIG. 8B.

FIG. 8C" is a cross-sectional view of the DC dynamo 80" of the embodiments 24 along with the sectional line VIII-VIII' as shown in FIG. 8B.

FIG. 8D' is another equivalent circuit diagram of the DC dynamo 80, 80' and 80" of the embodiments 22, 23, and 24 according to this present invention.

DETAILED DESCRIPTION OF THE UTILITY MODEL

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

EMBODIMENTS

Embodiments 1, 2, 3

Figure 1A:
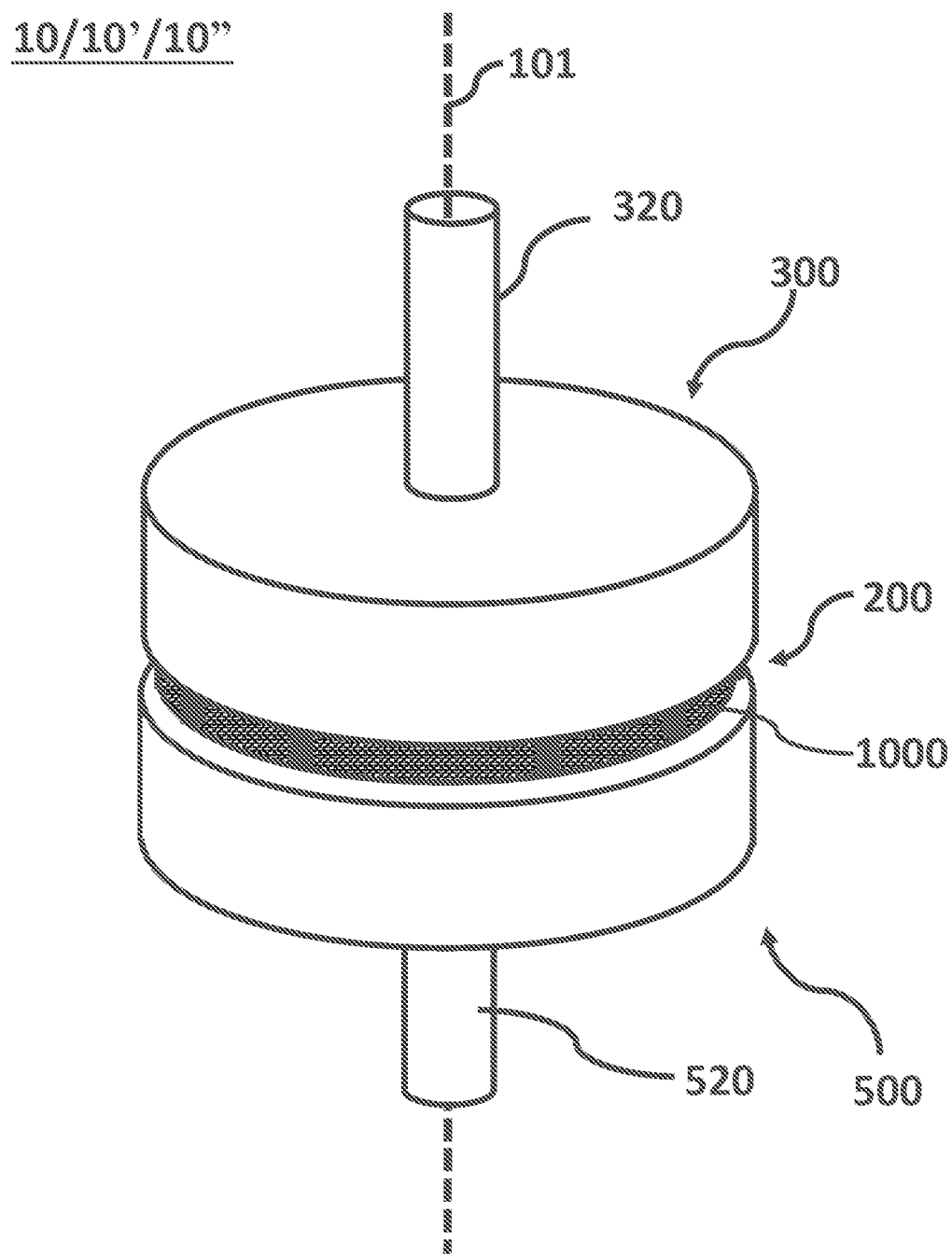
FIG. 1A is a stereoscopic assembly drawing of the DC dynamo 10, 10' and 10" of the embodiments 1, 2, and 3 according to this present invention.
Figure 1B:
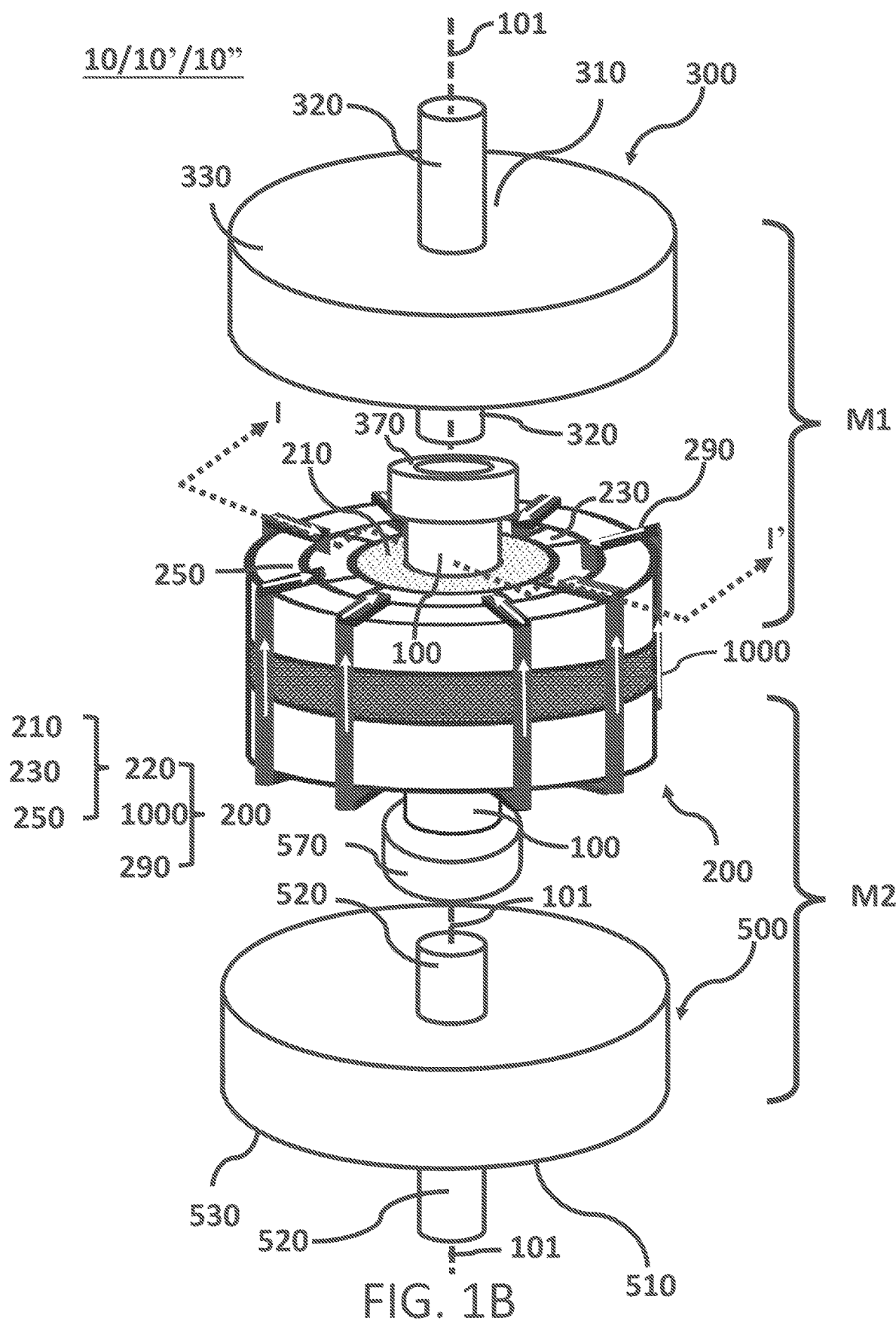
FIG. 1B is a stereoscopic exploded drawing of the DC dynamo 10, 10' and 10" as shown in FIG. 1A.

First, please refer to FIG. 1A illustrating a stereoscopic assembly drawing of the DC dynamo 10, 10' and 10" of the embodiments 1, 2, and 3 according to this present invention, and FIG. 1B illustrating a stereoscopic exploded drawing of the DC dynamo 10, 10' and 10" as shown in FIG. 1A.

As showing in FIG. 1A, the DC dynamo 10, 10' and 10" comprises a central axis 100, an armature apparatus 200 and a first magnetic mechanism 300, wherein the armature apparatus 200 and the first magnetic mechanism 300 respectively rotate along with the virtual axis 101.

As showing in FIG. 1B, the armature apparatus 200 has a first side (not labeled) and a second side (not labeled) opposite to each other and spaced by a low magnetic material layer or a non-magnetic material layer 1000, and comprises a body 220 and a plurality of armature coils 290, and wherein the body 220 includes a central body 210 coupled to the central axis 100, a peripheral body 250 surrounding the central body 210 and a plurality of middle bodies 230 for connecting the central body 210 and the peripheral body 250, and the peripheral body 250 is wound by the armature coils 290, and the number of the armature coils 290 is equal to 1 or greater than 1. As shown in FIG. 1B, the first magnetic mechanism 300 is adjacent to the first side (not labeled) of the armature apparatus 200, and comprises a first central area 310, a first peripheral area 330 surrounding the first central area 310, wherein part or whole of the first peripheral area 330 corresponds to the armature coils 290; the second magnetic mechanism 500 is adjacent to the second side (not labeled) of the armature apparatus 200, and comprises a second central area 510, a first peripheral area 530 surrounding the second central area 510, wherein part or whole of the second peripheral area 530 corresponds to the armature coils 290. Moreover, the first and the second central areas 310, 510 of the first and the second magnetic mechanisms 300, 500 of the DC dynamo 10, 10' and 10" of the embodiments 1, 2 and 3 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 10, 10' and 10" of the embodiments 1, 2 and 3 according to this invention rotate relatively to the armature apparatus 200 thereof.

Figure 1C:
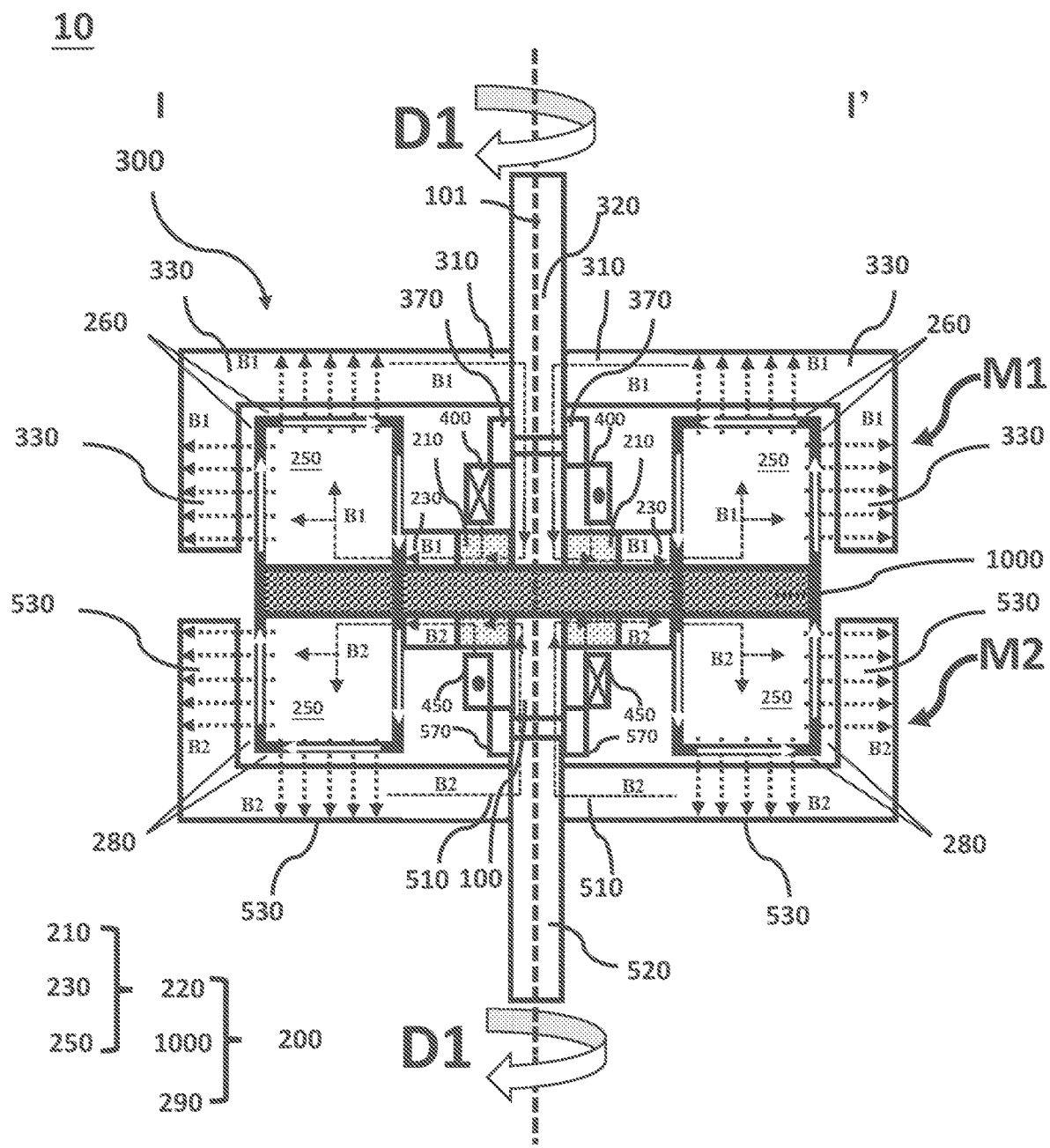
FIG. 1C is a cross-sectional view of the DC dynamo 10 of the embodiments 1 along with the sectional line I-I' as shown in FIG. 1B.
Figure 1C:
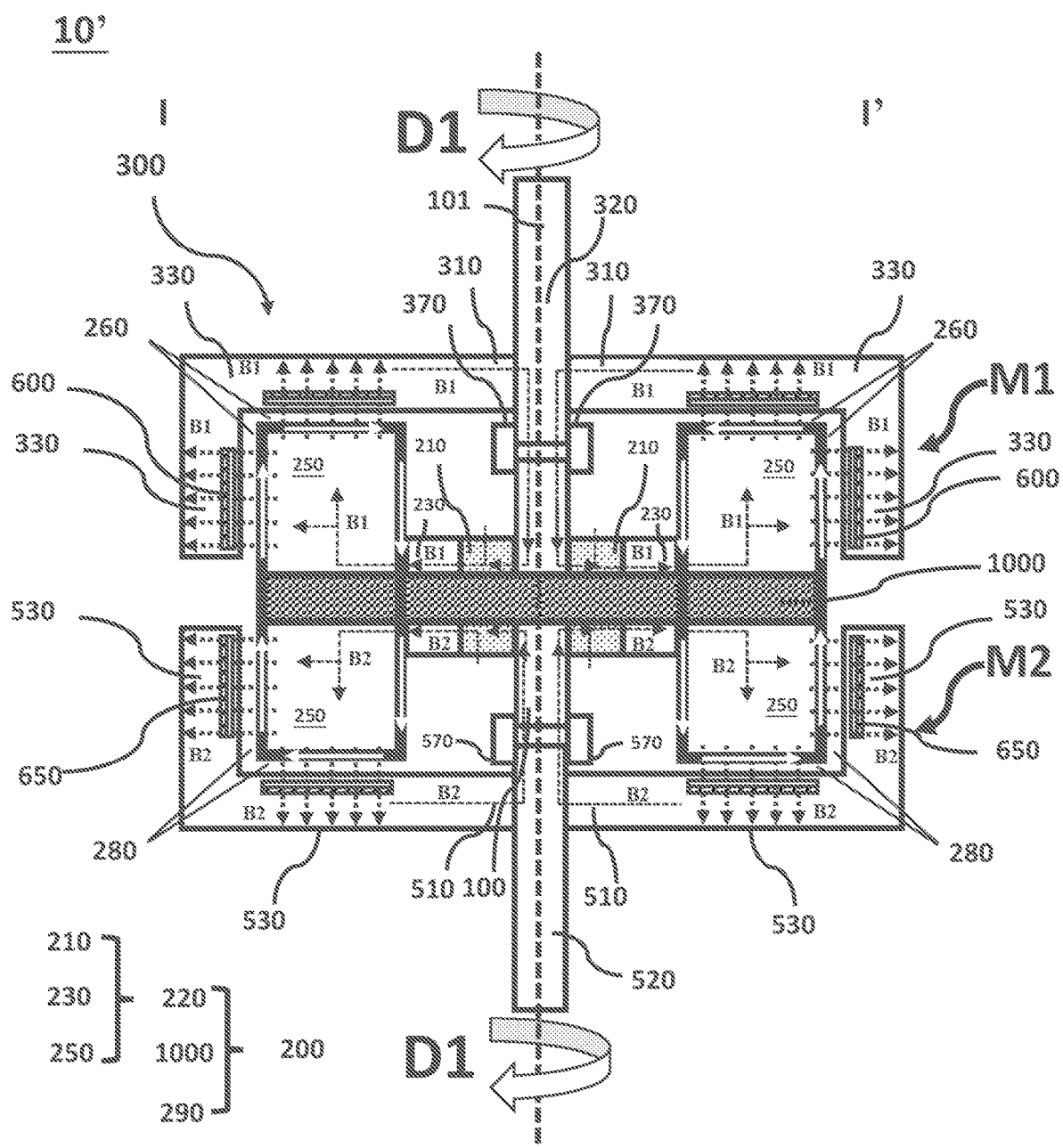

Next, please refer to FIG. 1C illustrating a cross-sectional view of the DC dynamo 10 of the embodiments 1 along with the sectional line I-I'. As shown in FIG. 1C, there is a first air gap 260 between the first magnetic mechanism 300 and the armature coils 290, and a second air gap 280 between the second magnetic mechanism 500 and the armature coils 290. The DC dynamo 10 of the embodiments 1 further comprises a first electromagnetic coil 400 located between the first magnetic mechanism 300 and the armature apparatus 200 to generate a closed-loop first magnetic field B1, and a second electromagnetic coil 450 located between the second magnetic mechanism 500 and the armature apparatus 200 to generate a closed-loop second magnetic field B2, wherein almost all of the first magnetic lines of flux substantially and orthogonally pass through the first air gap 260 from the armature coils 290 to the first magnetic mechanism 300, and almost all of the second magnetic lines of flux substantially and orthogonally pass through the second air gap 280 from the armature coils 290 to the second magnetic mechanism 500, thereby the armature apparatus 200 and the second magnetic mechanism 500 can rotate relatively to the virtual axis 101. As shown in FIG. 1C, the first electromagnetic coil 400 is placed between the first magnetic mechanism 300 and the first side (not labeled) of the armature apparatus 200 for example but not limited to surrounding the central axis 100 to generate a closed-loop first magnetic field B1, and the second electromagnetic coil 450 is placed between the second magnetic mechanism 500 and the second side (not labeled) of the armature apparatus 200 for example but not limited to surrounding the central axis 100 to generate a closed-loop second magnetic field B2 Furthermore, almost all of the first magnetic lines of flux substantially and orthogonally pass through the first air gap 260 from the first electromagnetic coil 400 to the first peripheral area of the first magnetic mechanism 300, and almost all of the second magnetic lines of flux substantially and orthogonally pass through the second air gap 280 from the second electromagnetic coil 450 to the second peripheral area of the second magnetic mechanism 500. Alternatively, in another embodiment of this present invention, almost all of the first magnetic lines of flux substantially and orthogonally pass through the first air gap 260 from the first peripheral area 330 of the first magnetic mechanism 300 to the armature coils 290, and almost all of the second magnetic lines of flux substantially and orthogonally pass through the second air gap 280 from the second peripheral area 530 of the second magnetic mechanism 500 to the armature coils 290.

When the DC dynamo 10 of the embodiment 1 acts as a DC motor, and almost all of the first magnetic lines of flux of the first magnetic field B1 substantially and orthogonally pass through the first air gap 260 from the first side (not labeled) of the armature coils 290 to the first magnetic mechanism 300, and almost all of the second magnetic lines of flux of the second magnetic field B2 substantially and orthogonally pass through the second air gap 280 from the second side (not labeled) of the armature coils 290 to the second magnetic mechanism 530, and when observing from the right side of the longitudinal section of the virtual axis 101 and the current i in one of the armature coils 290 flows counterclockwise adjacent to the first air gap 260 and the second air gap 280, a magnetic force injected inward to the longitudinal section of the virtual axis 101 will be generated by the first magnetic field B1 and the second magnetic field B2, and the peripheral body 250 of the armature coils 290 based on the Fleming's left hand rule, and the first magnetic mechanism 300 and the second magnetic mechanism 500 will respectively sense a reaction force injected outward to the right side of the longitudinal section of the virtual axis 101, then the first magnetic mechanism 300 and the second magnetic mechanism 500 can rotate relatively to the virtual axis 101 in the same first direction of D1; or when observing from the left side of the longitudinal section of the virtual axis 101 and the current i in one of the armature coils 290 flows clockwise adjacent to the first air gap 260 and the second air gap 280, a magnetic force injected outward to the longitudinal section of the virtual axis 101 will be generated by the first magnetic field B1 and the second magnetic field B2, and the peripheral body 250 of the armature coils 290 based on the Fleming's left hand rule, and the first magnetic mechanism 300 and the second magnetic mechanism 500 will respectively sense a reaction force injected inward to the left side of the longitudinal section of the virtual axis 101, then the first magnetic mechanism 300 and the second magnetic mechanism 500 can rotate relatively to the virtual axis 101 in the same first direction of D1. Therefore, the first rotation axis 320 and the second rotation axis 520 can be driven to rotate along with the virtual axis 101 in the same direction of D1. Moreover, the first magnetic mechanism 300, the first electromagnetic coil 400, and one of the armature coils 290 in the first side (not labeled) of the armature apparatus 200 of the DC dynamo 10 of Embodiment 1 can act as a first DC motor M1, and the second magnetic mechanism 500, the second electromagnetic coil 450, and one of the armature coils 290 in the second side (not labeled) of the armature apparatus 200 of the DC dynamo 10 of Embodiment 1 can act as a second DC motor M2, and M1 and M2 are connected in series. The equivalent circuit diagrams corresponding thereof are illustrated as that shown in FIG. 1D and FIG. 1D'.

Figure 1D:
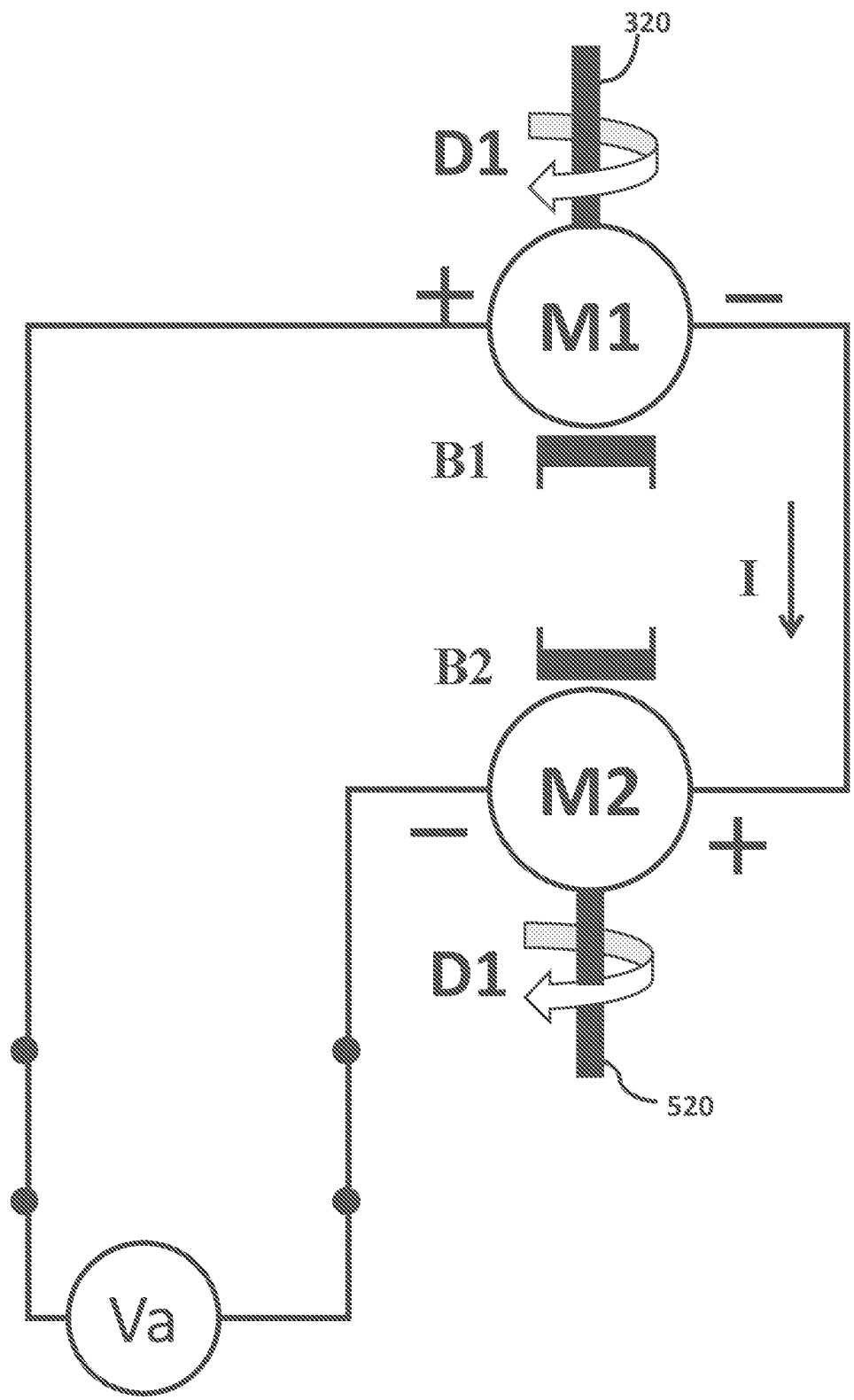
FIG. 1D is an equivalent circuit diagram of the DC dynamo 10, 10' and 10" of the embodiments 1, 2, and 3 according to this present invention.
Figure 1D:
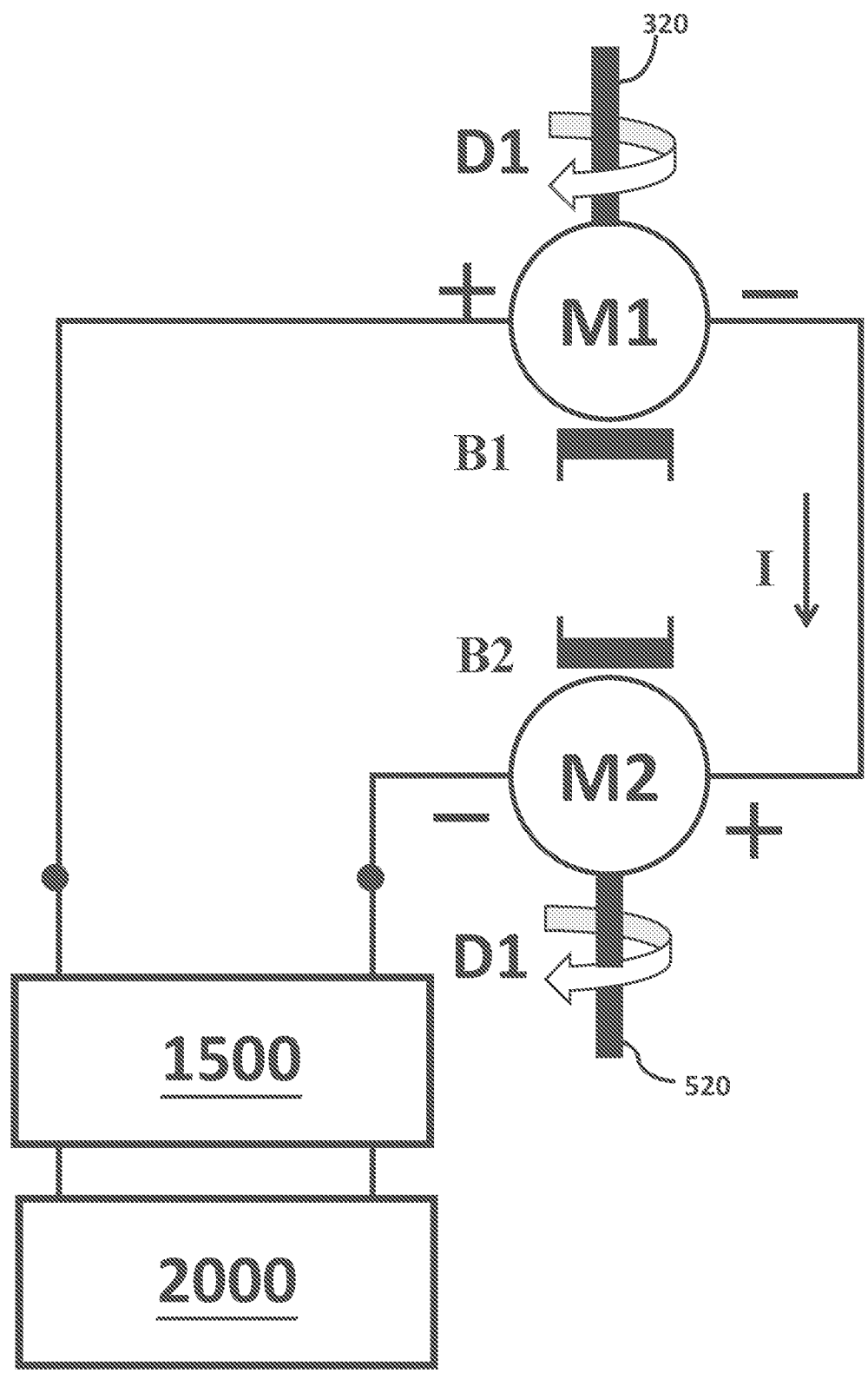

As the equivalent circuit diagram shown in FIG. 1D, when one of the armature electrodes (not labeled) with a substantially same polarity of electromotive force electrically interconnecting the armature coils 290 and an outer system (not shown) for example but not limited to terminal interconnect the armature coils 290 and a power supply Va, the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with the same direction D1 and contribute to carry the first rotation axis 320 and the second rotation axis 520 to rotate along with the same direction D1. The output rotation speeds of the DC motor M1 and the DC motor M2 can be changed by controlling the first rotation axis 320 and the second rotation axis 520 by adjusting the amplitude of the first magnetic field B1 and the amplitude of the second magnetic field B2.

As the equivalent circuit diagram shown in FIG. 1D', when one of the armature electrodes (not labeled) with a substantially same polarity of electromotive force electrically interconnecting the armature coils 290 and an outer system (not shown) for example but not limited to a control module 1500 and a battery module 2000 connected to the control module 1500, the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with the same first direction D1 driven by the batter module 2000 under the operation of the control module 1500 and contribute to carry the first rotation axis 320 and the second rotation axis 520 to rotate along with the same first direction D1. The output rotation speeds of the DC motor M1 and the DC motor M2 can be changed by controlling the first rotation axis 320 and the second rotation axis 520 by adjusting the amplitude of the first magnetic field B1 and the amplitude of the second magnetic field B2.

According to other embodiment of this invention, when the DC dynamo 10 of the embodiment 1 acts as a DC motor, and alternatively almost all of the first magnetic lines of flux of the first magnetic field B1 substantially and orthogonally pass through the first air gap 260 from the first peripheral area 330 of the first magnetic mechanism 300 to the first side (not labeled) of the armature coils 290, and alternatively almost all of the second magnetic lines of flux of the second magnetic field B2 substantially and orthogonally pass through the second air gap 280 from the second peripheral area 530 of the second magnetic mechanism 530 to the second side (not labeled) (nit labeled) of the armature coils 290, and when observing from the right side of the longitudinal section of the virtual axis 101 and the current i in one of the armature coils 290 flows counterclockwise adjacent to the first air gap 260 and the second air gap 280, a magnetic force injected outward to the longitudinal section of the virtual axis 101 will be generated by the first magnetic field B1 and the second magnetic field B2, and the peripheral body 250 of the armature coils 290 based on the Fleming's left hand rule, and the first magnetic mechanism 300 and the second magnetic mechanism 500 will respectively sense a reaction force injected inward to the right side of the longitudinal section of the virtual axis 101, then the first magnetic mechanism 300 and the second magnetic mechanism 500 can rotate relatively to the virtual axis 101 in the same second direction of D2; or when observing from the left side of the longitudinal section of the virtual axis 101 and the current i in one of the armature coils 290 flows clockwise adjacent to the first air gap 260 and the second air gap 280, a magnetic force injected inward to the longitudinal section of the virtual axis 101 will be generated by the first magnetic field B1 and the second magnetic field B2, and the peripheral body 250 of the armature coils 290 based on the Fleming's left hand rule, and the first magnetic mechanism 300 and the second magnetic mechanism 500 will respectively sense a reaction force injected outward to the left side of the longitudinal section of the virtual axis 101, then the first magnetic mechanism 300 and the second magnetic mechanism 500 can rotate relatively to the virtual axis 101 in the same second direction of D2. Therefore, the first rotation axis 320 and the second rotation axis 520 can be driven to rotate along with the virtual axis 101 in the same direction of D1. Moreover, the first magnetic mechanism 300, the first electromagnetic coil 400, and one of the armature coils 290 in the first side (not labeled) of the armature apparatus 200 of the DC dynamo 10 of Embodiment 1 can act as a first DC motor M1, and the second magnetic mechanism 500, the second electromagnetic coil 450, and one of the armature coils 290 in the second side (not labeled) of the armature apparatus 200 of the DC dynamo 10 of Embodiment 1 can act as a second DC motor M2, and M1 and M2 are connected in series. Moreover, the first magnetic mechanism 300, the first electromagnetic coil 400, and one of the armature coils 290 in the first side (not labeled) of the armature apparatus 200 of the DC dynamo 10 of Embodiment 1 can act as a first DC motor M1, and the second magnetic mechanism 500, the second electromagnetic coil 450, and one of the armature coils 290 in the second side (not labeled) of the armature apparatus 200 of the DC dynamo 10 of Embodiment 1 can act as a second DC motor M2, and M1 and M2 are connected in series.

Next, please refer to FIG. 1C' illustrating a cross-sectional view of the DC dynamo 10' of the embodiments 2 along with the sectional line I-I'. As shown in FIG. 1C', the structure of the DC dynamo 10' is similar to the DC dynamo 10, the main difference therebetween is the first permanent magnet 600 and the second permanent magnet 650 of the DC dynamo 10' are used to replace the first electromagnetic coil 400 and the second electromagnetic coil 450 of DC dynamo 10 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 1C, almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 10' of Embodiment 2 can act as a first DC motor M1, and the second magnetic mechanism 500, the second permanent magnet 650, and one of the armature coils 290 in the second side (not labeled) of the armature apparatus 200 of the DC dynamo 10' of Embodiment 2 can act as a second DC motor M2, and M1 and M2 are connected in series. The equivalent circuit diagrams corresponding thereof are illustrated as that shown in FIG. 1D and FIG. 1D'.

Moreover, the DC dynamo 10' of the embodiment 2 of this invention can also act as a DC motor as described in above-mentioned embodiment 1, so repeated description is omitted.

Next, please refer to FIG. 1C'' illustrating a cross-sectional view of the DC dynamo 10'' of the embodiments 3 along with the sectional line I-I'. As shown in FIG. 1C''', the structure of the DC dynamo 10'' is similar to the DC dynamos 10 and 10', the main difference therebetween is the first electromagnetic coil 400, the second electromagnetic coil 450 of the DC dynamo 10 and the first permanent magnet 600, the second permanent magnet 650 of the DC dynamo 10' are used to generate the first magnetic field B1 and the second magnetic field B2. As shown in FIG. 1C''', almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first electromagnetic coil 400, the first permanent magnet 600, and one of the armature coils 290 in the first side (not labeled) of the armature apparatus 200 of the DC dynamo 10'' of Embodiment 3 can act as a first DC motor M1, and the second magnetic mechanism 500, the second electromagnetic coil 450, the second permanent magnet 650, and one of the armature coils 290 in the second side (not labeled) of the armature apparatus 200 of the DC dynamo 10'' of Embodiment 3 can act as a second DC motor M2, and M1 and M2 are connected in series. The equivalent circuit diagrams corresponding thereof are illustrated as that shown in FIG. 1D and FIG. 1D'.

Alternatively, in another embodiment of this present invention, almost all of the first magnetic lines of flux substantially and orthogonally pass through the first air gap 260 from the first peripheral area 330 of the first magnetic mechanism 300 to the armature coils 290 in the first side (not labeled) of the armature apparatus 200, and almost all of the second magnetic lines of flux substantially and orthogonally pass through the second air gap 280 from the second peripheral area 530 of the second magnetic mechanism 500 to the armature coils 290 in the second side (not labeled) of the armature apparatus 200.

Moreover, the DC dynamo 10" of the embodiment 3 of this invention can also act as a DC motor as described in above-mentioned embodiments 1 and 2, so repeated description is omitted.

The armature apparatuses 200 of the DC dynamo 10, 10' and 10" of the embodiments 1, 2 and 3 according to this invention are stators, and the first magnetic mechanism 300 and the second magnetic mechanism 500 are rotors. Alternatively, the armature apparatuses 200 of the DC dynamo 10, 10' and 10" of other embodiments according to this invention are rotors, and the first magnetic mechanism 300 and the second magnetic mechanism 500 are stators.

The first and the second central areas 310, 510 of the first and the second magnetic mechanisms 300, 500 of the DC dynamo 10, 10' and 10" of the embodiments 1, 2 and 3 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 10, 10' and 10" of the embodiments 1, 2 and 3 according to this invention rotate relatively to the armature apparatus 200 thereof.

The first and the second central areas 310, 510 of the first and the second magnetic mechanisms 300, 500 of the DC dynamo 10, 10' and 10" of the embodiments 1, 2 and 3 according to this invention can further comprise a plurality of balls (not shown) placed between the first rotation axis 320 and the first bearing 370, and the second rotation axis 520 and the second bearing 570.

Embodiments 4, 5, 6

Figure 2A:
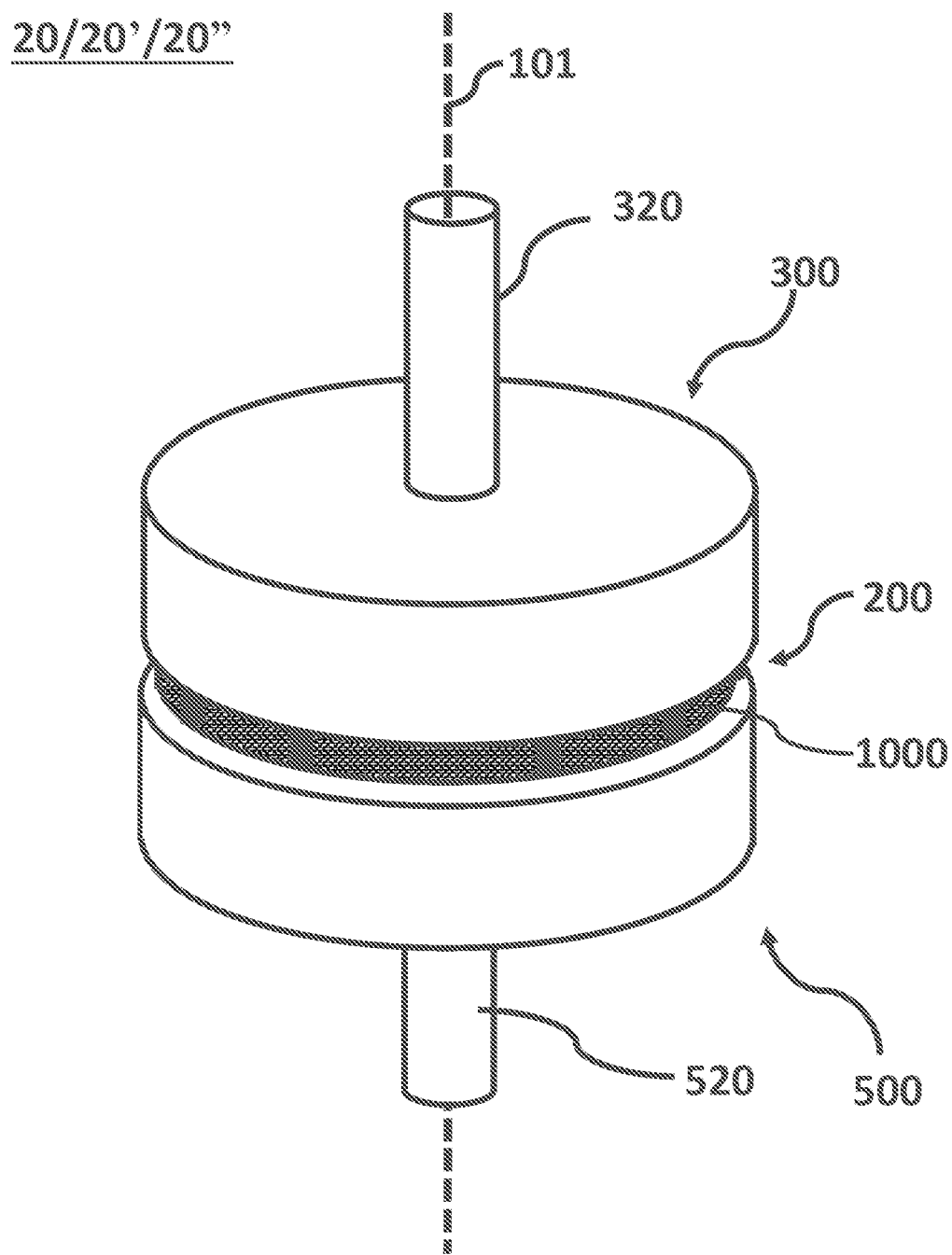
FIG. 2A is a stereoscopic assembly drawing of the DC dynamo 20, 20' and 20" of the embodiments 4, 5, and 6 according to this present invention.
Figure 2B:
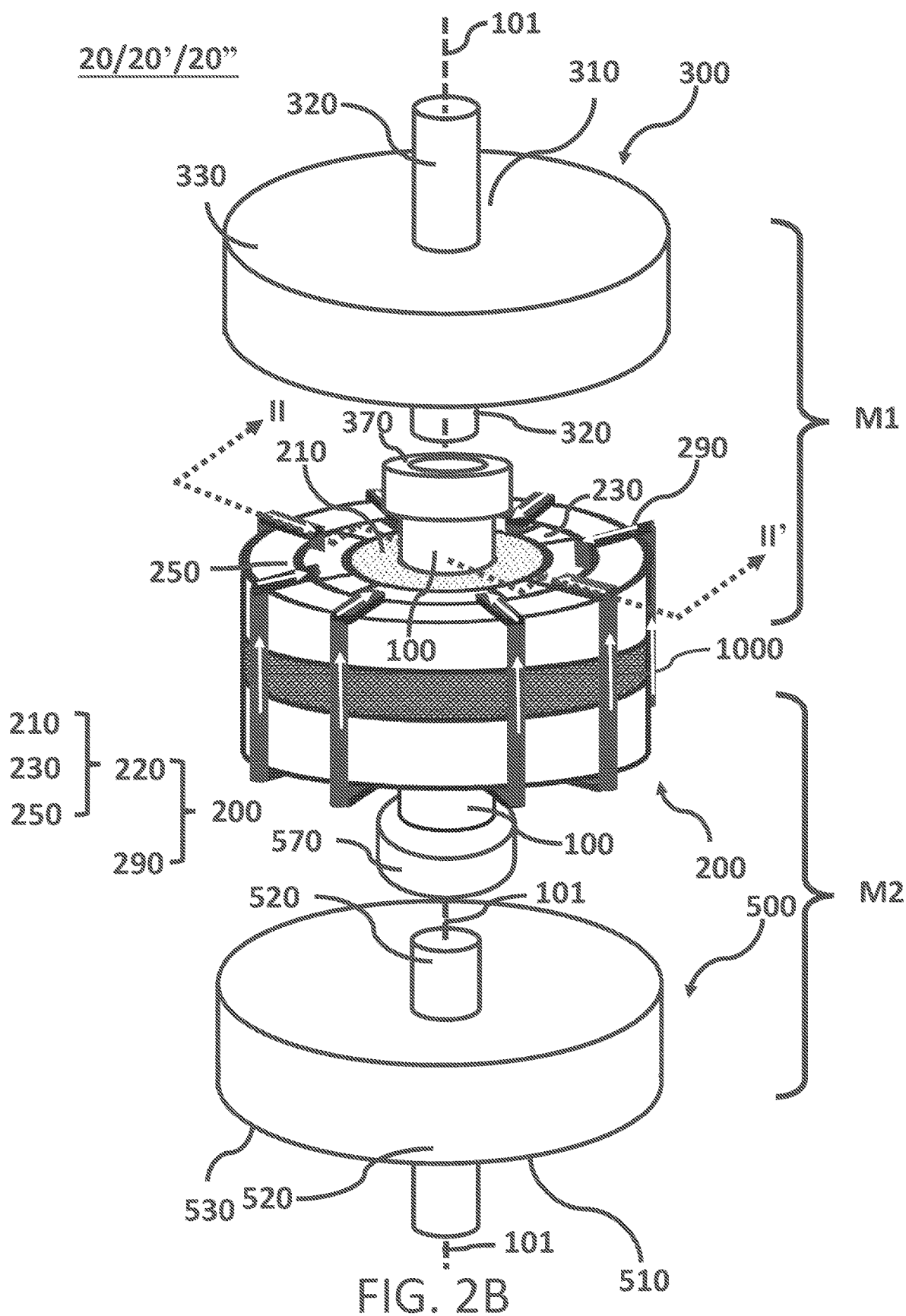
FIG. 2B is a stereoscopic exploded drawing of the DC dynamo 20, 20' and 20" as shown in FIG. 2A.

First, please refer to FIG. 2A illustrating a stereoscopic assembly drawing of the DC dynamo 20, 20' and 20" of the embodiments 4, 5, and 6 according to this present invention, and FIG. 2B illustrating a stereoscopic exploded drawing of the DC dynamo 20, 20' and 20" as shown in FIG. 2A.

Figure 2C:
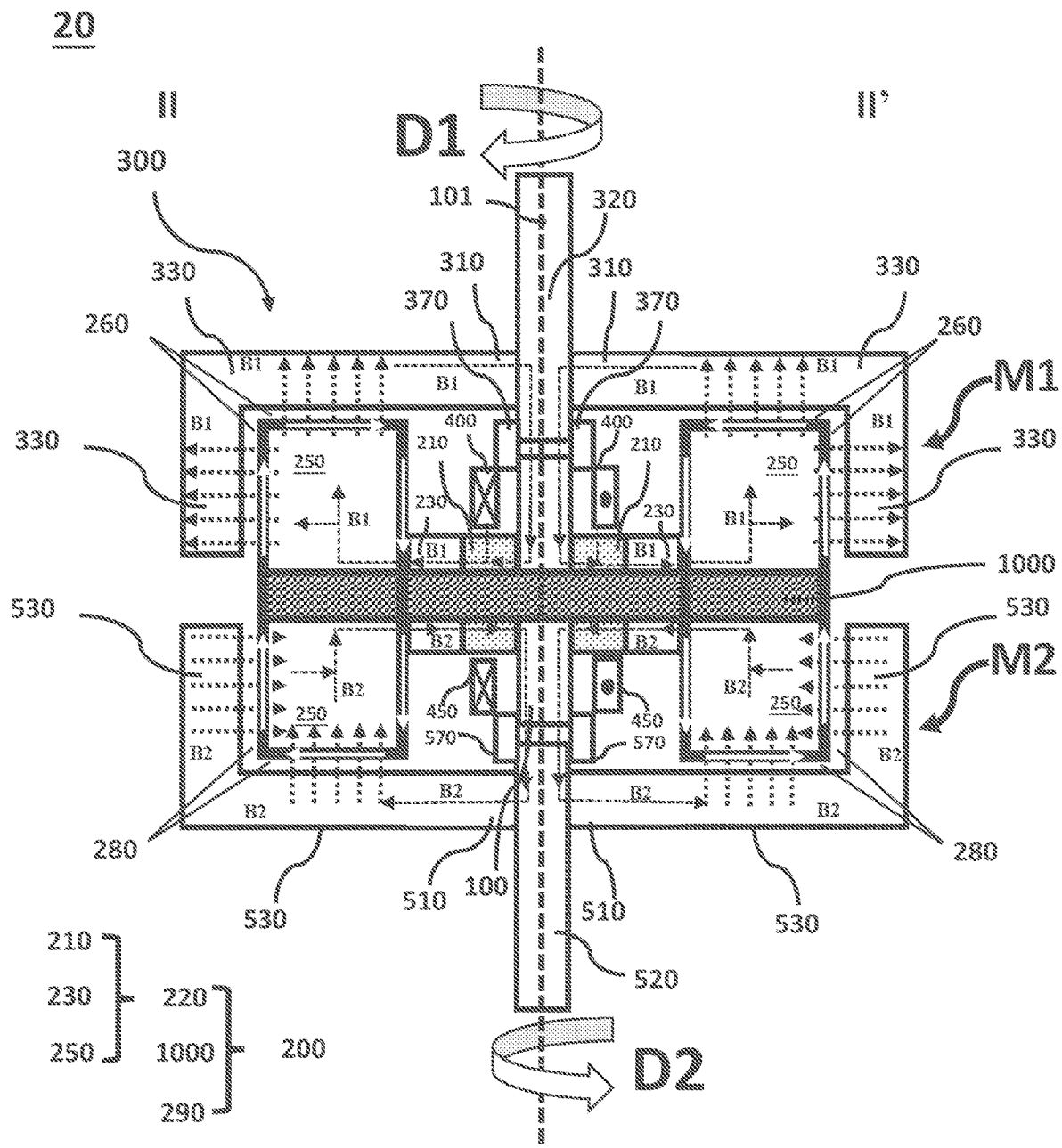
FIG. 2C is a cross-sectional view of the DC dynamo 20 of the embodiments 4 along with the sectional line II-II' as shown in FIG. 2B.
Figure 2C:
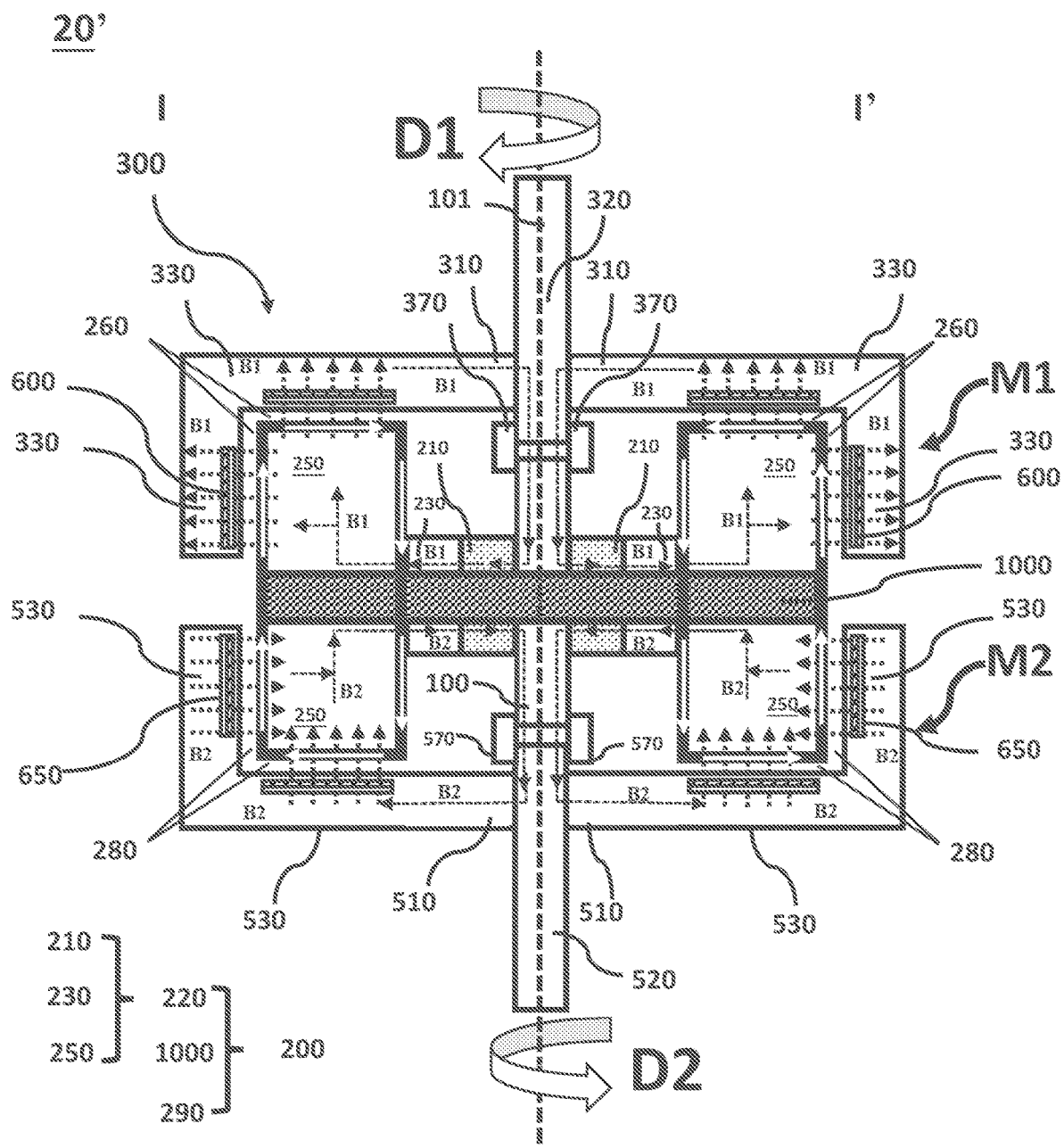

Next, please refer to FIG. 2C illustrating a cross-sectional view of the DC dynamo 20 of the embodiments 4 along with the sectional line II-II'. As shown in FIG. 2C, the structure of the DC dynamo 20 is similar to the DC dynamo 10 of the embodiment 1, wherein almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, but almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

As shown in FIG. 2C, the first electromagnetic coil 400 is placed between the first magnetic mechanism 300 and the first side (not labeled) of the armature apparatus 200 for example but not limited to surrounding the central axis 100 to generate a closed-loop first magnetic field B1, and the second electromagnetic coil 450 is placed between the second magnetic mechanism 500 and the second side (not labeled) of the armature apparatus 200 for example but not limited to surrounding the central axis 100 to generate a closed-loop second magnetic field B2 Furthermore, almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, but almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

As shown in FIG. 2C, when the DC dynamo 20 of the embodiment 4 acts as a DC motor, and almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and when observing from the right side of the longitudinal section of the virtual axis 101 and the current i in one of the armature coils 290 flows counterclockwise adjacent to the first air gap 260, a magnetic force injected inward to the longitudinal section of the virtual axis 101 will be generated by the first magnetic field B1, and the peripheral body 250 of the armature coils 290 based on the Fleming's left hand rule, and the first magnetic mechanism 300 will respectively sense a reaction force injected outward to the right side of the longitudinal section of the virtual axis 101, then the first magnetic mechanism 300 can rotate relatively to the virtual axis 101 in the same first direction of D1, and when observing from the left side of the longitudinal section of the virtual axis 101 and the current i in one of the armature coils 290 flows clockwise adjacent to the first air gap 260, a magnetic force injected outward to the longitudinal section of the virtual axis 101 will be generated by the first magnetic field B1, and the peripheral body 250 of the armature coils 290 based on the Fleming's left hand rule, and the first magnetic mechanism 300 will respectively sense a reaction force injected inward to the left side of the longitudinal section of the virtual axis 101, then the first magnetic mechanism 300 can rotate relatively to the virtual axis 101 in the same first direction of D1. Moreover, the first magnetic mechanism 300, the first electromagnetic coil 400, and one of the armature coils 290 in the first side (not labeled) of the armature apparatus 200 of the DC dynamo 20 of Embodiment 4 can act as a first DC motor M1, and the second magnetic mechanism 500, the second electromagnetic coil 450, and one of the armature coils 290 in the second side (not labeled) of the armature apparatus 200 of the DC dynamo 20 of Embodiment 4 can act as a second DC motor M2, and M1 and M2 are connected in series. The equivalent circuit diagrams corresponding thereof are illustrated as that shown in FIG. 2D and FIG. 2D'.

Figure 2D:
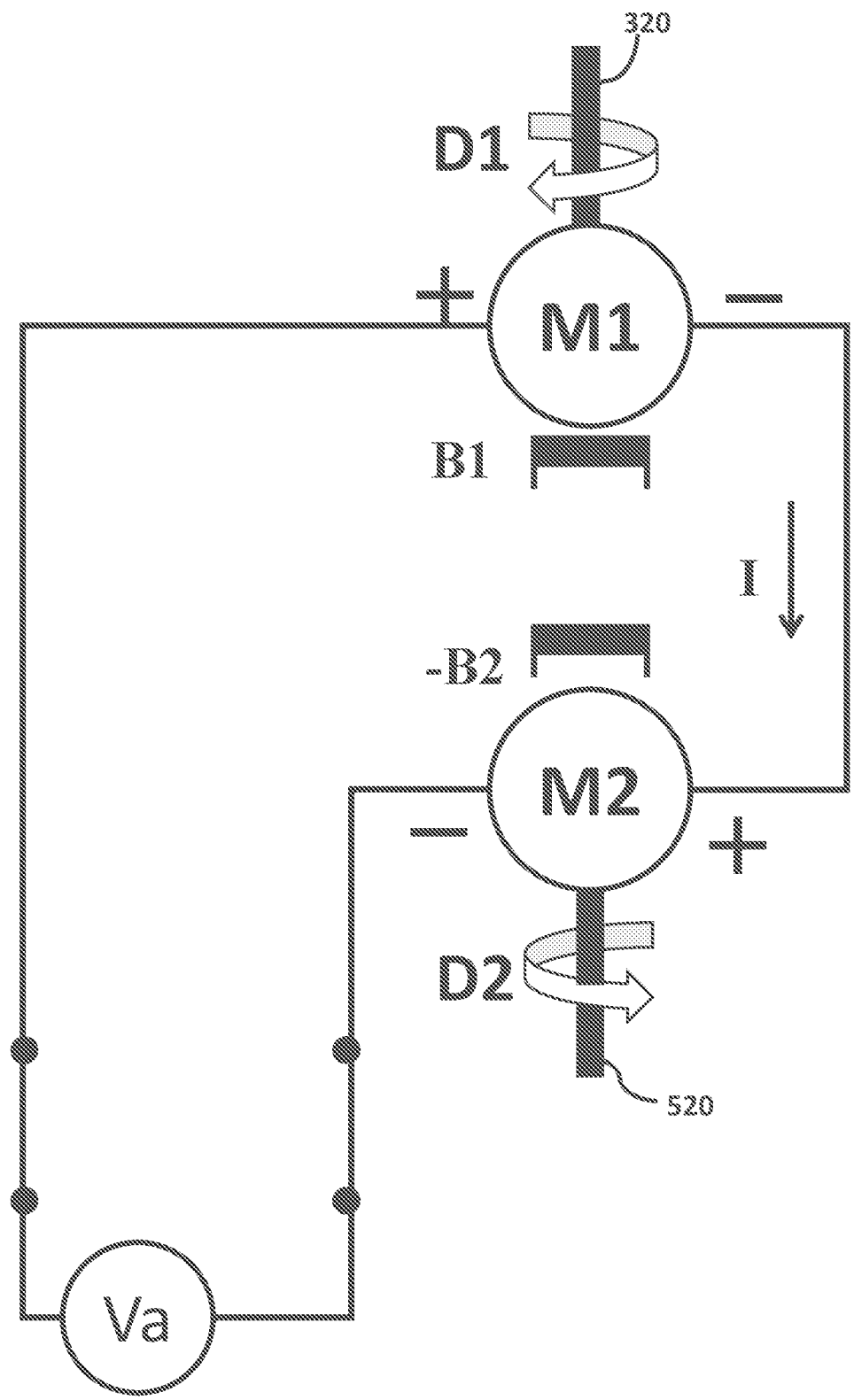
FIG. 2D is an equivalent circuit diagram of the DC dynamo 20, 20' and 20" of the embodiments 4, 5, and 6 according to this present invention.
Figure 2D:
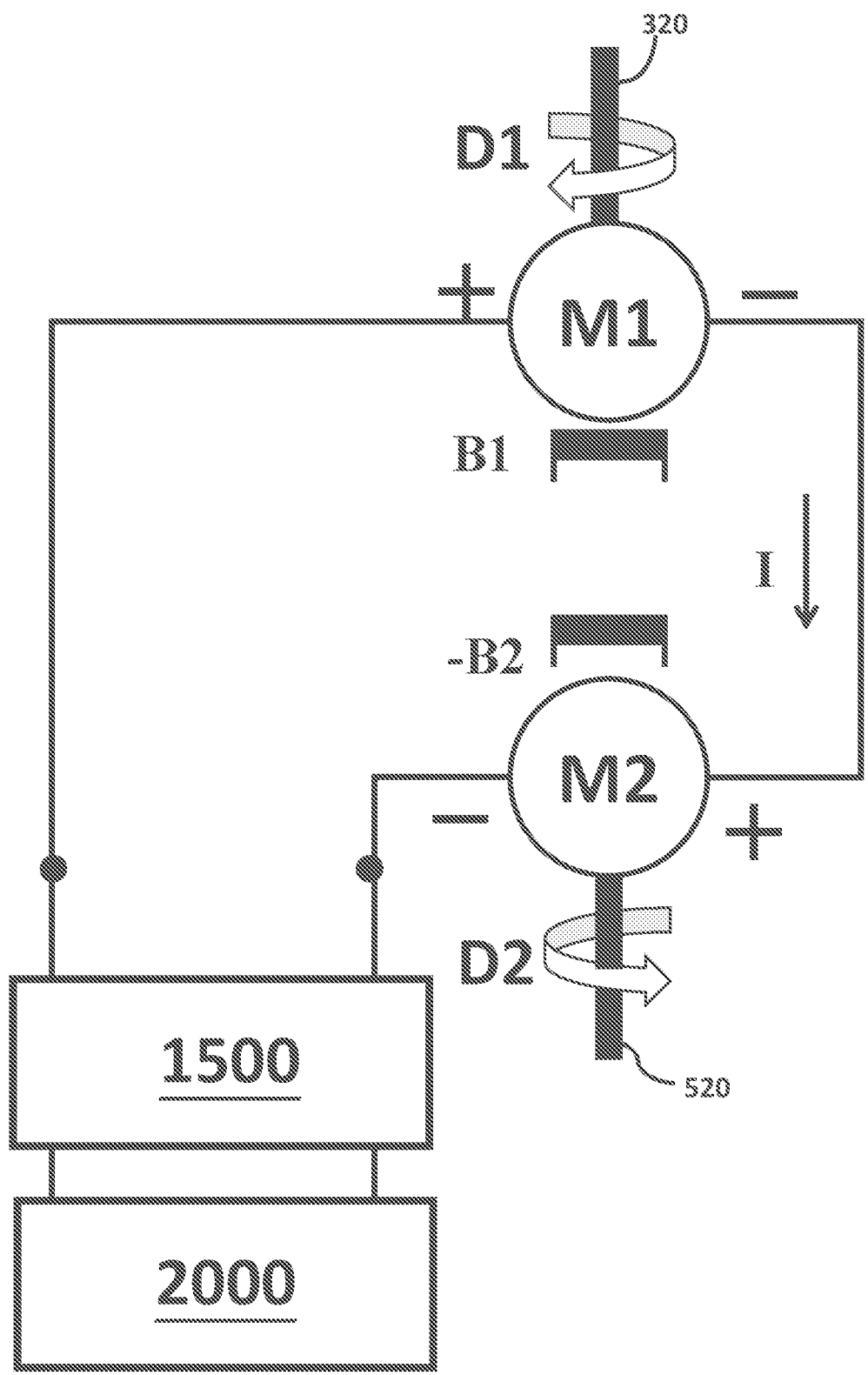

As the equivalent diagram shown in FIG. 2D, when one of the armature electrodes (not labeled) with a substantially same polarity of electromotive force electrically interconnecting the armature coils 290 and an outer system (not shown) for example but not limited to terminal interconnect the armature coils 290 and a power supply Va, the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with the same direction D1 and contribute to carry the first rotation axis 320 and the second rotation axis 520 to rotate along with the same direction D1. The output rotation speeds of the DC motor M1 and the DC motor M2 can be changed by controlling the first rotation axis 320 and the second rotation axis 520 by adjusting the amplitude of the first magnetic field B1 and the amplitude of the second magnetic field B2.

As the equivalent circuit diagram shown in FIG. 2D', when one of the armature electrodes (not labeled) with a substantially same polarity of electromotive force electrically interconnecting the armature coils 290 and an outer system (not shown) for example but not limited to a control module 1500 and a battery module 2000 connected to the control module 1500, the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with the same first direction D1 driven by the batter module 2000 under the operation of the control module 1500 and contribute to carry the first rotation axis 320 and the second rotation axis 520 to rotate along with the same first direction D1. The output rotation speeds of the DC motor M1 and the DC motor M2 can be changed by controlling the first rotation axis 320 and the second rotation axis 520 by adjusting the amplitude of the first magnetic field B1 and the amplitude of the second magnetic field B2

Next, please refer to FIG. 2C' illustrating a cross-sectional view of the DC dynamo 20' of the embodiments 5 along with the sectional line II-II'. As shown in FIG. 2C', the structure of the DC dynamo 20' is similar to the DC dynamo 20, the main difference therebetween is the first permanent magnet 600 and the second permanent magnet 650 of the DC dynamo 20' are used to replace the first electromagnetic coil 400 and the second electromagnetic coil 450 of DC dynamo 20 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 2C, almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 20' of Embodiment 5 can act as a first DC motor M1, and the second magnetic mechanism 500, the second permanent magnet 650, and one of the armature coils 290 in the second side (not labeled) of the armature apparatus 200 of the DC dynamo 20' of Embodiment 5 can act as a second DC motor M2, and M1 and M2 are connected in series. The equivalent circuit diagrams corresponding thereof are illustrated as that shown in FIG. 2D and FIG. 2D'.

Moreover, the DC dynamo 20' of the embodiment 5 of this invention can also act as a DC motor as described in above-mentioned embodiment 4, so repeated description is omitted.

Next, please refer to FIG. 2C'' illustrating a cross-sectional view of the DC dynamo 20'' of the embodiments 6 along with the sectional line II-II'. As shown in FIG. 2C'', the structure of the DC dynamo 20'' is similar to the DC dynamos 20 and 20', the main difference therebetween is the first electromagnetic coil 400, the second electromagnetic coil 450 of the DC dynamo 20 and the first permanent magnet 600, the second permanent magnet 650 of the DC dynamo 20' are used to generate the first magnetic field B1 and the second magnetic field B2. As shown in FIG. 2C'', almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first electromagnetic coil 400, the first permanent magnet 600, and one of the armature coils 290 in the first side (not labeled) of the armature apparatus 200 of the DC dynamo 20'' of Embodiment 6 can act as a first DC motor M1, and the second magnetic mechanism 500, the second electromagnetic coil 450, the second permanent magnet 650, and one of the armature coils 290 in the second side (not labeled) of the armature apparatus 200 of the DC dynamo 20'' of Embodiment 6 can act as a second DC motor M2, and M1 and M2 are connected in series. The equivalent circuit diagrams corresponding thereof are illustrated as that shown in FIG. 2D and FIG. 2D'.

Moreover, the DC dynamo 20'' of the embodiment 6 of this invention can also act as DC motors as described in above-mentioned embodiments 5 and 6, so repeated description is omitted.

The armature apparatuses 200 of the DC dynamo 20. 20' and 210'' of the embodiments 4, 5 and 6 according to this invention are stators, and the first magnetic mechanism 300 and the second magnetic mechanism 500 are rotors. Alternatively, the armature apparatuses 200 of the DC dynamo 20. 20' and 20'' of other embodiments according to this invention are rotors, and the first magnetic mechanism 300 and the second magnetic mechanism 500 are stators.

The first and the second central areas 310, 510 of the first and the second magnetic mechanisms 300, 500 of the DC dynamos 20. 20' and 20'' of the embodiments 4, 5 and 6 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 20. 20' and 20" of the embodiments 4, 5 and 6 according to this invention rotate relatively to the armature apparatus 200 thereof.

The first and the second central areas 310, 510 of the first and the second magnetic mechanisms 300, 500 of the DC dynamos 20. 20' and 20" of the embodiments 1, 2 and 3 according to this invention can further comprise a plurality of balls (not shown) placed between the first rotation axis 320 and the first bearing 370, and the second rotation axis 520 and the second bearing 570.

Embodiments 7, 8 and 9

Figure 3A:
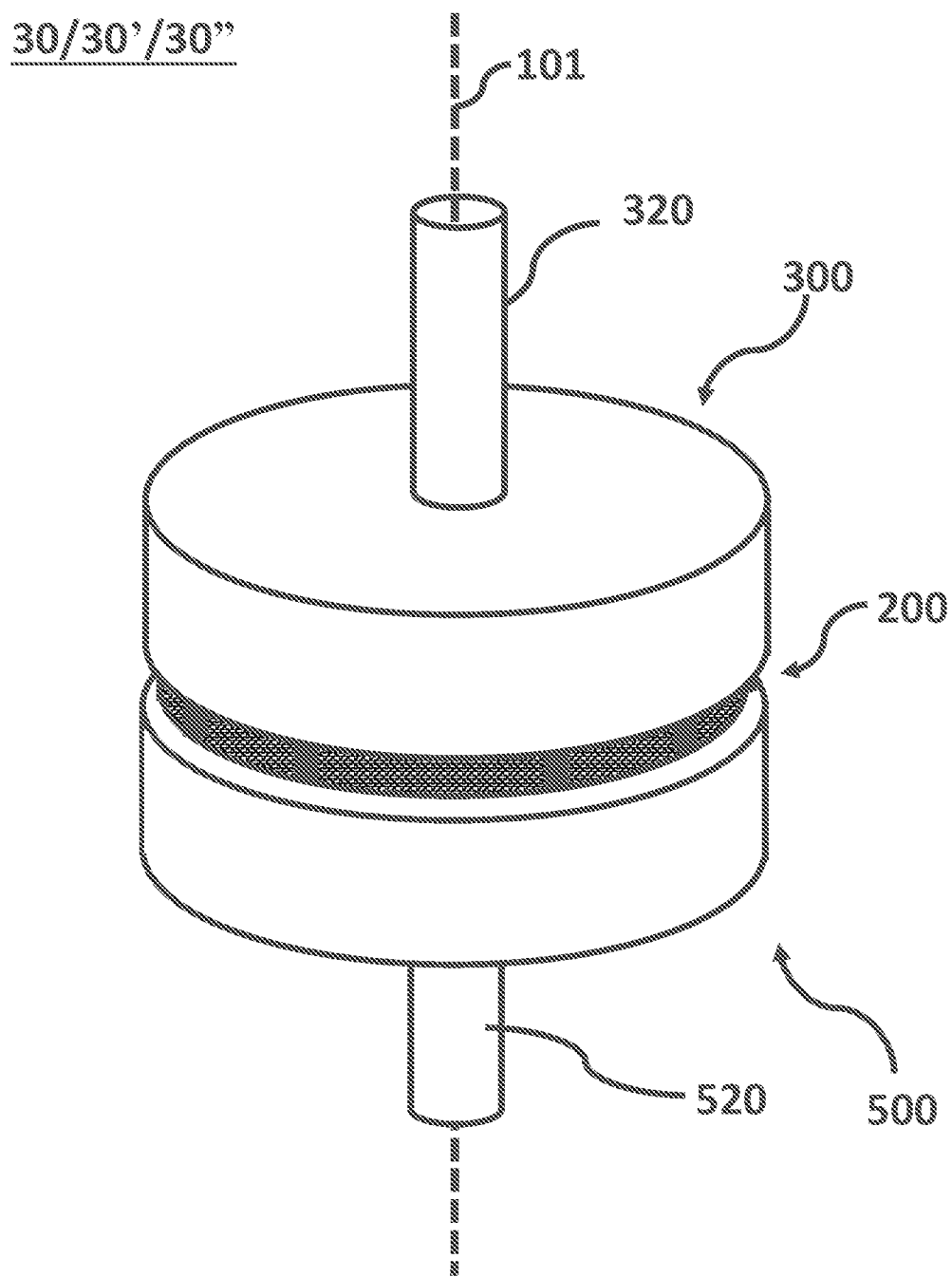
FIG. 3A is a stereoscopic assembly drawing of the DC dynamo 30, 30' and 30" of the embodiments 7, 8, and 9 according to this present invention.

First, please refer to FIG. 3A illustrating a stereoscopic assembly drawing of the DC dynamo 30, 30' and 30" of the embodiments 7, 8 and 9 according to this present invention, and FIG. 2B illustrating a stereoscopic exploded drawing of the DC dynamo 20, 20' and 20" as shown in FIG. 2A.

Figure 3B:
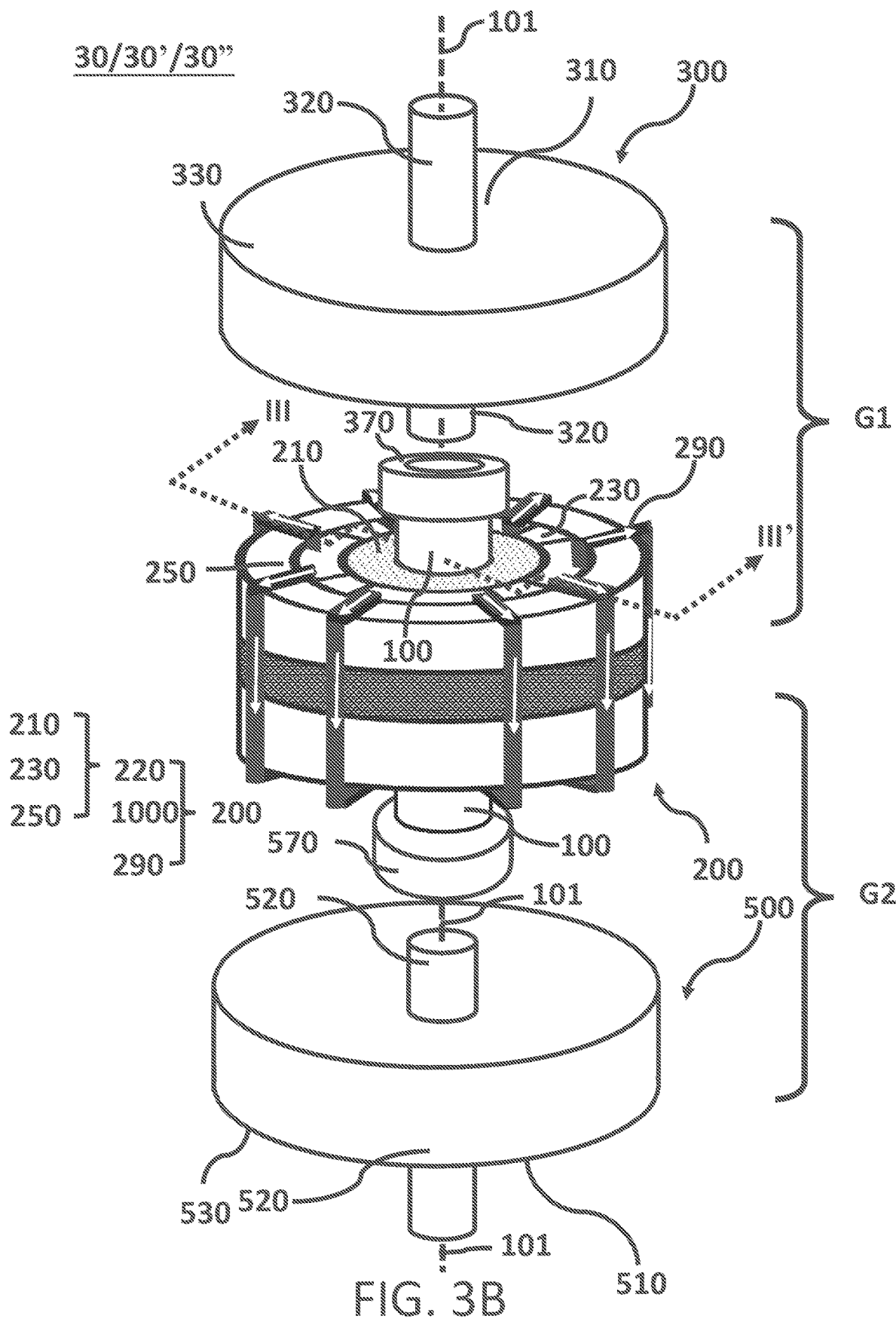
FIG. 3B is a stereoscopic exploded drawing of the DC dynamo 30, 30' and 30" as shown in FIG. 3A.

As shown in FIG. 3A and FIG. 3B, structures of the DC dynamos 30, 30' and 30" of embodiments 7, 8 and 9 are similar to the DC dynamos 10, 10' and 10" of the embodiments 1, 2 and 3, but the DC dynamos 30, 30' and 30" of embodiments 7, 8 and 9 acts as DC generators, therefore repeated descriptions are omitted.

Figure 3C:
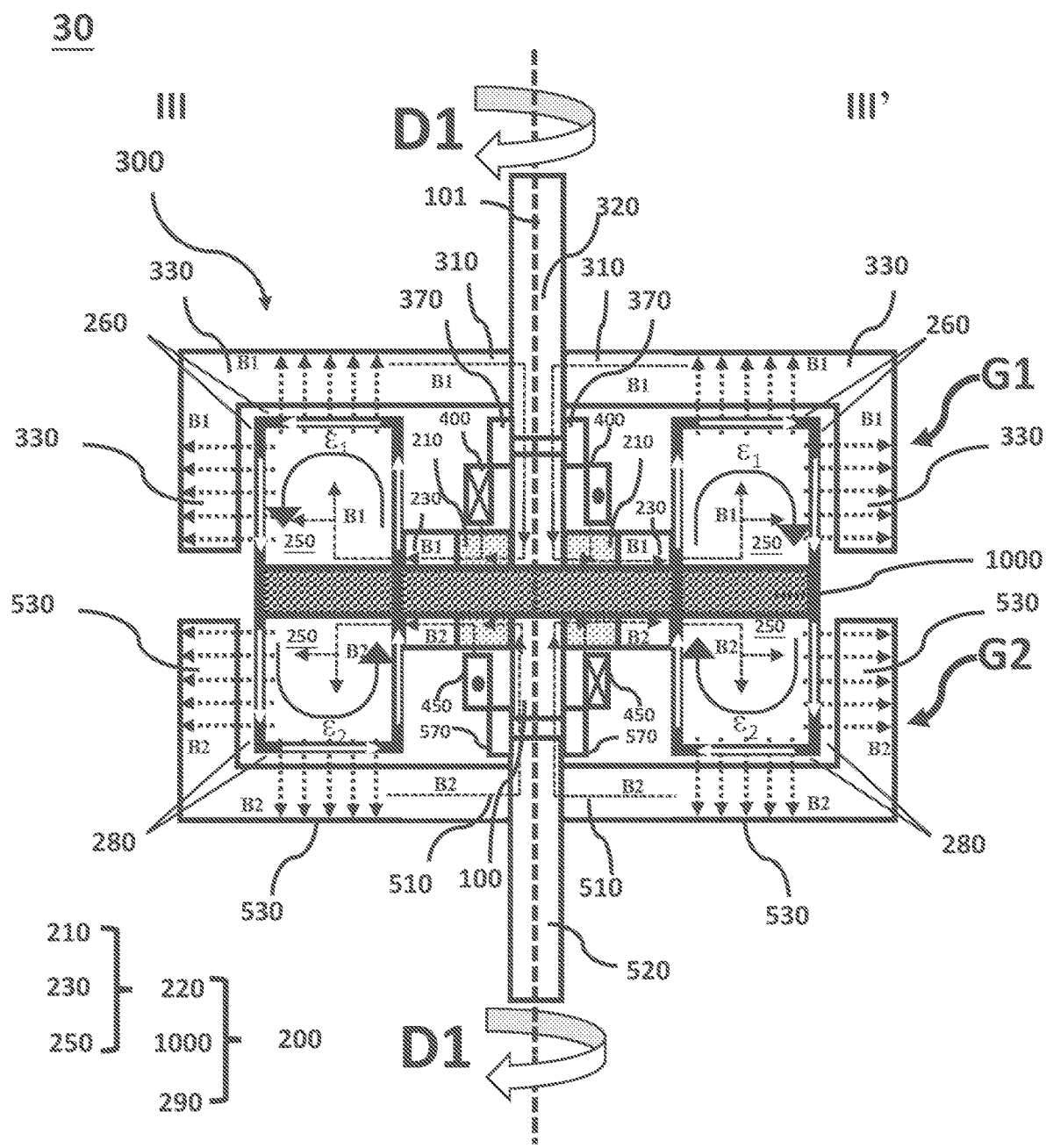
FIG. 3C is a cross-sectional view of the DC dynamo 30 of the embodiments 7 along with the sectional line as shown in FIG. 3B.
Figure 3C:
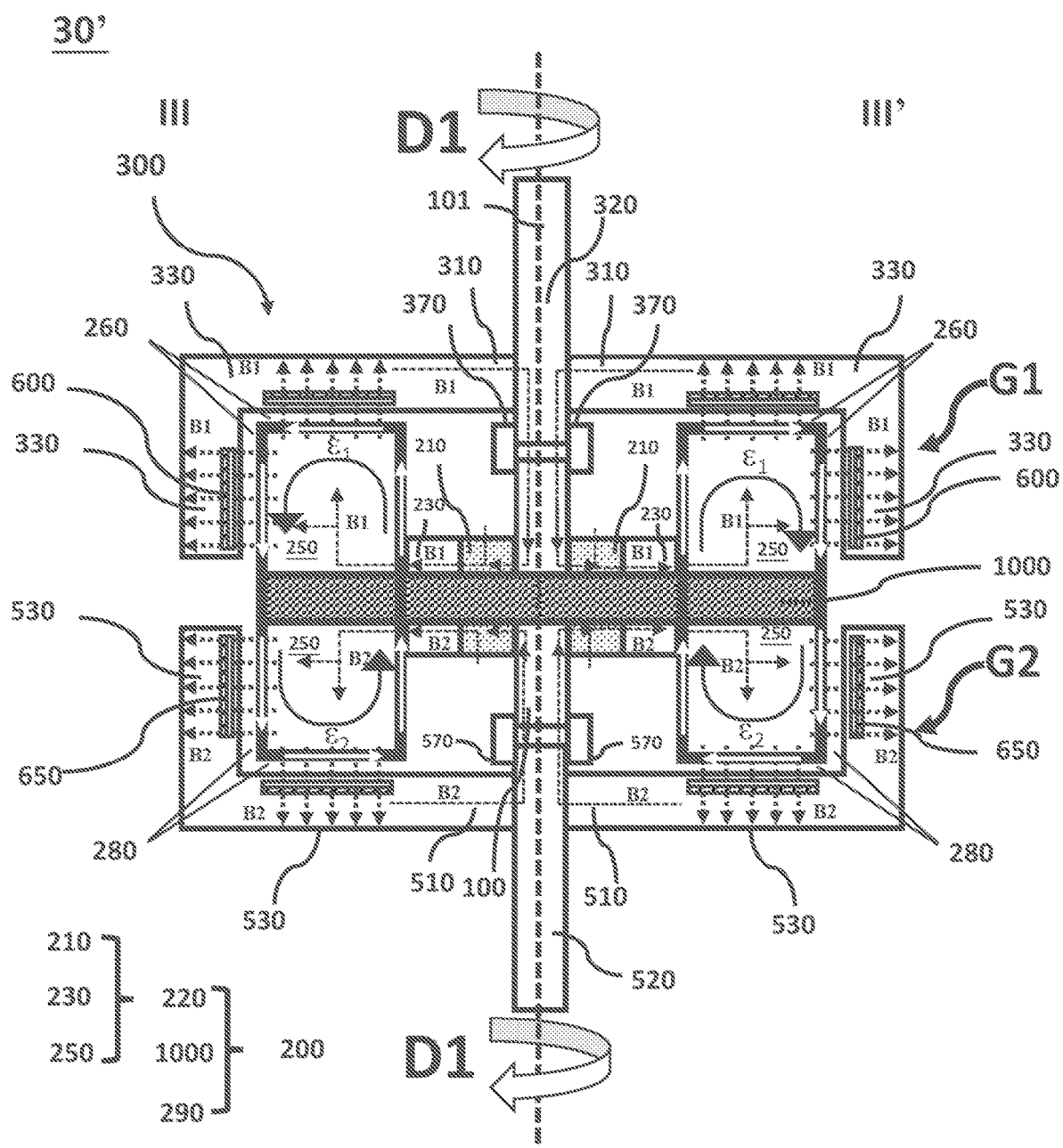
Figure 3C:
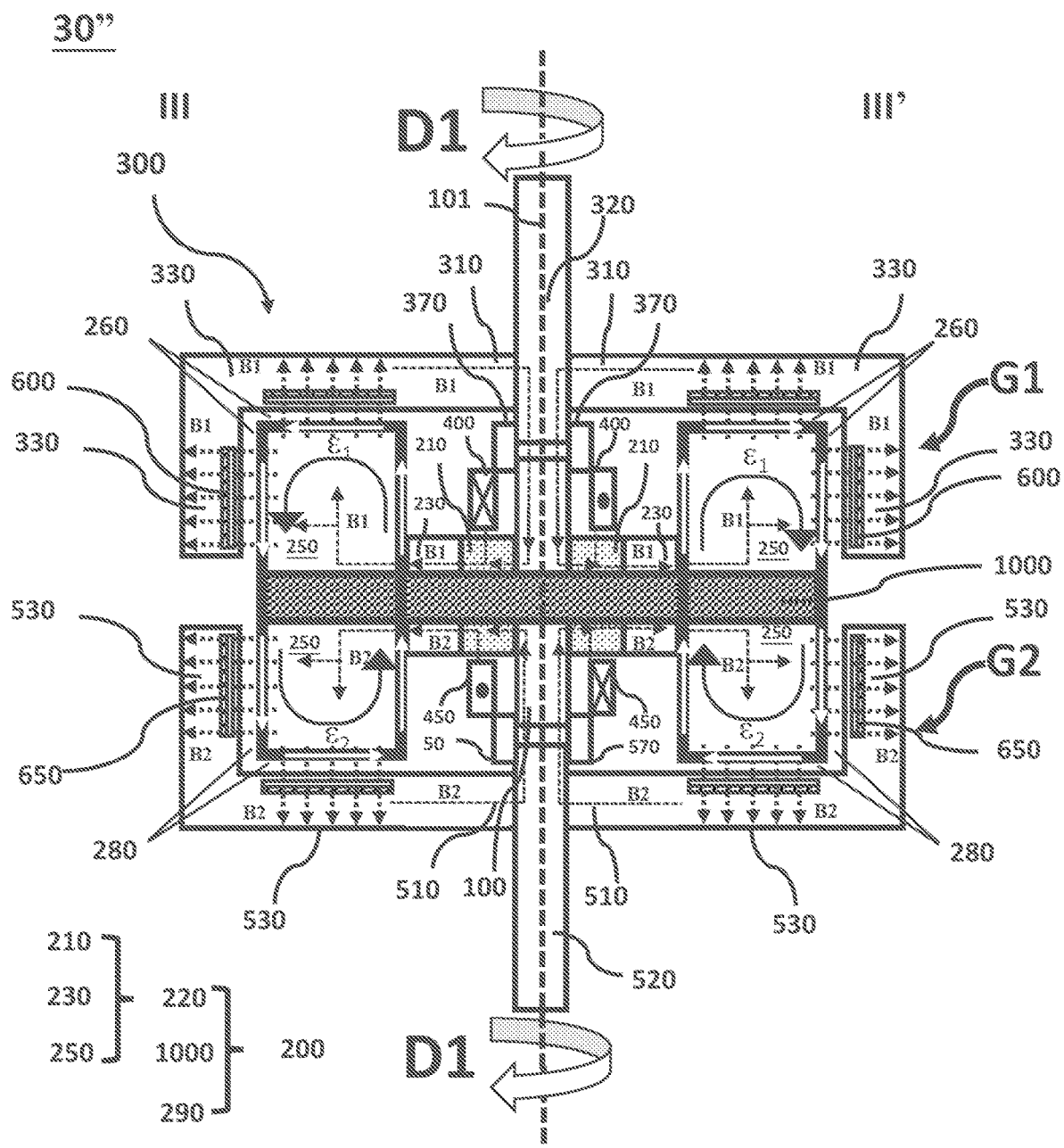

First, please refer to FIG. 3C illustrating a cross-sectional view of the DC dynamo 30 of the embodiments 7 along with the sectional line II-II'. As shown in FIG. 3C, the DC dynamo 30 of the embodiment 7, wherein almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500, thereby the first magnetic mechanism 300 and the second magnetic mechanism 500 can be driven to rotate relatively to the virtual axis 101 along with the first direction D1. When observing from the longitudinal section of the virtual axis 101, and one of the armature coils 290 in the first side (not labeled) and the second side (not labeled) adjacent to the first air gap 260 and the second air gap 280 move inward relatively to the right side of the longitudinal section of the virtual axis 101 and move outward relatively to the left side of the longitudinal section of the virtual axis 101. A clockwise induced electromotive force $\varepsilon_1$ can be induced by the armature coils 290 in the first side (not labeled) of the armature apparatus 200 and a clockwise induced electromotive force $\varepsilon_2$ can be induced by the armature coils 290 in the second side (not labeled) of the armature apparatus 200 when observing from the right side of longitudinal section of the virtual axis 101 based on the Fleming's left hand rule, and a counterclockwise induced electromotive force $\varepsilon_1$ can be induced by the armature coils 290 in the first side (not labeled) of the armature apparatus 200 and a counterclockwise induced electromotive force $\varepsilon_2$ can be induced by the armature coils 290 in the second side (not labeled) of the armature apparatus 200 when observing from the right side of longitudinal section of the virtual axis 101 based on the Fleming's left hand rule. Moreover, the first magnetic mechanism 300, the first electromagnetic coil 400, and one of the armature coils 290 in the first side (not labeled) of the armature apparatus 200 of the DC dynamo 30 of Embodiment 7 can act as a first DC generator G1, and the second magnetic mechanism 500, the second electromagnetic coil 450, and one of the armature coils 290 in the second side (not labeled) of the armature apparatus 200 of the DC dynamo 30 of Embodiment 7 can act as a second DC generator G2, and G1 and G2 are connected in series. The equivalent circuit diagrams corresponding thereof are illustrated as that shown in FIG. 3D and FIG. 3D'.

Figure 3D:
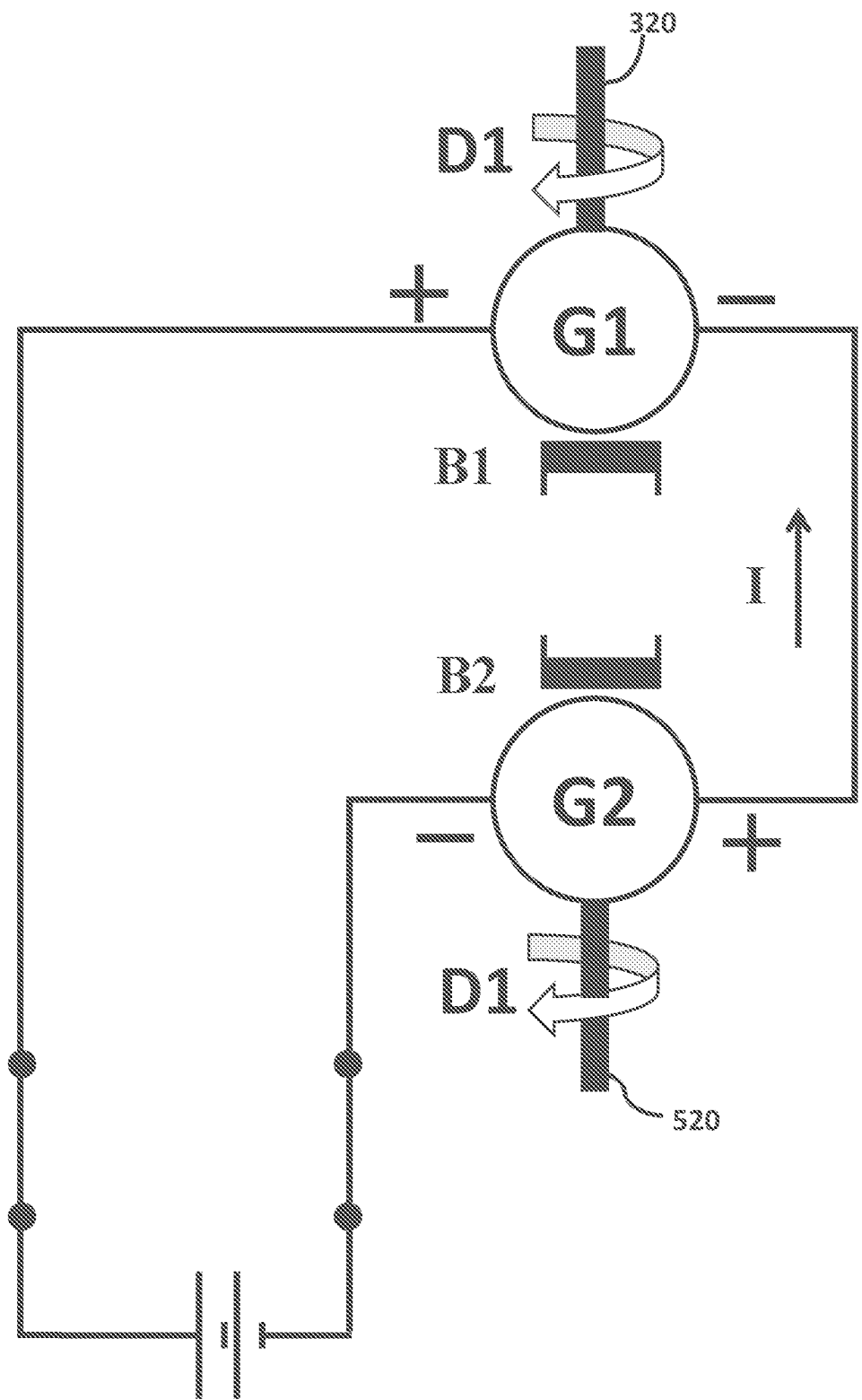
FIG. 3D is an equivalent circuit diagram of the DC dynamo 30, 30' and 30" of the embodiments 7, 8, and 9 according to this present invention.
Figure 3D:
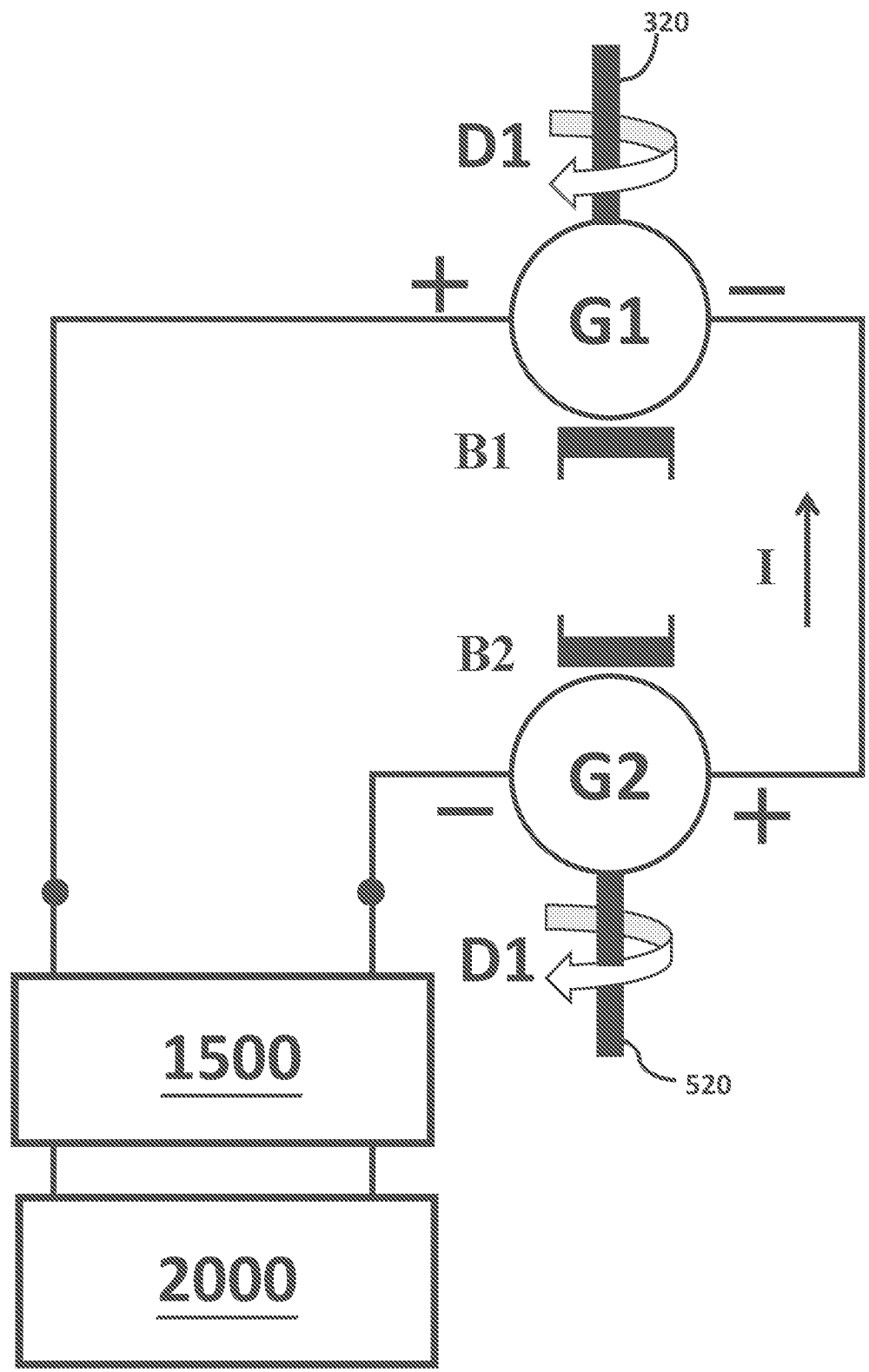

As the equivalent diagram shown in FIG. 3D, when one of the armature electrodes (not labeled) with a substantially same polarity of electromotive force electrically interconnecting the armature coils 290 and an outer system (not shown) for example but not limited to a battery module 2000, and the battery module 2000 can be charged by the first induced electromotive force $\varepsilon_1$ generated by the first DC generator G1 and the second induced electromotive force $\varepsilon_2$ generated by the second DC generator G2.

As the equivalent diagram shown in FIG. 3D', when one of the armature electrodes (not labeled) with a substantially same polarity of electromotive force electrically interconnecting the armature coils 290 and an outer system (not shown) for example but not limited to a control module 1500 and a battery module 2000, and the battery module 2000 can be charged by the first induced electromotive force $\varepsilon_1$ generated by the first DC generator G1 and the second induced electromotive force $\varepsilon_2$ generated by the second DC generator G2 under the operation of the control module 1500.

Next, please refer to FIG. 3C' illustrating a cross-sectional view of the DC dynamo 30' of the embodiments 8 along with the sectional line II-II'. As shown in FIG. 3C', the DC dynamo 30' acts as a DC generator, and the structure of the DC dynamo 30' is similar to the DC dynamo 30 of the embodiment 7, and the main difference therebetween is the first permanent magnet 600 and the second permanent magnet 650 of the DC dynamo 30' are used to replace the first electromagnetic coil 400 and the second electromagnetic coil 450 of DC dynamo 30 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 3C', almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 30' of Embodiment 8 can act as a first DC generator G1, and the second magnetic mechanism 500, the second permanent magnet 650, and one of the armature coils 290 in the second side (not labeled) of the armature apparatus 200 of the DC dynamo 30' of Embodiment 8 can act as a second DC generator G2, and G1 and G2 are connected in series. The equivalent circuit diagrams corresponding thereof are illustrated as that shown in FIG. 3D and FIG. 3D'.

Moreover, the DC dynamo 30' of the embodiment 8 of this invention can also act as a DC generator as described in above-mentioned embodiment 7, so repeated description is omitted.

Next, please refer to FIG. 3C'' illustrating a cross-sectional view of the DC dynamo 30'' of the embodiments 9 along with the sectional line II-II'. As shown in FIG. 3C'', the DC dynamo of embodiment 9 acts as a DC generator, and the structure of the DC dynamo 30'' is similar to the DC dynamos 30 and 30', the main difference therebetween is the first electromagnetic coil 400, the second electromagnetic coil 450 of the DC dynamo 30 and the first permanent magnet 600, the second permanent magnet 650 of the DC dynamo 30' are used to generate the first magnetic field B1 and the second magnetic field B2. As shown in FIG. 3C'', almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first electromagnetic coil 400, the first permanent magnet 600, and one of the armature coils 290 in the first side (not labeled) of the armature apparatus 200 of the DC dynamo 30'' of Embodiment 9 can act as a first DC generator G1, and the second magnetic mechanism 500, the second electromagnetic coil 450, the second permanent magnet 650, and one of the armature coils 290 in the second side (not labeled) of the armature apparatus 200 of the DC dynamo 30'' of Embodiment 9 can act as a second DC generator G2, and G1 and G2 are connected in series. The equivalent circuit diagrams corresponding thereof are illustrated as that shown in FIG. 3D and FIG. 3D'.

Moreover, the DC dynamo 30'' of the embodiment 9 of this invention can also act as a DC generator as described in above-mentioned embodiments 7 and 8, so repeated description is omitted.

The armature apparatuses 200 of the DC dynamo 20. 20' and 210'' of the embodiments 4, 5 and 6 according to this invention are stators, and the first magnetic mechanism 300 and the second magnetic mechanism 500 are rotors. Alternatively, the armature apparatuses 200 of the DC dynamo 20. 20' and 20'' of other embodiments according to this invention are rotors, and the first magnetic mechanism 300 and the second magnetic mechanism 500 are stators.

The first and the second central areas 310, 510 of the first and the second magnetic mechanisms 300, 500 of the DC dynamos 30. 30' and 30'' of the embodiments 7, 8 and 9 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 30. 30' and 30'' of the embodiments 7, 8 and 9 according to this invention rotate relatively to the armature apparatus 200 thereof.

The first and the second central areas 310, 510 of the first and the second magnetic mechanisms 300, 500 of the DC dynamos 30. 30' and 30'' of the embodiments 7, 8 and 9 according to this invention can further comprise a plurality of balls (not shown) placed between the first rotation axis 320 and the first bearing 370, and the second rotation axis 520 and the second bearing 570.

Embodiments 10, 11 and 12

Figure 4A:
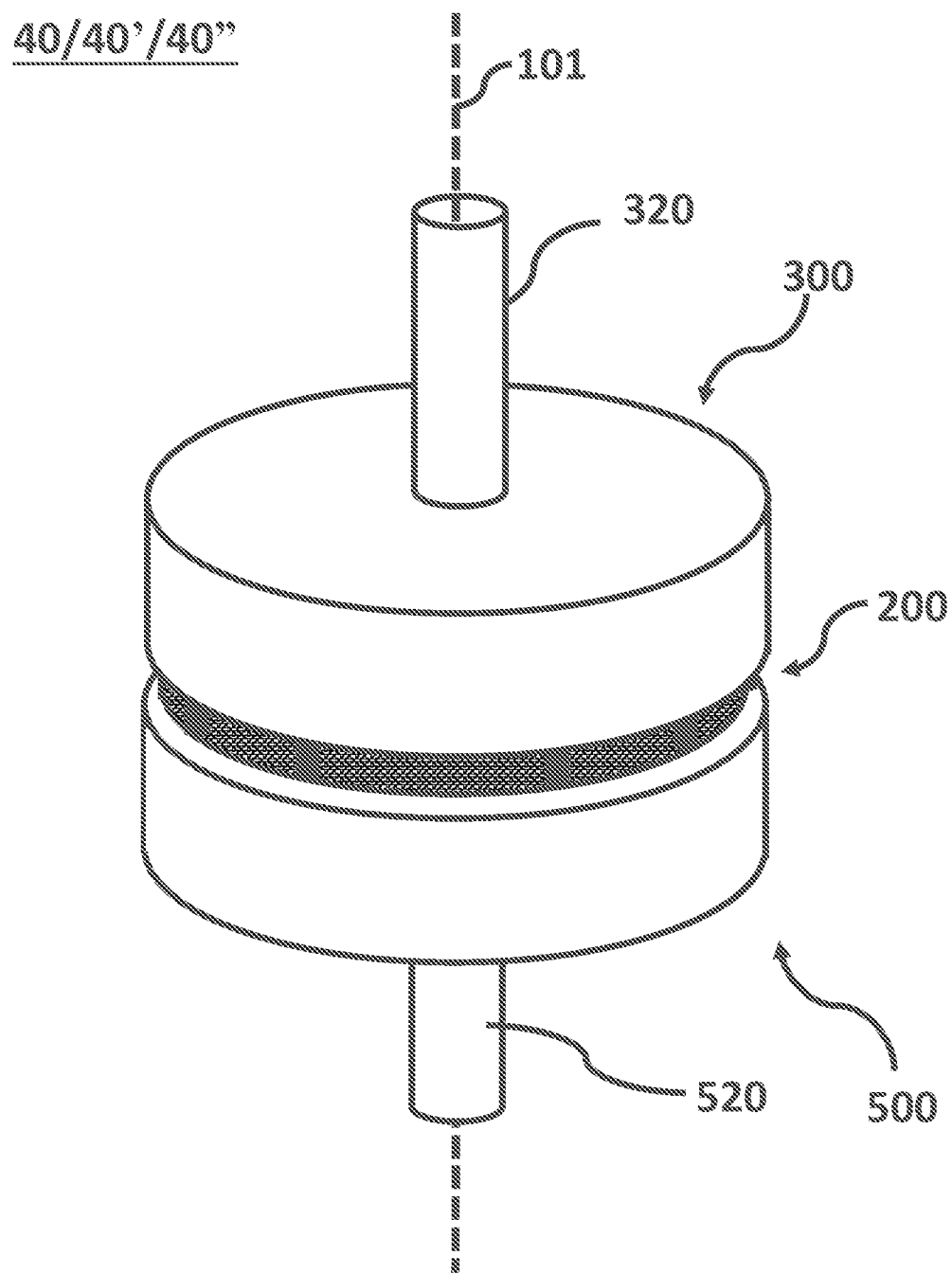
FIG. 4A is a stereoscopic assembly drawing of the DC dynamo 40, 40' and 40" of the embodiments 10, 11, and 12 according to this present invention.
Figure 4B:
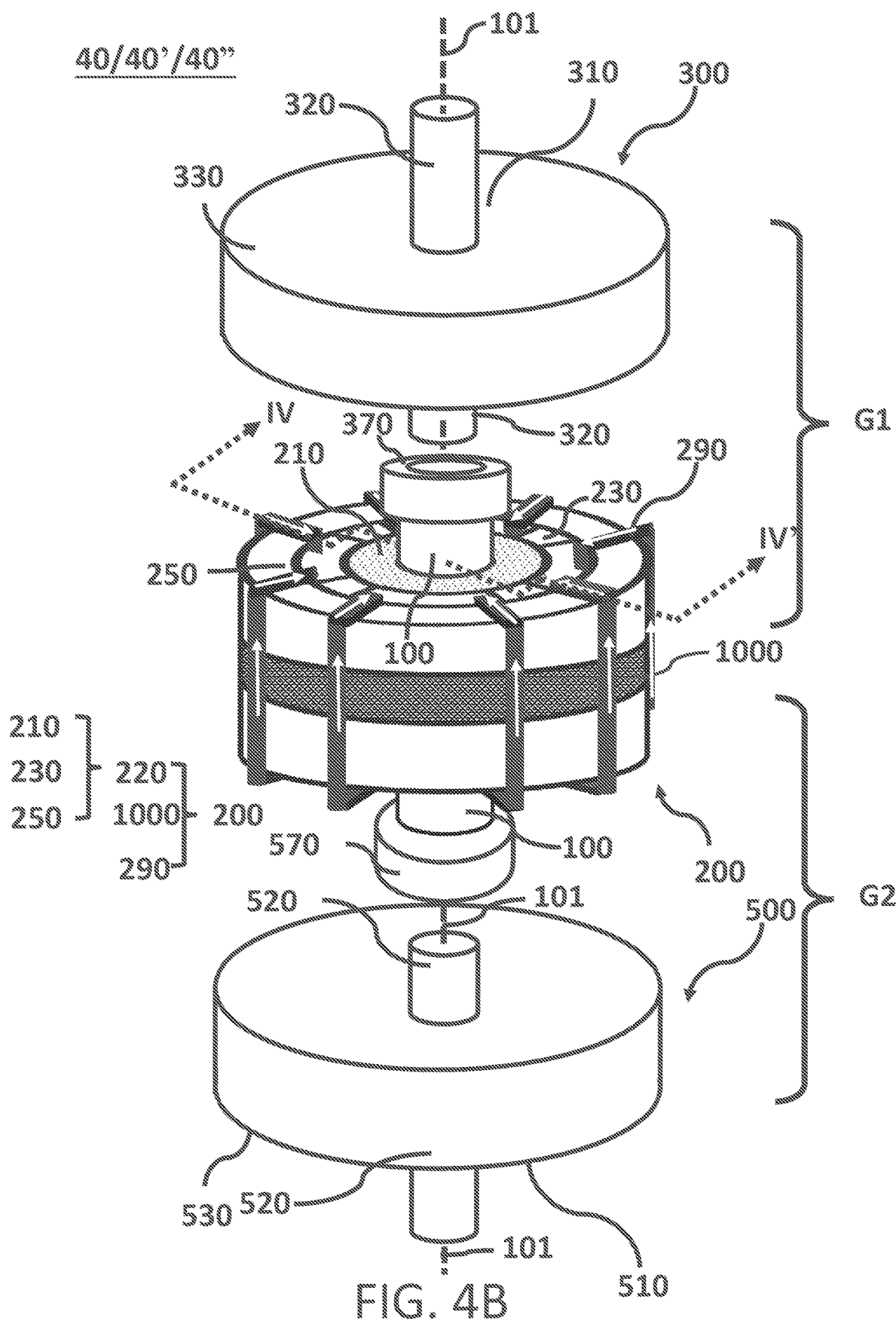
FIG. 4B is a stereoscopic exploded drawing of the DC dynamo 40, 40' and 40" as shown in FIG. 4A.

First, please refer to FIG. 4A illustrating a stereoscopic assembly drawing of the DC dynamo 40, 40' and 40'' of the embodiments 10, 11 and 12 according to this present invention, and FIG. 4B illustrating a stereoscopic exploded drawing of the DC dynamo 40, 40' and 40'' as shown in FIG. 4A.

As shown in FIG. 4A and FIG. 4B, structures of the DC dynamos 40, 40' and 40'' of embodiments 10, 11 and 12 are similar to the DC dynamos 30, 30' and 30'' of the embodiments 7, 8 and 10, and the DC dynamos 40, 40' and 40'' of embodiments 10, 11 and 12 acts as DC generators, the main difference therebetween is almost all of the first magnetic lines of flux of the first magnetic field B1 substantially and orthogonally pass through the first air gap 260 from the first peripheral area 330 of the first magnetic mechanism 300 to the armature coils 290 in the first side (not labeled) of the armature apparatus 200, and almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

Figure 4C:
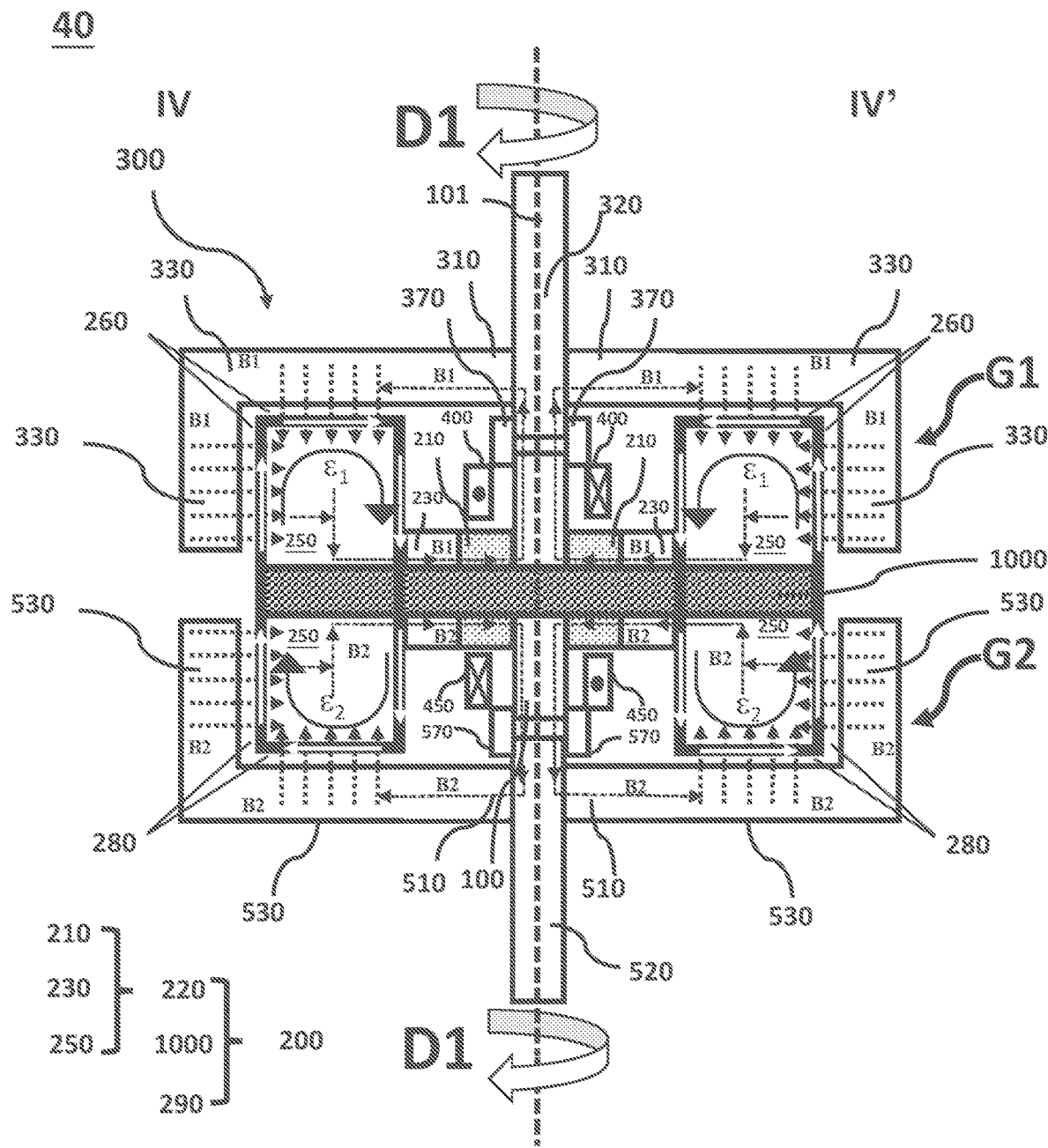
FIG. 4C is a cross-sectional view of the DC dynamo 40 of the embodiments 10 along with the sectional line IV-IV' as shown in FIG. 4B.
Figure 4C:
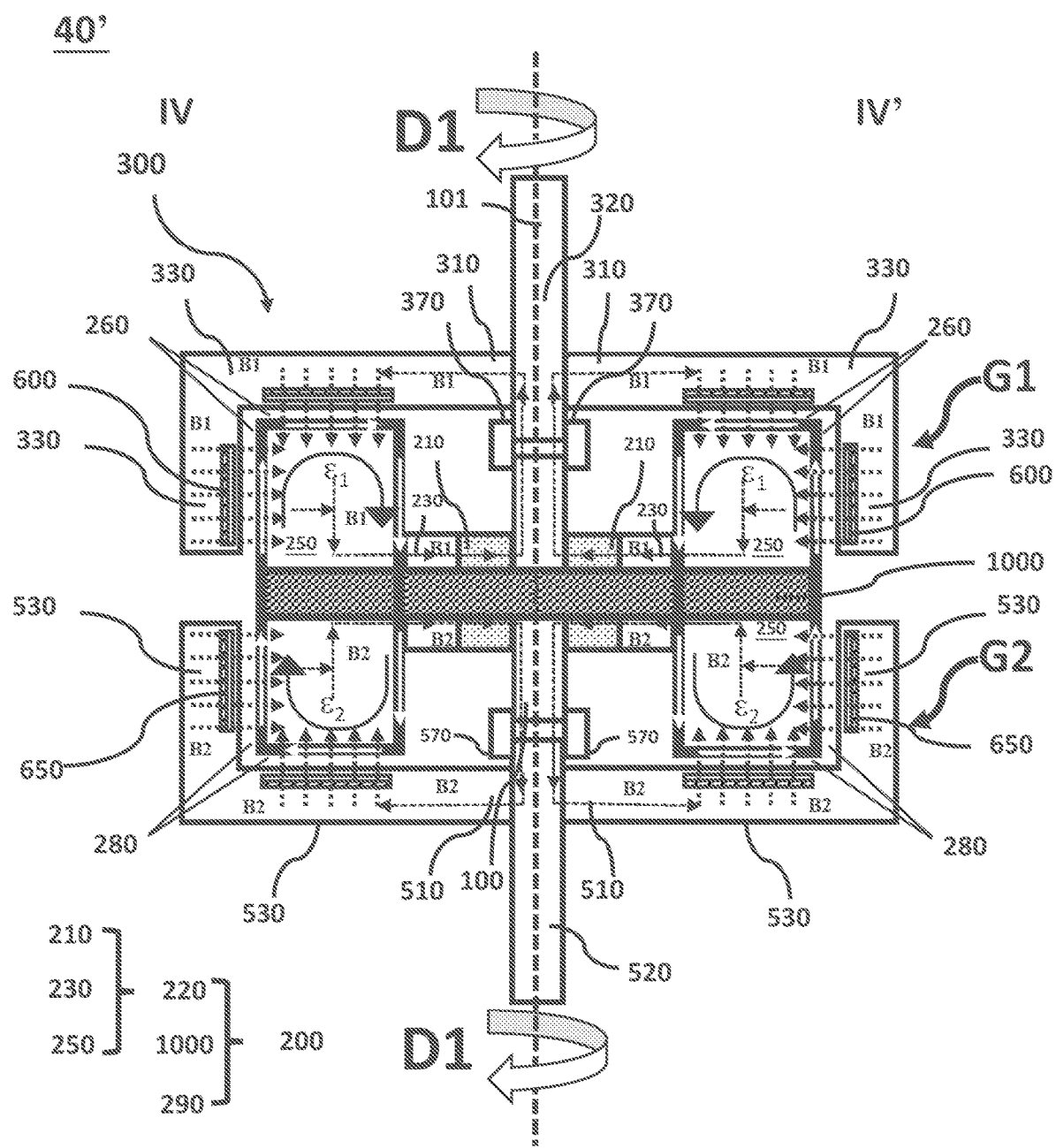

Please refer to FIG. 4C illustrating a cross-sectional view of the DC dynamo 40 of the embodiments 10 along with the sectional line IV-IV' of FIG. 4B. As shown in FIG. 4C, the DC dynamo 40 of the embodiment 10 acts as a DC generator, wherein almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500, thereby the first magnetic mechanism 300 and the second magnetic mechanism 500 can be driven to rotate relatively to the virtual axis 101 along with the first direction D1. When observing from the longitudinal section of the virtual axis 101, and one of the armature coils 290 in the first side (not labeled) and the second side (not labeled) adjacent to the first air gap 260 and the second air gap 280 move inward relatively to the right side of the longitudinal section of the virtual axis 101 and move outward relatively to the left side of the longitudinal section of the virtual axis 101. A counterclockwise induced electromotive force $\varepsilon_1$ can be induced by the armature coils 290 in the first side (not labeled) of the armature apparatus 200 and a counter clockwise induced electromotive force $\varepsilon_2$ can be induced by the armature coils 290 in the second side (not labeled) of the armature apparatus 200 when observing from the right side of longitudinal section of the virtual axis 101 based on the Fleming's left hand rule, and a clockwise induced electromotive force $\varepsilon_1$ can be induced by the armature coils 290 in the first side (not labeled) of the armature apparatus 200 and a clockwise induced electromotive force $\varepsilon_2$ can be induced by the armature coils 290 in the second side (not labeled) of the armature apparatus 200 when observing from the right side of longitudinal section of the virtual axis 101 based on the Fleming's left hand rule. Moreover, the first magnetic mechanism 300, the first electromagnetic coil 400, and one of the armature coils 290 in the first side (not labeled) of the armature apparatus 200 of the DC dynamo 40 of Embodiment 10 can act as a first DC generator G1, and the second magnetic mechanism 500, the second electromagnetic coil 450, and one of the armature coils 290 in the second side (not labeled) of the armature apparatus 200 of the DC dynamo 40 of Embodiment 10 can act as a second DC generator G2, and G1 and G2 are connected in series. The equivalent circuit diagrams corresponding thereof are illustrated as that shown in FIG. 4D and FIG. 4D'.

Figure 4D:
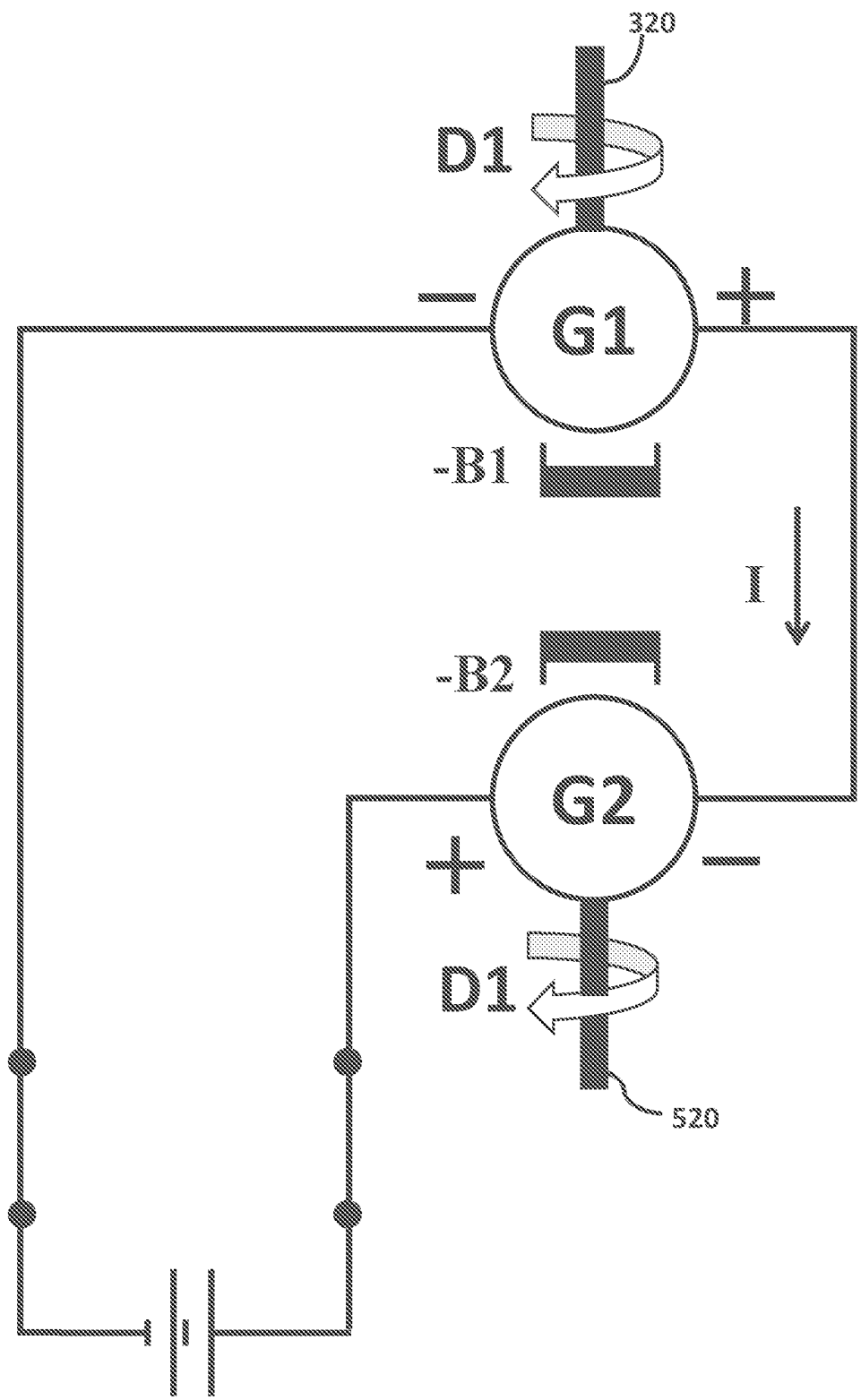
FIG. 4D is an equivalent circuit diagram of the DC dynamo 40, 40' and 40" of the embodiments 10, 11, and 12 according to this present invention.
Figure 4D:
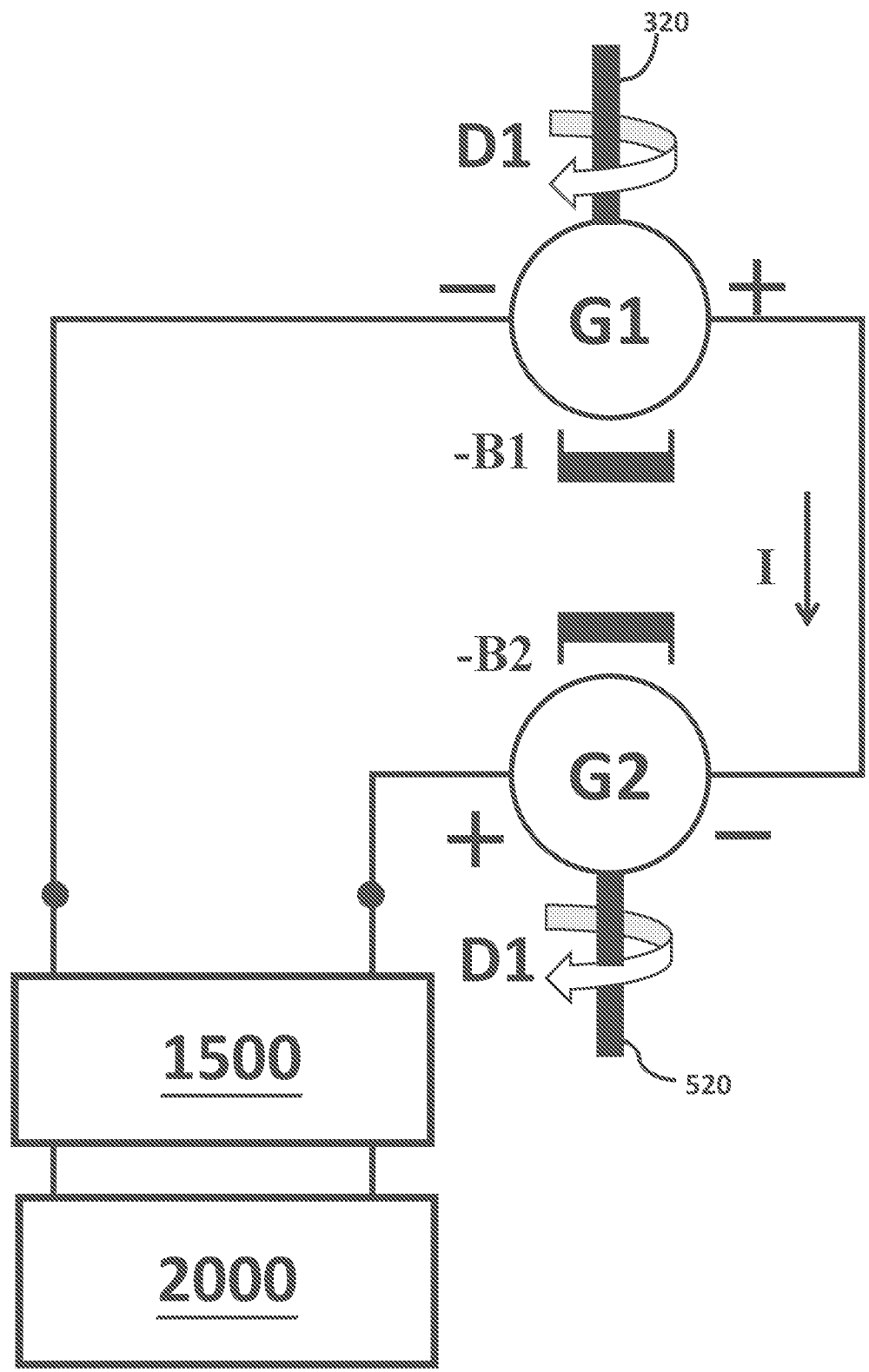

As the equivalent diagram shown in FIG. 4D, when one of the armature electrodes (not labeled) with a substantially same polarity of electromotive force electrically interconnecting the armature coils 290 and an outer system (not shown) for example but not limited to a battery module 2000, and the battery module 2000 can be charged by the first induced electromotive force $\varepsilon_1$ generated by the first DC generator G1 and the second induced electromotive force $\varepsilon_2$ generated by the second DC generator G2.

As the equivalent diagram shown in FIG. 4D', when one of the armature electrodes (not labeled) with a substantially same polarity of electromotive force electrically interconnecting the armature coils 290 and an outer system (not shown) for example but not limited to a control module 1500 and a battery module 2000, and the battery module 2000 can be charged by the first induced electromotive force $\varepsilon_1$ generated by the first DC generator G1 and the second induced electromotive force $\varepsilon_2$ generated by the second DC generator G2 under the operation of the control module 1500.

Next, please refer to FIG. 4C' illustrating a cross-sectional view of the DC dynamo 40' of the embodiments 11 along with the sectional line IV-IV'. As shown in FIG. 4C', the DC dynamo 40' acts as a DC generator, and the structure of the DC dynamo 40' is similar to the DC dynamo 40 of the embodiment 10, and the main difference therebetween is the first permanent magnet 600 and the second permanent magnet 650 of the DC dynamo 40' are used to replace the first electromagnetic coil 400 and the second electromagnetic coil 450 of DC dynamo 40 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 4C', almost all of the first magnetic lines of flux of the first magnetic field B1 substantially and orthogonally pass through the first air gap 260 from the first peripheral area 330 of the first magnetic mechanism 300 to the armature coils 290 in the first side (not labeled) of the armature apparatus 200, and almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

The first magnetic mechanism 300, the first permanent magnet 600, and one of the armature coils 290 in the first side (not labeled) of the armature apparatus 200 of the DC dynamo 40' of Embodiment 11 can act as a first DC generator G1, and the second magnetic mechanism 500, the second permanent magnet 650, and one of the armature coils 290 in the second side (not labeled) of the armature apparatus 200 of the DC dynamo 40' of Embodiment 11 can act as a second DC generator G2, and G1 and G2 are connected in series. The equivalent circuit diagrams corresponding thereof are illustrated as that shown in FIG. 4D and FIG. 4D'.

Moreover, the DC dynamo 40' of the embodiment 11 of this invention can also act as a DC generator as described in above-mentioned embodiment 7, so repeated description is omitted.

Next, please refer to FIG. 4C'' illustrating a cross-sectional view of the DC dynamo 40'' of the embodiments 12 along with the sectional line IV-IV'. As shown in FIG. 4C''', the DC dynamo of embodiment 12 acts as a DC generator, and the structure of the DC dynamo 40'' is similar to the DC dynamos 40 and 40', the main difference therebetween is the first electromagnetic coil 400, the second electromagnetic coil 450 of the DC dynamo 30 and the first permanent magnet 600, the second permanent magnet 650 of the DC dynamo 30' are used to generate the first magnetic field B1 and the second magnetic field B2. As shown in FIG. 4C''', almost all of the first magnetic lines of flux of the first magnetic field B1 substantially and orthogonally pass through the first air gap 260 from the first peripheral area 330 of the first magnetic mechanism 300 to the armature coils 290, and almost all of the second magnetic lines of flux of the second magnetic field B2 substantially and orthogonally pass through the second air gap 280 from the second peripheral area 530 of the second magnetic mechanism 500 to the armature coils 290.

The first magnetic mechanism 300, the first electromagnetic coil 400, the first permanent magnet 600, and one of the armature coils 290 in the first side (not labeled) of the armature apparatus 200 of the DC dynamo 40'' of Embodiment 12 can act as a first DC generator G1, and the second magnetic mechanism 500, the second electromagnetic coil 450, the second permanent magnet 650, and one of the armature coils 290 in the second side (not labeled) of the armature apparatus 200 of the DC dynamo 40'' of Embodiment 12 can act as a second DC generator G2, and G1 and G2 are connected in series. The equivalent circuit diagrams corresponding thereof are illustrated as that shown in FIG. 4D and FIG. 4D'.

Moreover, the DC dynamo 40'' of the embodiment 12 of this invention can also act as a DC generator as described in above-mentioned embodiments 10 and 11, so repeated description is omitted.

The armature apparatuses 200 of the DC dynamo 40, 40' and 40'' of the embodiments 10, 11 and 12 according to this invention are stators, and the first magnetic mechanism 300 and the second magnetic mechanism 500 are rotors. Alternatively, the armature apparatuses 200 of the DC dynamo

40. 40' and 40" of other embodiments according to this invention are rotors, and the first magnetic mechanism 300 and the second magnetic mechanism 500 are stators.

The first and the second central areas 310, 510 of the first and the second magnetic mechanisms 300, 500 of the DC dynamos 40. 40' and 40" of the embodiments 10, 11 and 12 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 40. 40' and 40" of the embodiments 10, 11 and 12 according to this invention rotate relatively to the armature apparatus 200 thereof.

The first and the second central areas 310, 510 of the first and the second magnetic mechanisms 300, 500 of the DC dynamos 40. 40' and 40" of the embodiments 10, 11 and 12 according to this invention can further comprise a plurality of balls (not shown) placed between the first rotation axis 320 and the first bearing 370, and the second rotation axis 520 and the second bearing 570.

Embodiments 13, 14, 15

Figure 5A:
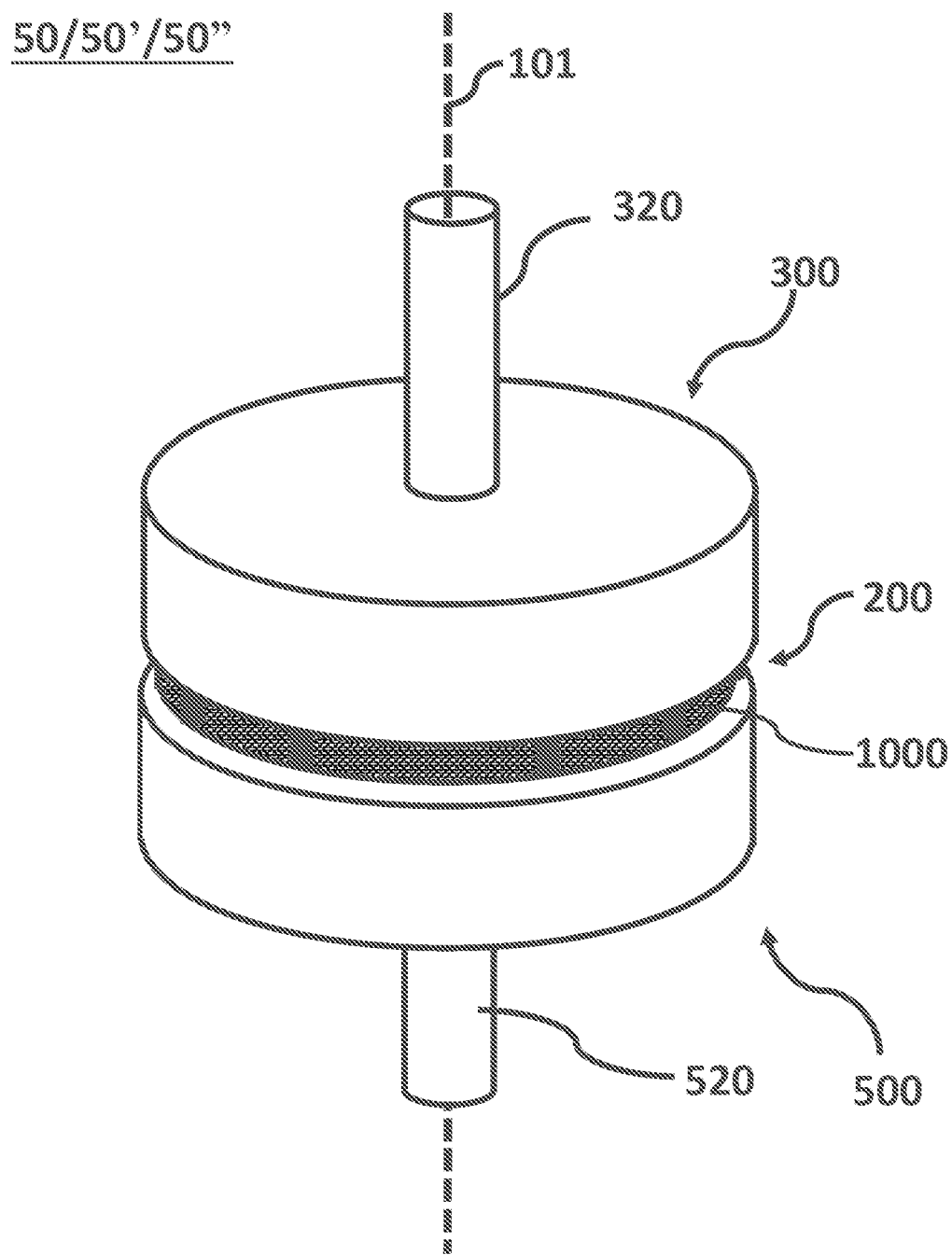
FIG. 5A is a stereoscopic assembly drawing of the DC dynamo 50, 50' and 50" of the embodiments 13, 14, and 15 according to this present invention.
Figure 5B:
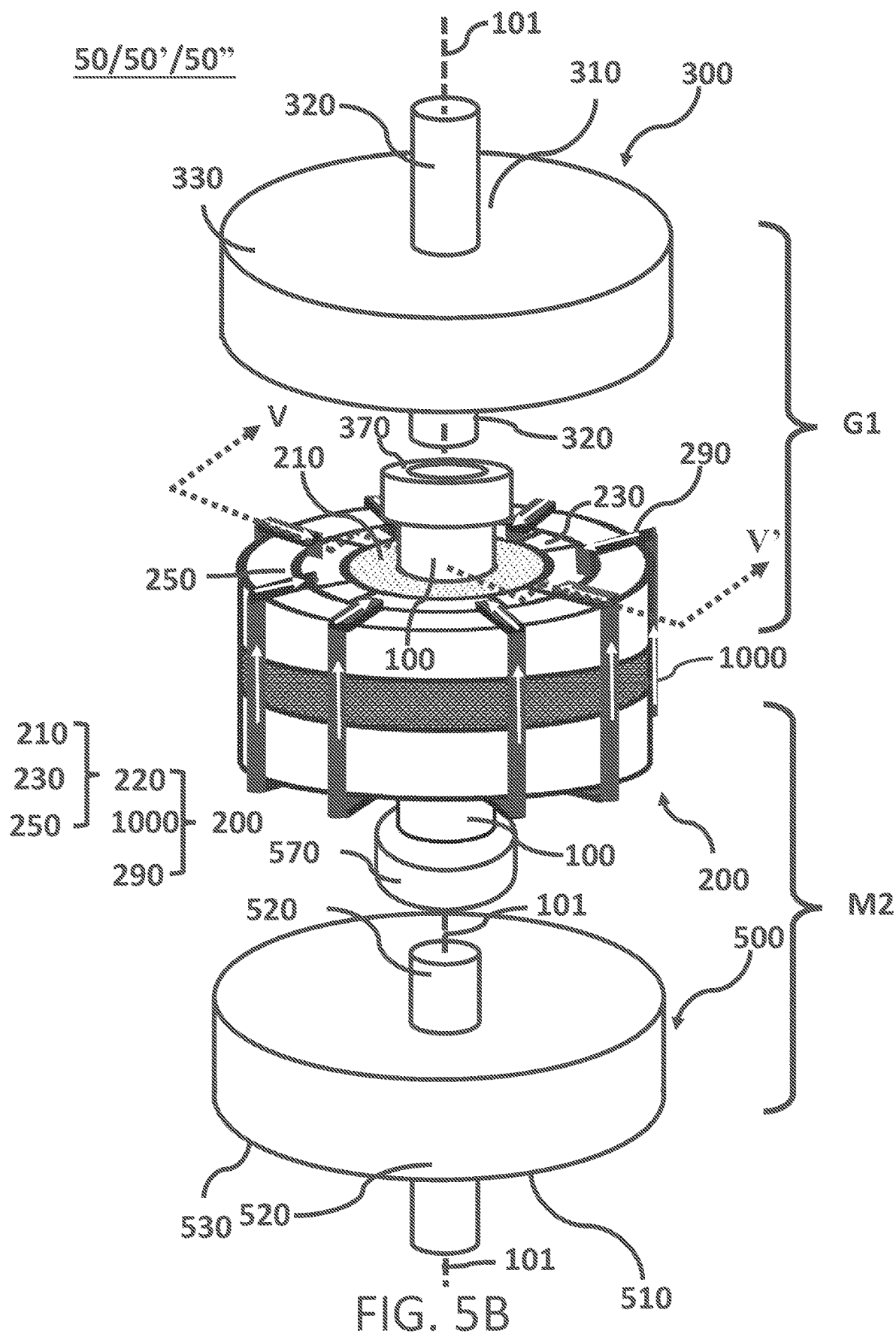
FIG. 5B is a stereoscopic exploded drawing of the DC dynamo 50, 50' and 50" as shown in FIG. 5A.

First, please refer to FIG. 5A illustrating a stereoscopic assembly drawing of the DC dynamo 50, 50' and 50" of the embodiments 13, 14 and 15 according to this present invention, and FIG. 5B illustrating a stereoscopic exploded drawing of the DC dynamo 50, 50' and 50" as shown in FIG. 5A.

As shown in FIG. 5A and FIG. 5B, the DC dynamos 50, 50' and 50" of embodiments 13, 14 and 15 acts as DC generator-DC motor complexes, and their structures are similar to the DC dynamos 10, 10' and 10" of the embodiments 1, 2 and 3, and the main difference therebetween is that the DC dynamos 50, 50' and 50" of embodiments 13, 14 and 15 comprise a pair of armature electrodes with a substantially same polarity of electromotive force electrically interconnecting the armature coils 290 and end-terminals of the pair of armature electrodes are connected to each other for example but not limited to directly short together.

Figure 5C:
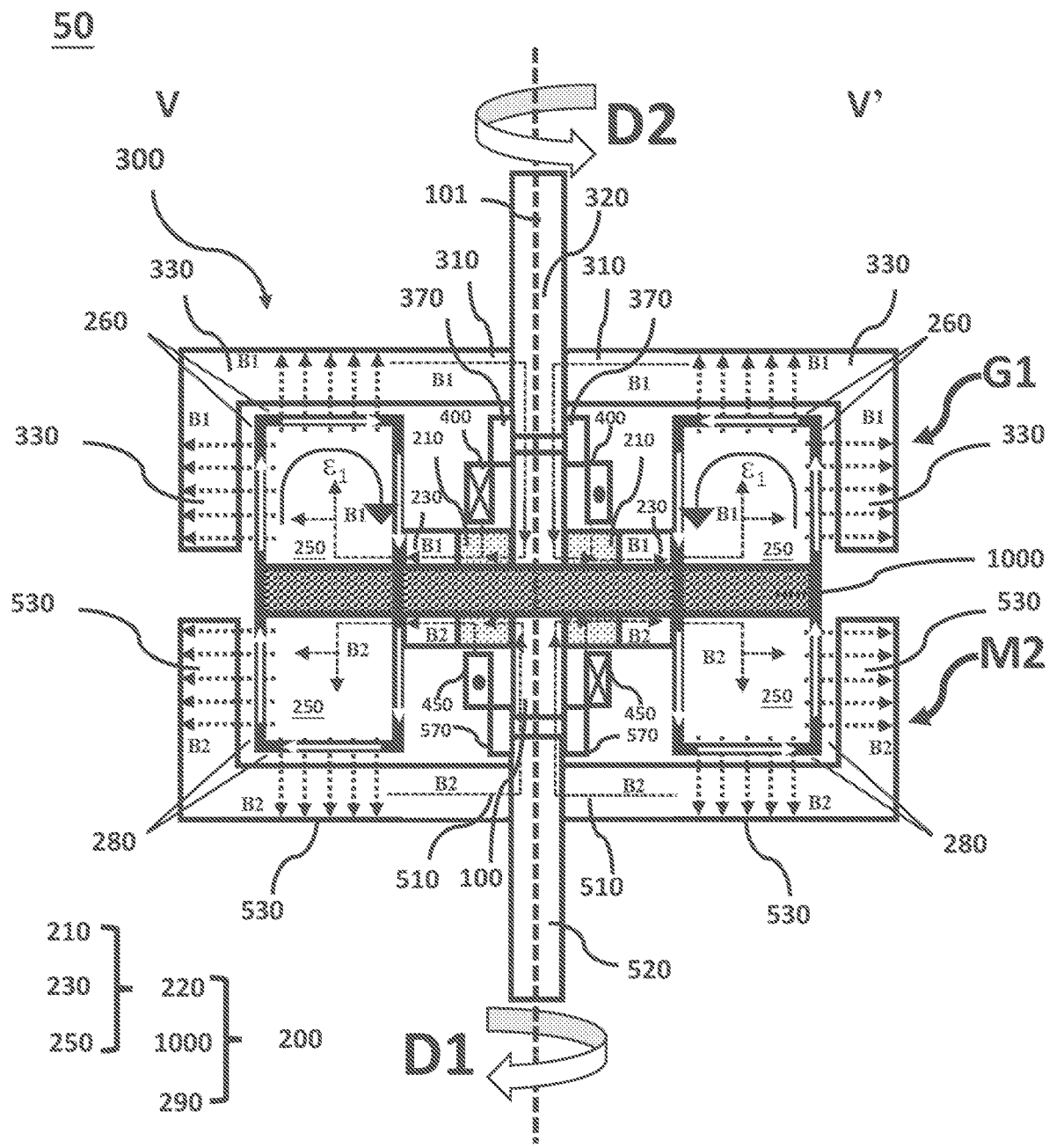
FIG. 5C is a cross-sectional view of the DC dynamo 50 of the embodiments 13 along with the sectional line V-V' as shown in FIG. 5B.
Figure 5C:
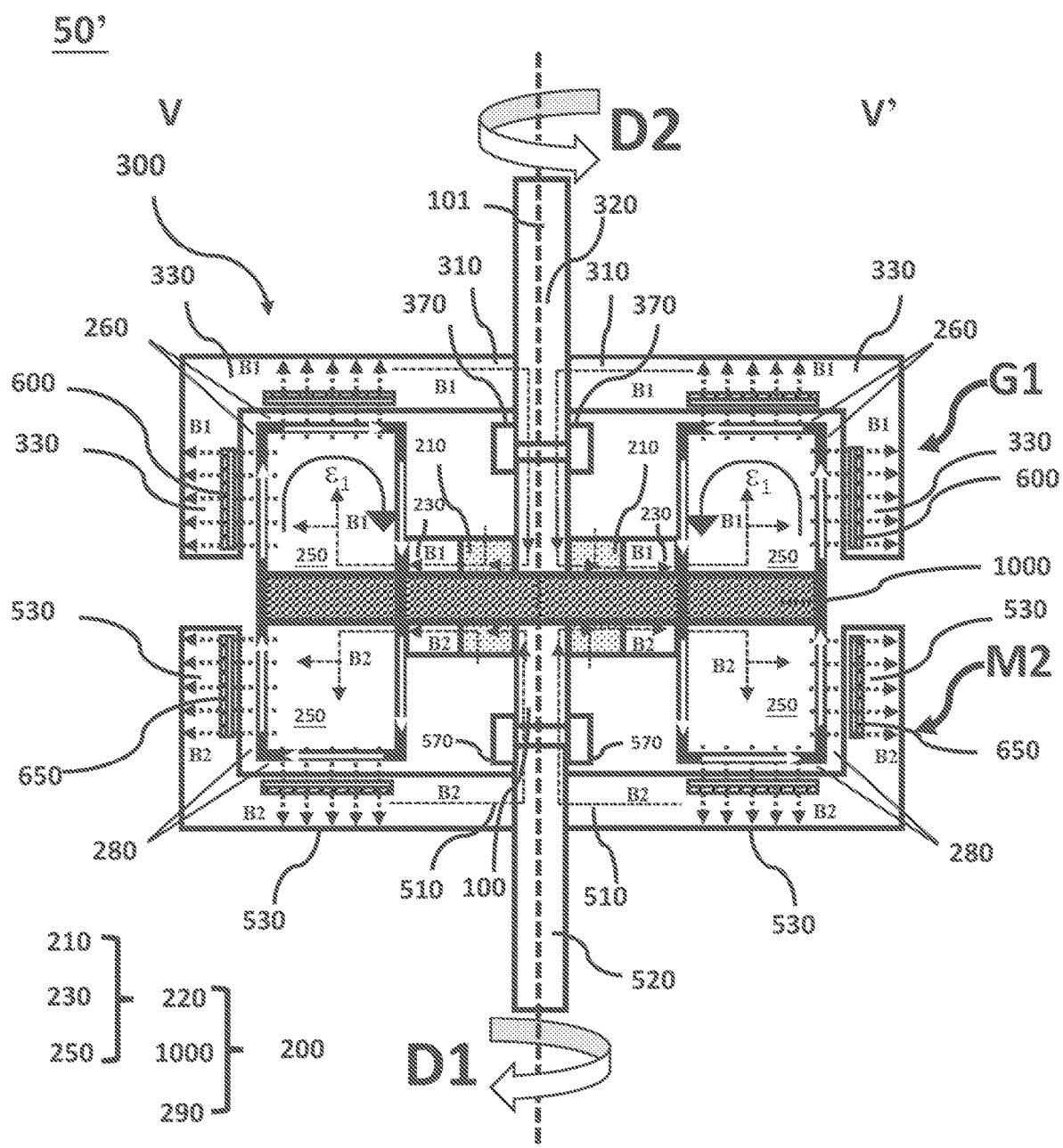

As shown in FIG. 5C, almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, thereby the first magnetic mechanism 300 can be driven to rotate relatively to the virtual axis 101 along with the second direction D2. When observing from the longitudinal section of the virtual axis 101, and one of the armature coils 290 in the first side (not labeled) adjacent to the first air gap 260 moves outward relatively to the right side of the longitudinal section of the virtual axis 101 and move inward relatively to the left side of the longitudinal section of the virtual axis 101. A counterclockwise induced electromotive force $\varepsilon_1$ can be induced by the armature coils 290 in the first side (not labeled) of the armature apparatus 200 when observing from the right side of longitudinal section of the virtual axis 101 based on the Fleming's left hand rule, and a clockwise induced electromotive force $\varepsilon_1$ can be induced by the armature coils 290 in the first side (not labeled) of the armature apparatus 200 based on the Fleming's left hand rule. Because the end-terminals of the pair of armature electrodes are shorted together, so the flowing direction of the current I in the armature coils 290 in the right side of the longitudinal section of the virtual axis 101 is counterclockwise, and the flowing direction of the current I in the armature coils 290 in the left side of the longitudinal section of the virtual axis 101 is clockwise.

As shown in FIG. 5C, almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500, thereby a magnetic force injected inward to the armature coils 290 in the peripheral body 250 in the second side (not labeled) of the right side of the longitudinal section of the virtual axis 101 will be generated by the second magnetic field B2 based on the Fleming's left hand rule, and the second magnetic mechanism 500 will respectively sense a reaction force injected outward to the right side of the longitudinal section of the virtual axis 101, and a magnetic force injected outward to the armature coils 290 in the peripheral body 250 in the second side (not labeled) of the left side of the longitudinal section of the virtual axis 101 will also be generated by the second magnetic field B2 based on the Fleming's left hand rule, and the second magnetic mechanism 500 will respectively sense a reaction force injected inward to the left side of the longitudinal section of the virtual axis 101, thereby the second magnetic mechanism 500 can be driven to rotate relatively to the virtual axis 101 along with the first direction D1, and the second rotation axis 520 can also be driven to rotate along with the first direction D1. The DC dynamos 50 of embodiments 13 acts as DC generator-DC motor complex, wherein the first magnetic mechanism 300, the first electromagnetic coil 400, and one of the armature coils 290 in the first side (not labeled) of the armature apparatus 200 of the DC dynamo 50 of Embodiment 13 can act as a first DC generator G1, and the second magnetic mechanism 500, the second electromagnetic coil 450, the second permanent magnet 650, and one of the armature coils 290 in the second side (not labeled) of the armature apparatus 200 of the DC dynamo 50 of Embodiment 13 can act as a second DC motor M2. The rotation directions of the first DC generation and the DC motor opposite to each other, and the ratio of the density of the first magnetic lines of flux of the first magnetic field B1 passing through the first air gap 260 to the density of the second magnetic lines of flux of the second magnetic field B2 passing through the second air gap 280 is r1, and the ratio of the rotation speed of the first DC generator G1 to the rotation speed of the second DC motor M2 is r2, r1 and r2 are in reverse tendency or in substantially inverse proportion, thereby the rotation speed of the first DC motor M1 can be changed by adjusting the ratio of r1. Therefore, the DC dynamo 50 can act as a variable transmission apparatus with opposite rotation directions, and the equivalent circuit diagrams thereof are illustrated as shown as FIG. 5D, FIG. 5D' and FIG. 5D".

Figure 5D:
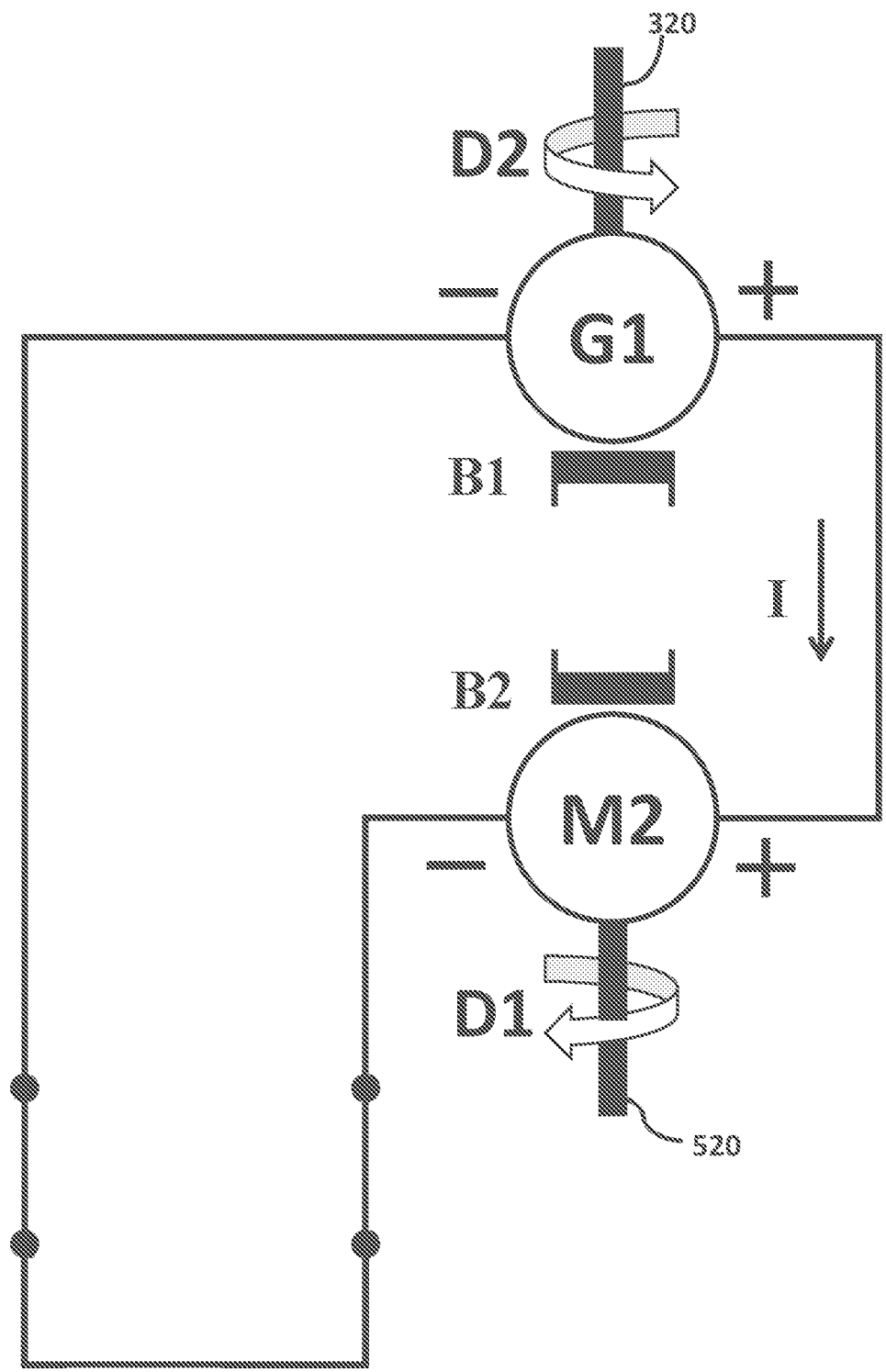
FIG. 5D is an equivalent circuit diagram of the DC dynamo 50, 50' and 50" of the embodiments 13, 14, and 15 according to this present invention.
Figure 5D:
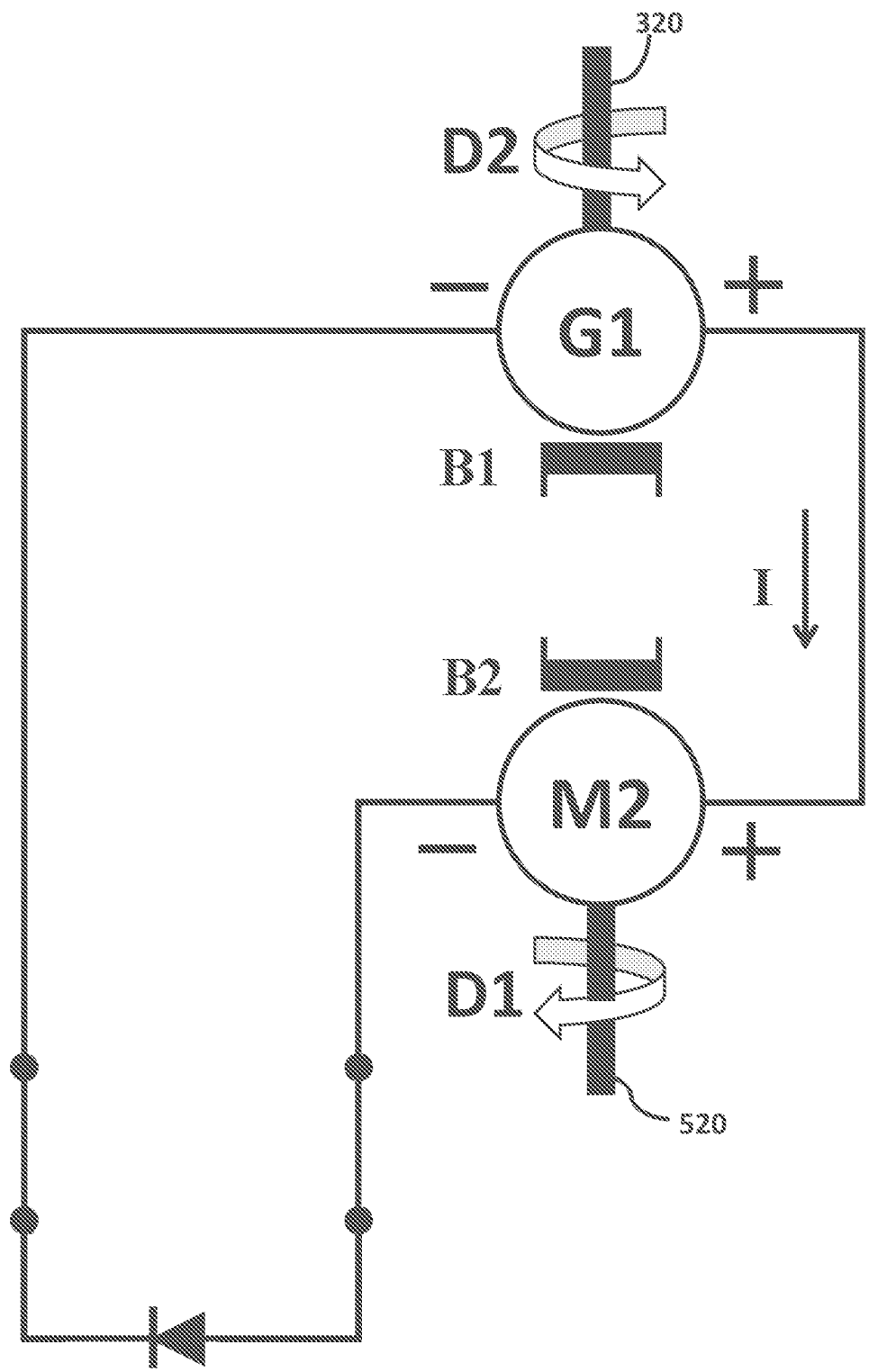

As the equivalent diagram shown in FIG. 5D, when the pair of armature electrodes with a substantially same polarity of electromotive force electrically interconnecting the armature coils 290 and end-terminals of the pair of armature electrodes are directly short together, the current within the armature coils 290 in the first side (not labeled) and the second side (not labeled) of the armature apparatus 200 is shared, and the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with different directions and contribute to the first DC generator G1 comprising the first magnetic mechanism 300 and the armature coils 290 in the first side (not labeled) of the armature apparatus 200, and the second DC motor M2 comprising the second magnetic mechanism 500 and the armature coils 290 in the second side (not labeled) of the armature apparatus 200 to rotate along with different directions. Thereby, the DC dynamo 50 can act as a variable transmission apparatus with opposite rotation directions As the equivalent diagram shown in FIG. 5D', the pair of armature electrodes with a substantially same polarity of electromotive force electrically interconnecting the armature coils 290 and end-terminals of the pair of armature electrodes are directly short together and a diode is connected between the end-terminals of the pair of armature electrodes to achieve the purpose of one-way short. As mentioned above, when end-terminals of the pair of armature electrodes are directly short together, the current within the armature coils 290 in the first side (not labeled) and the second side (not labeled) of the armature apparatus 200 is shared, and the first magnetic mechanism 300 and the armature coils 290 in the first side (not labeled) of the armature apparatus 200 acts as a DC generator to drive the second DC motor M2 comprising the second magnetic mechanism 500 and the armature coils 290 in the second side (not labeled) of the armature apparatus 200 to rotate along with different directions. Moreover, the shared current within the armature coils 290 in the first side (not labeled) and the second side (not labeled) of the armature apparatus 200 can only flow in one-way owing to one-way short by the diode, thereby the second DC motor M2 can only be driven in one direction, so the DC dynamo 50 can act as a one-way variable transmission apparatus with opposite rotation directions As the equivalent diagram shown in FIG. 5D", when one of the armature electrodes (not labeled) with a substantially same polarity of electromotive force electrically interconnecting the armature coils 290 and an outer system (not shown) for example but not limited to a control module 1500 and a battery module 2000. The battery module 2000 provides a battery electromotive force and drive the second magnetic mechanism 500 of the second DC motor M2 to rotate together with the first DC generator G1 under the operation of the control module 1500, or the first DC generator G1 of the DC dynamo 50 drives the second DC motor M2 and charges the battery module 2000 under the operation of the control module 1500.

As mentioned above, the DC dynamo 50 acts as a DC-generator-DC motor complex, and the DC dynamo 50 acts as a continuous variable transmission in other embodiments The first central area 310 of the first magnetic mechanism 300 and the second central area 510 of the second magnetic mechanism 500 further comprise a first rotation axis 320 and a second rotation axis 520, wherein the first rotation axis 320 can be driven to rotate by the first DC generator G1 of the DC generator-DC motor complex, and the second rotation axis 520 can be driven to rotate by the second DC motor M2 of the DC generator-DC motor complex. The first rotation axis 320 can be regarded as a power input axis of the continuous variable transmission, and the second rotation axis 520 can be regarded as a power output axis of the continuous variable transmission. The rotation ratio of the first rotation axis 320 acted as the power input axis to the second rotation axis 520 acted as the power output axis and the rotation ratio of DC generator to the DC motor equals to r2, and the ratio of the density of the first magnetic lines of flux of the first magnetic field B1 passing through the first air gap to the density of the second magnetic lines of flux of the second magnetic field B2 passing through the second air gap is r1, wherein r1 and r2 are in reverse tendency or in substantially inverse proportion, thereby the rotation ratio of the first rotation axis as the power input axis to the second rotation axis as the power output axis and the rotation ratio of DC generator to the DC motor equaling to r2 can be changed by adjusting the ratio of r1 to achieve the purpose of continuously variable transmission.

Next, please refer to FIG. 5C' illustrating a cross-sectional view of the DC dynamo 50' of the embodiments 14 along with the sectional line V-V'. As shown in FIG. 5C', the DC dynamo 50' acts as a DC generator, and the structure of the DC dynamo 50' is similar to the DC dynamo 50 of the embodiment 13, and the main difference therebetween is the first permanent magnet 600 and the second permanent magnet 650 of the DC dynamo 50' are used to replace the first electromagnetic coil 400 and the second electromagnetic coil 450 of DC dynamo 50 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 5C', almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 50' of Embodiment 14 acts as a first DC generator G1, and the second magnetic mechanism 500, the second permanent magnet 650, and one of the armature coils 290 in the second side (not labeled) of the armature apparatus 200 of the DC dynamo 50' of Embodiment 14 acts as a second DC motor M2, wherein the rotation directions of the first DC generator G1 and the second DC motor M2 are opposite, and the rotation speeds of the first magnetic mechanism 300 and the second magnetic mechanism 500 can be changed by adjust the amplitude of the first magnetic field B1 and the amplitude of the second magnetic field B2, thereby the DC dynamo 50' of the embodiment 14 according to this invention can act as a variable transmission with opposite rotation directions. The equivalent circuit diagrams corresponding thereof are illustrated as that shown in FIG. 5D, 5D' and FIG. 5D".

The DC dynamo 50' of the embodiment 14 according to this invention can operate as the DC-generator-DC motor complex of the embodiment 13, and repeated description is omitted.

Next, please refer to FIG. 5C" illustrating a cross-sectional view of the DC dynamo 50" of the embodiments 15 along with the sectional line V-V'. As shown in FIG. 5C", the structure of the DC dynamo 50" is similar to the DC dynamos 50 and 50', the main difference therebetween is the first electromagnetic coil 400, the second electromagnetic coil 450 of the DC dynamo 50 and the first permanent magnet 600, the second permanent magnet 650 of the DC dynamo 50' are used to generate the first magnetic field B1 and the second magnetic field B2. As shown in FIG. 5C", almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 50" of Embodiment 14 acts as a first DC generator G1, and the second magnetic mechanism 500, the second permanent magnet 650, and one of the armature coils 290 in the second side (not labeled) of the armature apparatus 200 of the DC dynamo 50" of Embodiment 14 acts as a second DC motor M2, wherein the rotation directions of the first DC generator G1 and the second DC motor M2 are opposite, and the rotation speeds of the first magnetic mechanism 300 and the second magnetic mechanism 500 can be changed by adjust the amplitude of the first magnetic field B1 and the amplitude of the second magnetic field B2, thereby the DC dynamo 50' of the embodiment 15 according to this invention can act as a variable transmission with opposite rotation directions. The equivalent circuit diagrams corresponding thereof are illustrated as that shown in FIG. 5D, 5D' and FIG. 5D".

The DC dynamo 50" of the embodiment 15 according to this invention can operate as the DC-generator-DC motor complexes of the embodiments 13 and 14, and repeated description is omitted.

The armature apparatus 200 of the DC dynamo 50, 50' and 50" are stators, and the first magnetic mechanism 300 and the second magnetic mechanism 500 are rotators.

The first and the second central areas 310, 510 of the first and the second magnetic mechanisms 300, 500 of the DC dynamo 50, 50' and 50" of the embodiments 13, 14 and 15 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 50, 50' and 50" of the embodiments 13, 14 and 15 according to this invention rotate relatively to the armature apparatus 200 thereof.

The first and the second central areas 310, 510 of the first and the second magnetic mechanisms 300, 500 of the DC dynamo 50, 50' and 50" of the embodiments 13, 14 and 15 according to this invention can further comprise a plurality of balls placed between the first rotation axis 320 and the first bearing 370, and the second rotation axis 520 and the second bearing 570.

Embodiments 16, 17 and 18

Figure 6A:
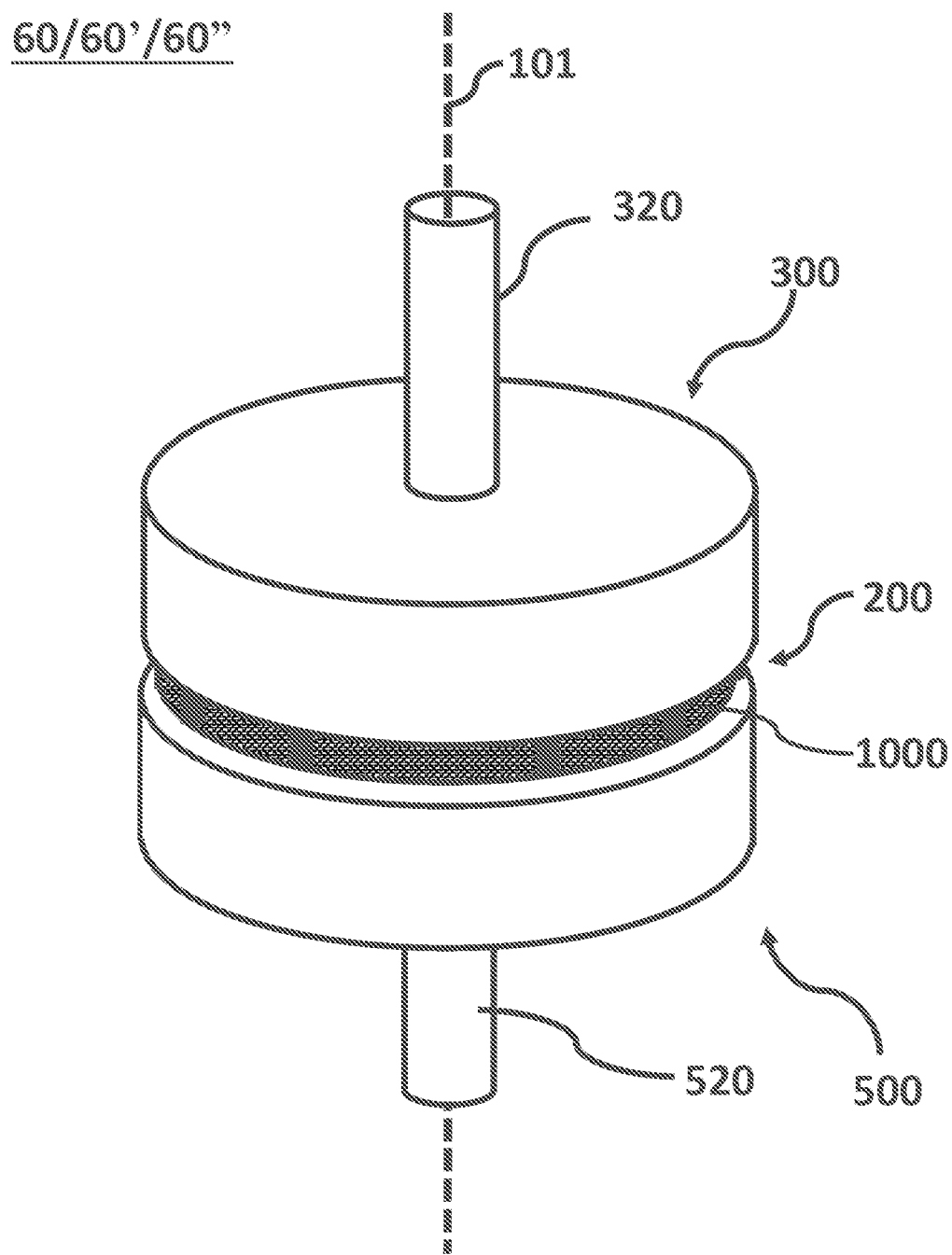
FIG. 6A is a stereoscopic assembly drawing of the DC dynamo 60, 60' and 60" of the embodiments 16, 17, and 18 according to this present invention.
Figure 6B:
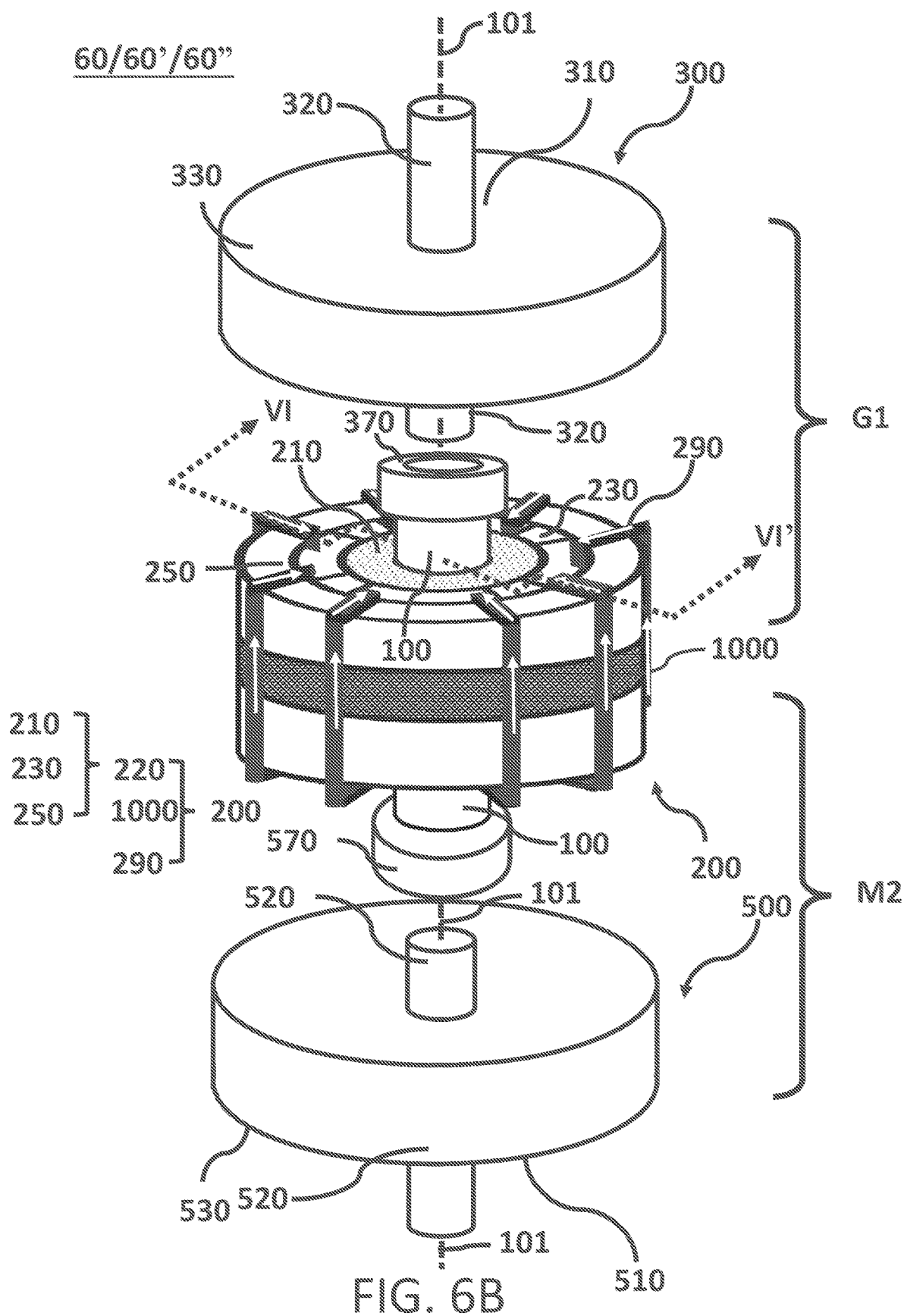
FIG. 6B is a stereoscopic exploded drawing of the DC dynamo 60, 60' and 60" as shown in FIG. 6A.

First, please refer to FIG. 6A illustrating a stereoscopic assembly drawing of the DC dynamo 60, 60' and 60" of the embodiments 16, 17 and 18 according to this present invention, and FIG. 6B illustrating a stereoscopic exploded drawing of the DC dynamo 60, 60' and 60" as shown in FIG. 6A.

As shown in FIG. 6A and FIG. 6B, the DC dynamos 60, 60' and 60" of embodiments 16, 17 and 18 acts as DC generator-DC motor complexes, and their structures are similar to the DC dynamos 50, 50' and 50" of the embodiments 13, 14 and 15, and the main difference therebetween is that almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

Figure 6C:
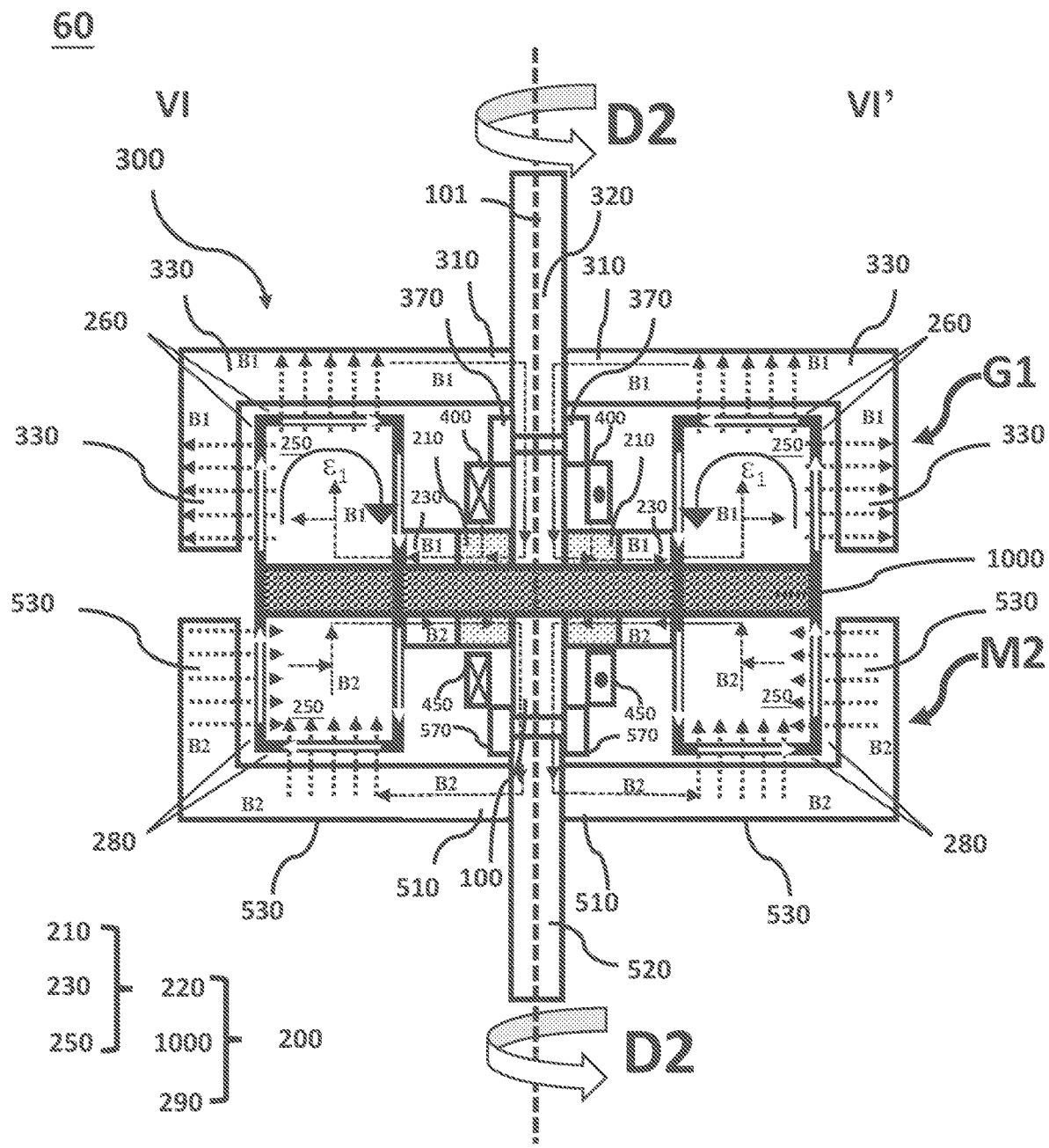
FIG. 6C is a cross-sectional view of the DC dynamo 60 of the embodiments 16 along with the sectional line VI-VI' as shown in FIG. 6B.
Figure 6C:
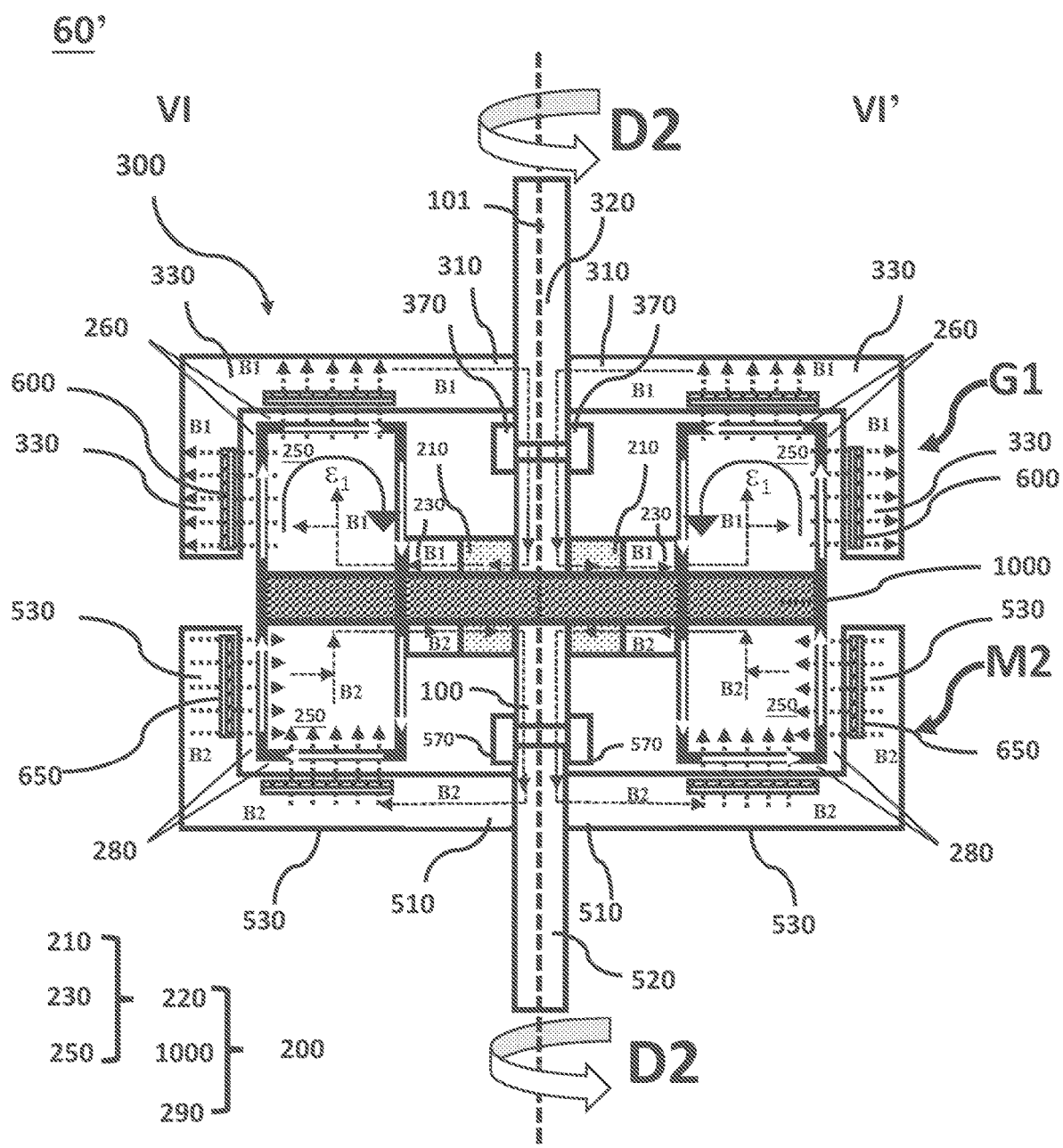

Next, please refer to FIG. 6C illustrating a cross-sectional view of the DC dynamo 60 of the embodiments 16 along with the sectional line VI-VI'. As shown in FIG. 6C, when observing from the longitudinal section of the virtual axis 101, and one of the armature coils 290 in the first side (not labeled) and the second side (not labeled) adjacent to the first air gap 260 and the second air gap 280 move outward relatively to the right side of the longitudinal section of the virtual axis 101, then a counterclockwise induced electromotive force $\varepsilon_1$ can be induced by the armature coils 290 in the first side (not labeled) of the armature apparatus 200 in the right side of the longitudinal section of the virtual axis 101 based on the Fleming's left hand rule and a clockwise induced electromotive force el can be induced by the armature coils 290 in the first side (not labeled) of the armature apparatus 200 in the left side of the longitudinal section of the virtual axis 101 based on the Fleming's left hand rule. Because the end-terminals of the pair of armature electrodes are shorted together, so the flowing direction of the current I in the armature coils 290 in the right side of the longitudinal section of the virtual axis 101 is counterclockwise, and the flowing direction of the current I in the armature coils 290 in the left side of the longitudinal section of the virtual axis 101 is clockwise, thereby a magnetic force injected outward to the armature coils 290 in the peripheral body 250 in the second side (not labeled) of the right side of the longitudinal section of the virtual axis 101 will be generated by the second magnetic field B2, and then the second magnetic mechanism 500 will respectively sense a reaction force injected inward to the right side of the longitudinal section of the virtual axis 101, and a magnetic force injected outward to the armature coils 290 in the peripheral body 250 in the second side (not labeled) of the left side of the longitudinal section of the virtual axis 101 will also be generated by the second magnetic field B2, thereby the second magnetic mechanism 500 can be driven to rotate relatively to the virtual axis 101 along with the second direction D2, and the second rotation axis 520 can also be driven to rotate along with the second direction D2. The DC dynamo 60 of embodiments 16 acts as a DC generator-DC motor complex, wherein the first magnetic mechanism 300, the first electromagnetic coil 400, and one of the armature coils 290 in the first side (not labeled) of the armature apparatus 200 of the DC dynamo 50 of Embodiment 13 can act as a first DC generator G1, and the second magnetic mechanism 500, the second electromagnetic coil 450, the second permanent magnet 650, and one of the armature coils 290 in the second side (not labeled) of the armature apparatus 200 of the DC dynamo 50 of Embodiment 13 can act as a second DC motor M2. The rotation directions of the first DC generation and the DC motor opposite to each other, and the ratio of the density of the first magnetic lines of flux of the first magnetic field B1 passing through the first air gap 260 to the density of the second magnetic lines of flux of the second magnetic field B2 passing through the second air gap 280 is r1, and the ratio of the rotation speed of the first DC generator G1 to the rotation speed of the second DC motor M2 is r2, r1 and r2 are in reverse tendency or in substantially inverse proportion, thereby the rotation speed of the first DC motor M1 can be changed by adjusting the ratio of r1. Therefore, the DC dynamo 60 can act as a variable transmission apparatus with opposite rotation directions, and the equivalent circuit diagrams thereof are illustrated as shown as FIG. 6D, FIG. 6D' and FIG. 6D".

Figure 6D:
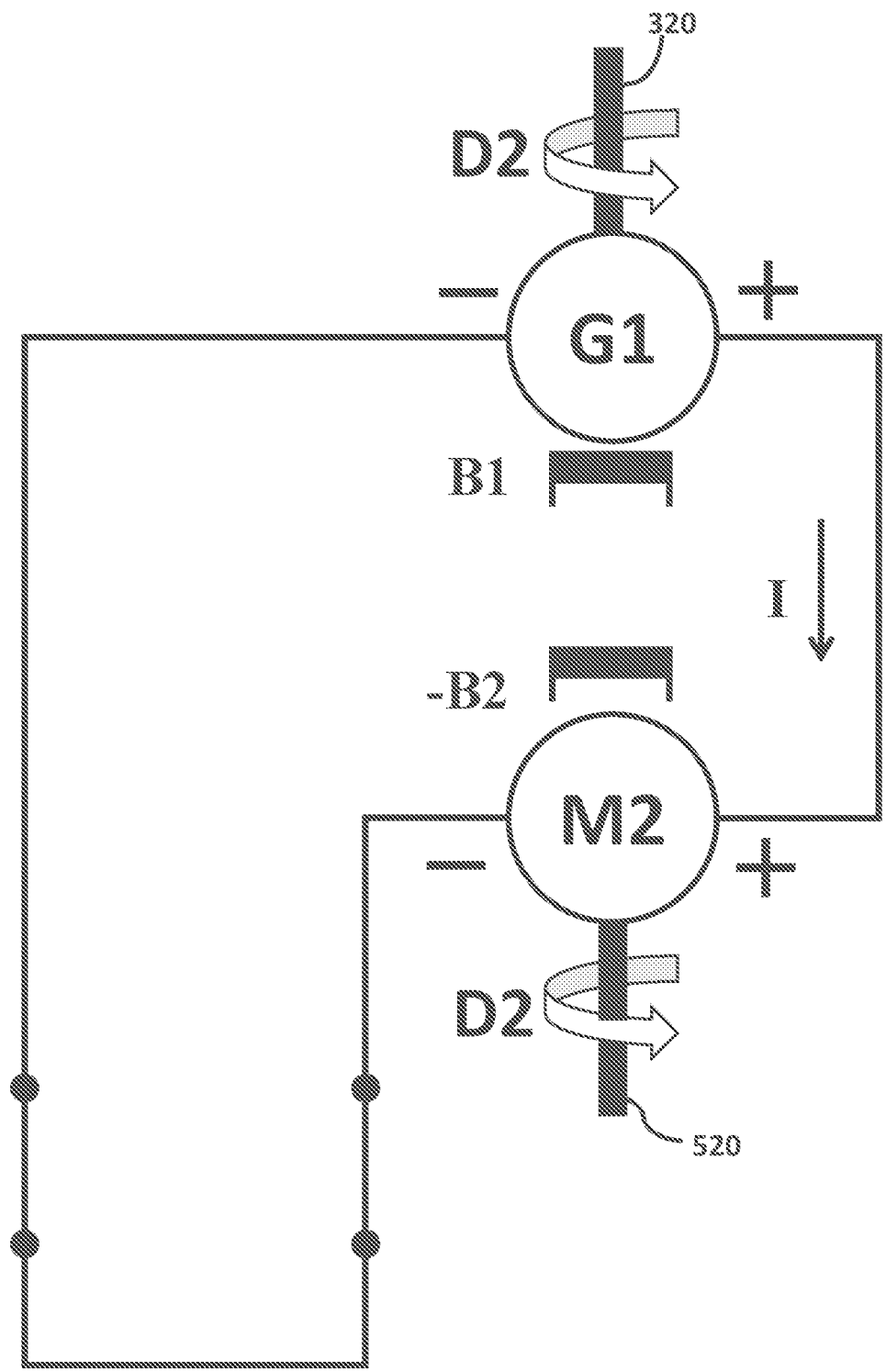
FIG. 6D is an equivalent circuit diagram of the DC dynamo 60, 60' and 60" of the embodiments 16, 17, and 18 according to this present invention.
Figure 6D:
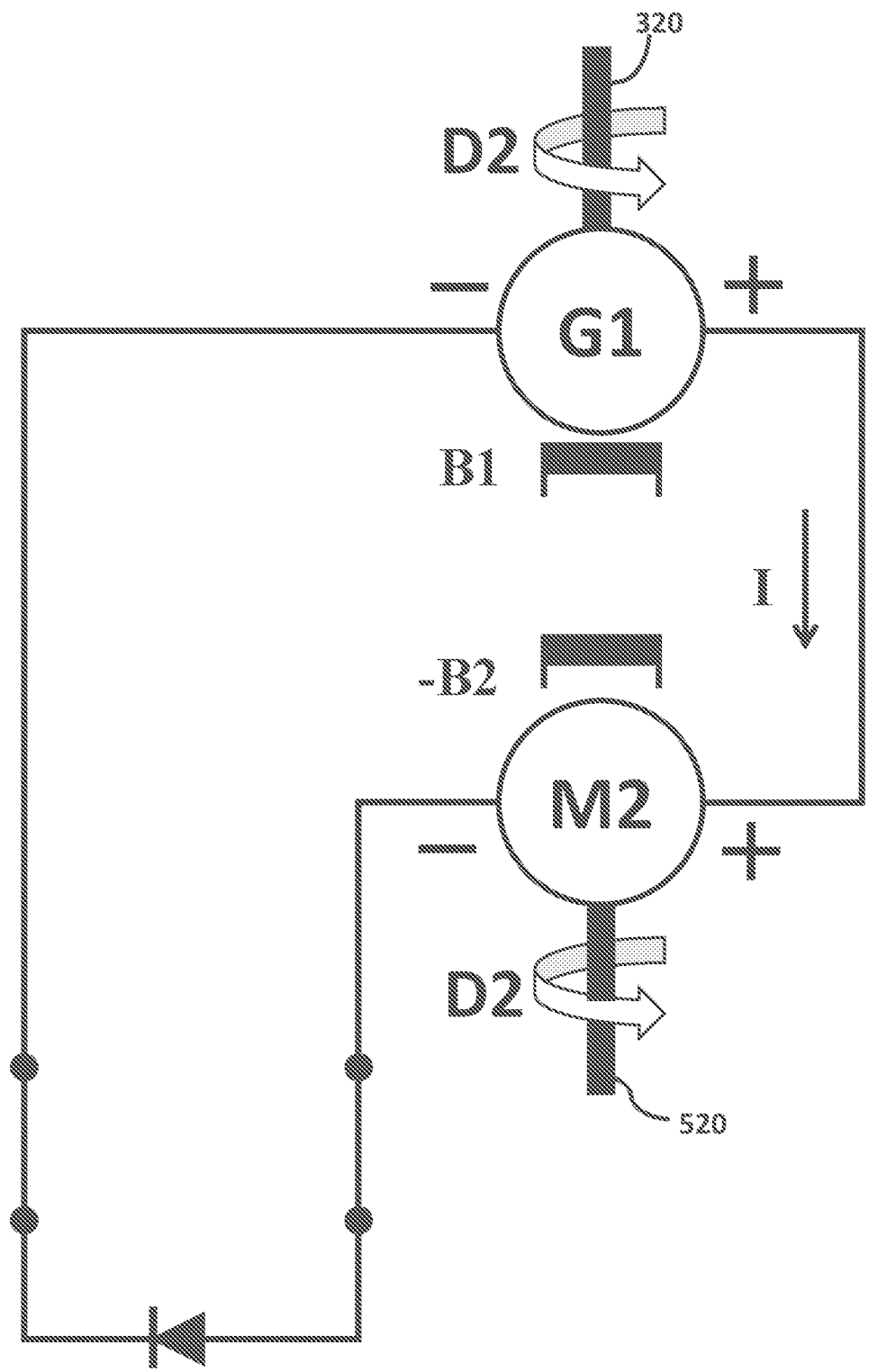

As the equivalent diagram shown in FIG. 6D, when the pair of armature electrodes with a substantially same polarity of electromotive force electrically interconnecting the armature coils 290 and end-terminals of the pair of armature electrodes are directly short together, the current within the armature coils 290 in the first side (not labeled) and the second side (not labeled) of the armature apparatus 200 is shared, and the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with different directions and contribute to the first DC generator G1 comprising the first magnetic mechanism 300 and the armature coils 290 in the first side (not labeled) of the armature apparatus 200, and the second DC motor M2 comprising the second magnetic mechanism 500 and the armature coils 290 in the second side (not labeled) of the armature apparatus 200 to rotate along with the same direction. Thereby, the DC dynamo 50 can act as a variable transmission apparatus with same rotation direction.

As the equivalent diagram shown in FIG. 6D', the pair of armature electrodes with a substantially same polarity of electromotive force electrically interconnecting the armature coils 290 and end-terminals of the pair of armature electrodes are directly short together and a diode is connected between the end-terminals of the pair of armature electrodes to achieve the purpose of one-way short. As mentioned above, when end-terminals of the pair of armature electrodes are directly short together, the current within the armature coils 290 in the first side (not labeled) and the second side (not labeled) of the armature apparatus 200 is shared, and the first magnetic mechanism 300 and the armature coils 290 in the first side (not labeled) of the armature apparatus 200 acts as a DC generator to drive the second DC motor M2 comprising the second magnetic mechanism 500 and the armature coils 290 in the second side (not labeled) of the armature apparatus 200 to rotate along with the same direction. Moreover, the shared current within the armature coils 290 in the first side (not labeled) and the second side (not labeled) of the armature apparatus 200 can only flow in one-way owing to one-way short by the diode, thereby the second DC motor M2 can only be driven in one direction, so the DC dynamo 50 can act as a one-way variable transmission apparatus with same rotation direction.

As the equivalent diagram shown in FIG. 6D", when one of the armature electrodes (not labeled) with a substantially same polarity of electromotive force electrically interconnecting the armature coils 290 and an outer system (not shown) for example but not limited to a control module 1500 and a battery module 2000. The battery module 2000 provides a battery electromotive force and drive the second magnetic mechanism 500 of the second DC motor M2 to rotate together with the first DC generator G1 under the operation of the control module 1500, or the first DC generator G1 of the DC dynamo 50 drives the second DC motor M2 and charges the battery module 2000 under the operation of the control module 1500.

As mentioned above, the DC dynamo 60 of embodiment 16 acts as a DC-generator-DC motor complex, and the DC dynamo 60 acts as a continuous variable transmission in other embodiments The first central area 310 of the first magnetic mechanism 300 and the second central area 510 of the second magnetic mechanism 500 further comprise a first rotation axis 320 and a second rotation axis 520, wherein the first rotation axis 320 can be driven to rotate by the first DC generator G1 of the DC generator-DC motor complex, and the second rotation axis 520 can be driven to rotate by the second DC motor M2 of the DC generator-DC motor complex. The first rotation axis 320 can be regarded as a power input axis of the continuous variable transmission, and the second rotation axis 520 can be regarded as a power output axis of the continuous variable transmission. The rotation ratio of the first rotation axis 320 acted as the power input axis to the second rotation axis 520 acted as the power output axis and the rotation ratio of DC generator to the DC motor equals to r2, and the ratio of the density of the first magnetic lines of flux of the first magnetic field B1 passing through the first air gap to the density of the second magnetic lines of flux of the second magnetic field B2 passing through the second air gap is r1, wherein r1 and r2 are in reverse tendency or in substantially inverse proportion, thereby the rotation ratio of the first rotation axis as the power input axis to the second rotation axis as the power output axis and the rotation ratio of DC generator to the DC motor equaling to r2 can be changed by adjusting the ratio of r1 to achieve the purpose of continuously variable transmission.

Next, please refer to FIG. 6C' illustrating a cross-sectional view of the DC dynamo 60' of the embodiments 17 along with the sectional line VI-VI'. As shown in FIG. 6C', the DC dynamo 60' acts as a DC generator, and the structure of the DC dynamo 60' is similar to the DC dynamo 60 of the embodiment 16, and the main difference therebetween is the first permanent magnet 600 and the second permanent magnet 650 of the DC dynamo 60' are used to replace the first electromagnetic coil 400 and the second electromagnetic coil 450 of DC dynamo 60 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 6C', almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 60' of Embodiment 17 acts as a first DC generator G1, and the second magnetic mechanism 500, the second permanent magnet 650, and one of the armature coils 290 in the second side (not labeled) of the armature apparatus 200 of the DC dynamo 60' of Embodiment 17 acts as a second DC motor M2, wherein the rotation directions of the first DC generator G1 and the second DC motor M2 are the same, and the rotation speeds of the first magnetic mechanism 300 and the second magnetic mechanism 500 can be changed by adjust the amplitude of the first magnetic field B1 and the amplitude of the second magnetic field B2, thereby the DC dynamo 60' of the embodiment 17 according to this invention can act as a variable transmission with opposite rotation directions. The equivalent circuit diagrams corresponding thereof are illustrated as that shown in FIG. 6D, 6D' and FIG. 6D".

The DC dynamo 60' of the embodiment 17 according to this invention can operate as the DC dynamo 60 of the embodiment 16, and repeated description is omitted.

Next, please refer to FIG. 6C" illustrating a cross-sectional view of the DC dynamo 60" of the embodiments 18 along with the sectional line VI-VI'. As shown in FIG. 6C", the structure of the DC dynamo 60" is similar to the DC dynamos 60 and 60', the main difference therebetween is the first electromagnetic coil 400, the second electromagnetic coil 450 of the DC dynamo 60 and the first permanent magnet 600, the second permanent magnet 650 of the DC dynamo 60' are used to generate the first magnetic field B1 and the second magnetic field B2. As shown in FIG. 6C", almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 60" of Embodiment 18 acts as a first DC generator G1, and the second magnetic mechanism 500, the second permanent magnet 650, and one of the armature coils 290 in the second side (not labeled) of the armature apparatus 200 of the DC dynamo 60" of Embodiment 18 acts as a second DC motor M2, wherein the rotation directions of the first DC generator G1 and the second DC motor M2 are opposite, and the rotation speeds of the first magnetic mechanism 300 and the second magnetic mechanism 500 can be changed by adjust the amplitude of the first magnetic field B1 and the amplitude of the second magnetic field B2, thereby the DC dynamo 60' of the embodiment 18 according to this invention can act as a variable transmission with opposite rotation directions. The equivalent circuit diagrams corresponding thereof are illustrated as that shown in FIG. 6D, 6D' and FIG. 6D".

The DC dynamo 60" of the embodiment 18 according to this invention can operate as the DC dynamos 60 and 60' of the embodiments 16 and 17, and repeated description is omitted.

The armature apparatus 200 of the DC dynamo 60, 60' and 60" are stators, and the first magnetic mechanism 300 and the second magnetic mechanism 500 are rotators.

The first and the second central areas 310, 510 of the first and the second magnetic mechanisms 300, 500 of the DC dynamo 60, 60' and 60" of the embodiments 16, 17 and 18 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 60, 60' and 60" of the embodiments 16, 17 and 18 according to this invention rotate relatively to the armature apparatus 200 thereof.

The first and the second central areas 310, 510 of the first and the second magnetic mechanisms 300, 500 of the DC dynamo 60, 60' and 60" of the embodiments 16, 17 and 18 according to this invention can further comprise a plurality of balls placed between the first rotation axis 320 and the first bearing 370, and the second rotation axis 520 and the second bearing 570.

Embodiments 19, 20 and 21

Figure 7A:
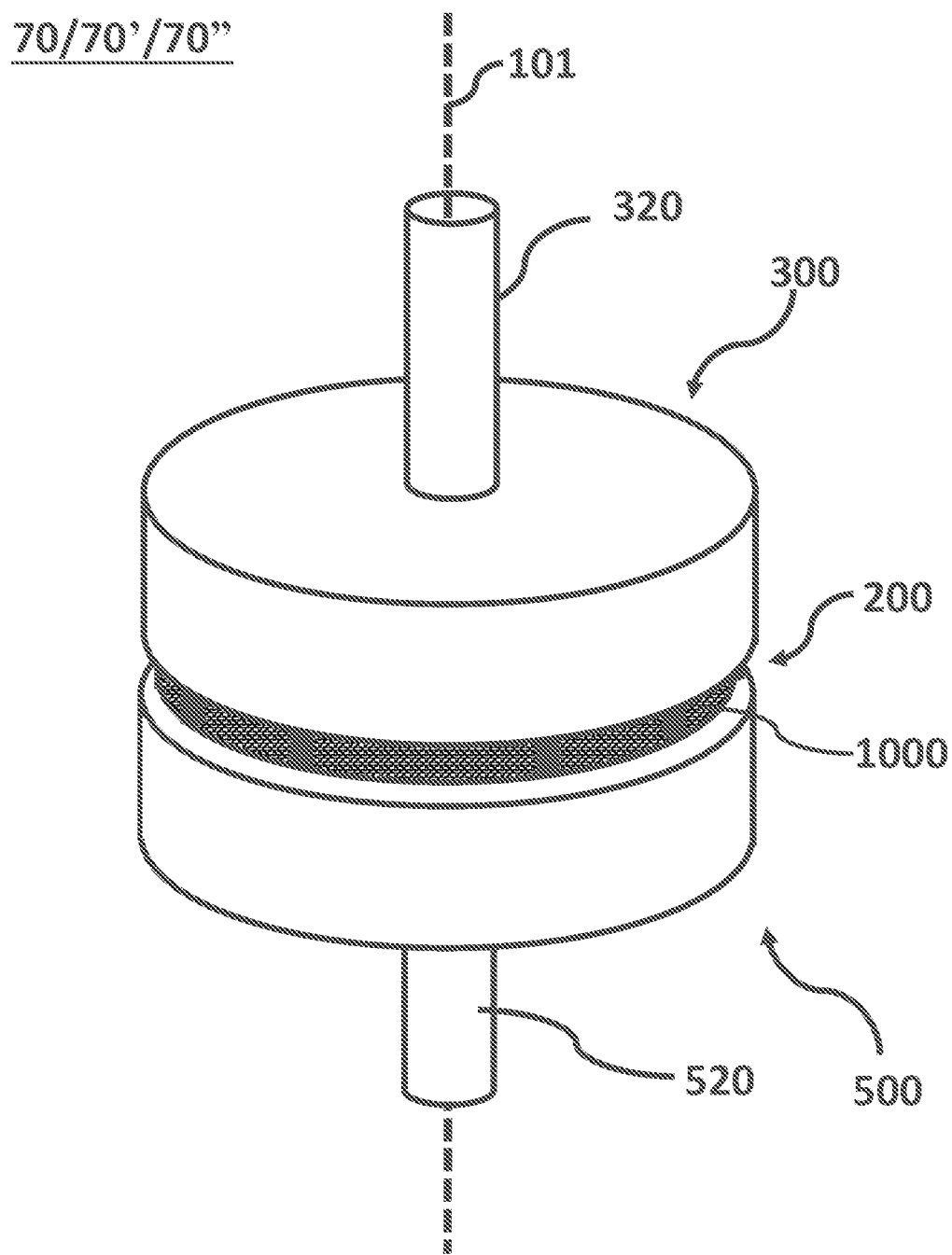
FIG. 7A is a stereoscopic assembly drawing of the DC dynamo 70, 70' and 70" of the embodiments 19, 20, and 21 according to this present invention.
Figure 7B:
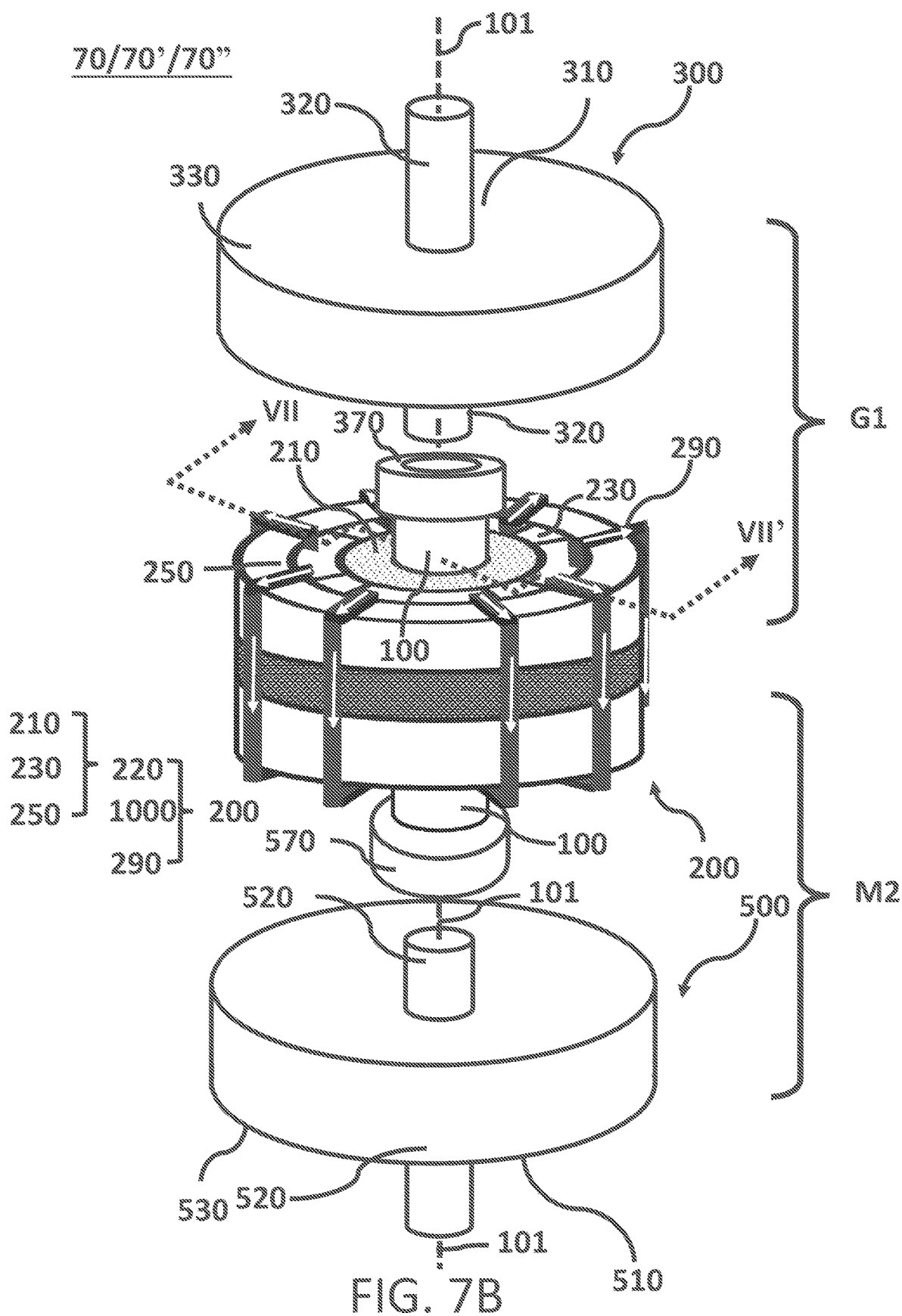
FIG. 7B is a stereoscopic exploded drawing of the DC dynamo 70, 70' and 70" as shown in FIG. 7A.

First, please refer to FIG. 7A illustrating a stereoscopic assembly drawing of the DC dynamo 70, 70' and 70" of the embodiments 19, 20 and 21 according to this present invention, and FIG. 7B illustrating a stereoscopic exploded drawing of the DC dynamo 70, 70' and 70" as shown in FIG. 7A.

As shown in FIG. 7A and FIG. 7B, the DC dynamos 70, 70' and 70" of embodiments 19, 20 and 21 acts as DC generator-DC motor complexes, and their structures are similar to the DC dynamos 60, 60' and 60" of the embodiments 16, 17 and 18, and the main difference therebetween is that almost all of the first magnetic lines of flux of the first magnetic field B1 substantially and orthogonally pass through the first air gap 260 from the first peripheral area 330 of the first magnetic mechanism 300 to the armature coils 290 in the first side (not labeled) of the armature apparatus 200, almost all of the second magnetic lines of flux of the second magnetic field B2 substantially and orthogonally pass through the second air gap 280 from the second peripheral area 530 of the second magnetic mechanism 500 to the armature coils 290 in the second side (not labeled) of the armature apparatus 200.

Figure 7C:
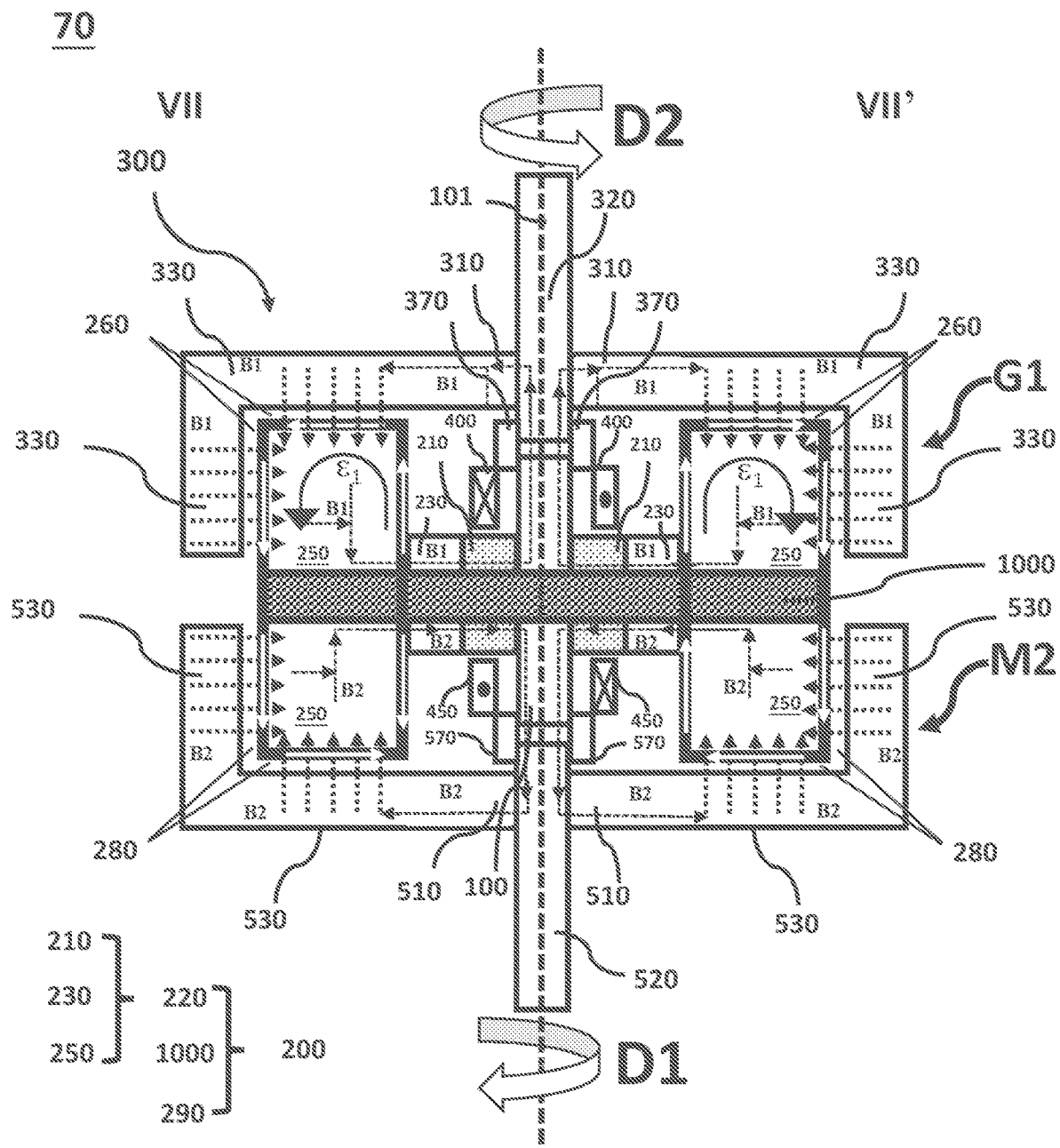
FIG. 7C is a cross-sectional view of the DC dynamo 70 of the embodiments 19 along with the sectional line VII-VII' as shown in FIG. 7B.
Figure 7C:
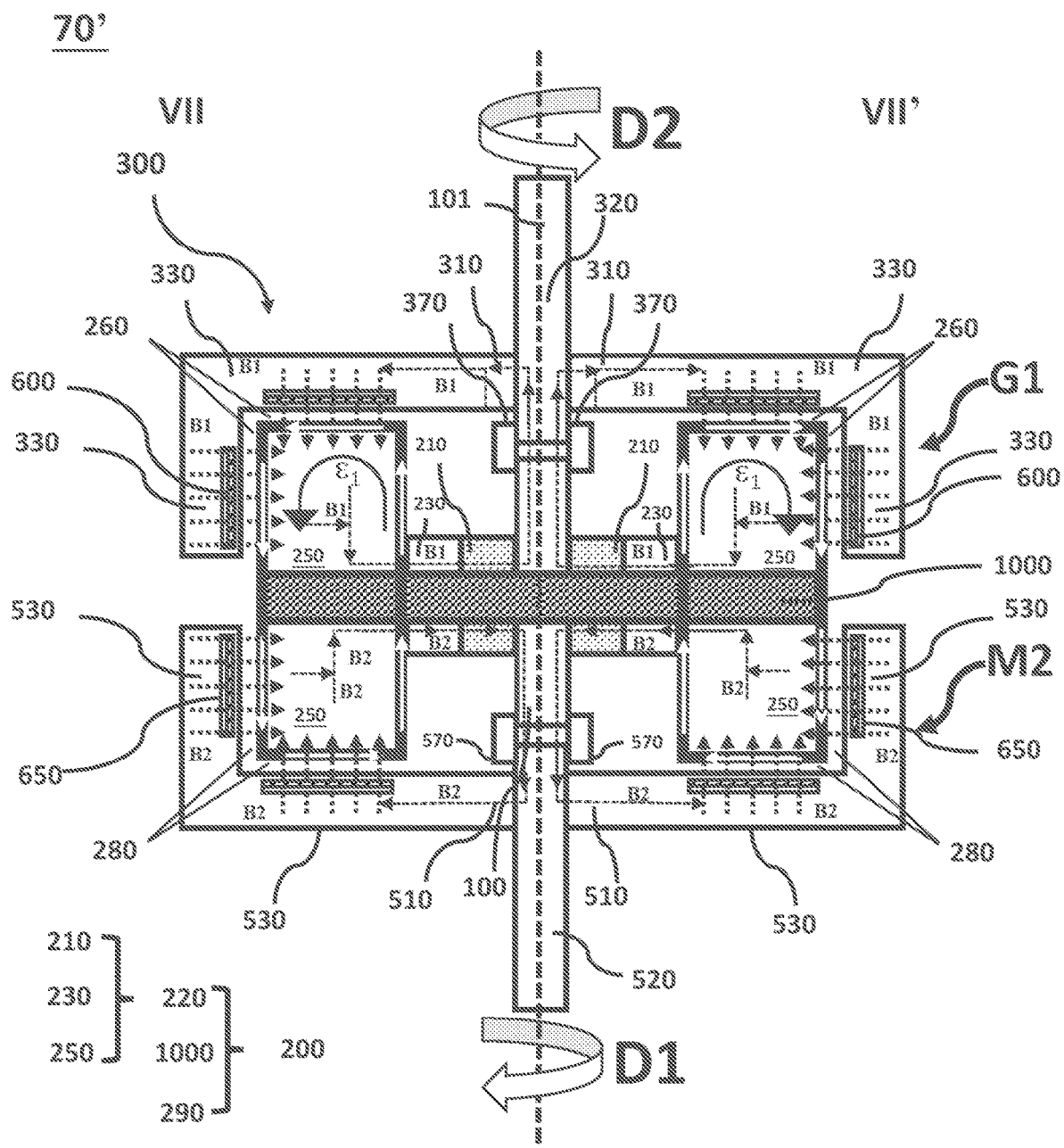

Next, please refer to FIG. 7C illustrating a cross-sectional view of the DC dynamo 70 of the embodiments 19 along with the sectional line VII-VII'. As shown in FIG. 7C, when observing from the longitudinal section of the virtual axis 101, the first magnetic mechanism 300 is driven to rotate relatively to the virtual axis 101 along with the second rotation direction D2, and one of the armature coils 290 in the first side (not labeled) adjacent to the first air gap 260 moves outward relatively to the right side of the longitudinal section of the virtual axis 101, then a counterclockwise induced electromotive force $\varepsilon_1$ can be induced by the armature coils 290 in the first side (not labeled) of the armature apparatus 200 in the right side of the longitudinal section of the virtual axis 101 based on the Fleming's left hand rule, and a clockwise induced electromotive force $\varepsilon_1$ can be induced by the armature coils 290 in the first side (not labeled) of the armature apparatus 200 in the left side of the longitudinal section of the virtual axis 101 based on the Fleming's left hand rule. Because the end-terminals of the pair of armature electrodes are shorted together, so the flowing direction of the current I in the armature coils 290 in the right side of the longitudinal section of the virtual axis 101 is counterclockwise, and the flowing direction of the current I in the armature coils 290 in the left side of the longitudinal section of the virtual axis 101 is clockwise, thereby a magnetic force injected inward to the armature coils 290 in the peripheral body 250 in the second side (not labeled) of the right side of the longitudinal section of the virtual axis 101 will be generated by the second magnetic field B2 and then the second magnetic mechanism 500 will respectively sense a reaction force injected outward to the right side of the longitudinal section of the virtual axis 101, and a magnetic force injected outward to the armature coils 290 in the peripheral body 250 in the second side (not labeled) of the left side of the longitudinal section of the virtual axis 101 will also be generated by the second magnetic field B2 and then the second magnetic mechanism 500 will respectively sense a reaction force injected inward to the left side of the longitudinal section of the virtual axis 101, thereby the second magnetic mechanism 500 can be driven to rotate relatively to the virtual axis 101 along with the first direction D1, and the second rotation axis 520 can also be driven to rotate along with the first direction D1. The DC dynamo 70 of embodiments 19 acts as a DC generator-DC motor complex, wherein the first magnetic mechanism 300, the first electromagnetic coil 400, and one of the armature coils 290 in the first side (not labeled) of the armature apparatus 200 of the DC dynamo 70 of Embodiment 19 can act as a first DC generator G1, and the second magnetic mechanism 500, the second electromagnetic coil 450, the second permanent magnet 650, and one of the armature coils 290 in the second side (not labeled) of the armature apparatus 200 of the DC dynamo 70 of Embodiment 19 can act as a second DC motor M2. The rotation directions of the first DC generation and the DC motor opposite to each other, and the ratio of the density of the first magnetic lines of flux of the first magnetic field B1 passing through the first air gap 260 to the density of the second magnetic lines of flux of the second magnetic field B2 passing through the second air gap 280 is r1, and the ratio of the rotation speed of the first DC generator G1 to the rotation speed of the second DC motor M2 is r2, r1 and r2 are in reverse tendency or in substantially inverse proportion, thereby the rotation speed of the first DC motor M1 can be changed by adjusting the ratio of r1. Therefore, the DC dynamo 70 can act as a variable transmission apparatus with opposite rotation directions, and the equivalent circuit diagrams thereof are illustrated as shown as FIG. 7D, FIG. 7D' and FIG. 7D".

Figure 7D:
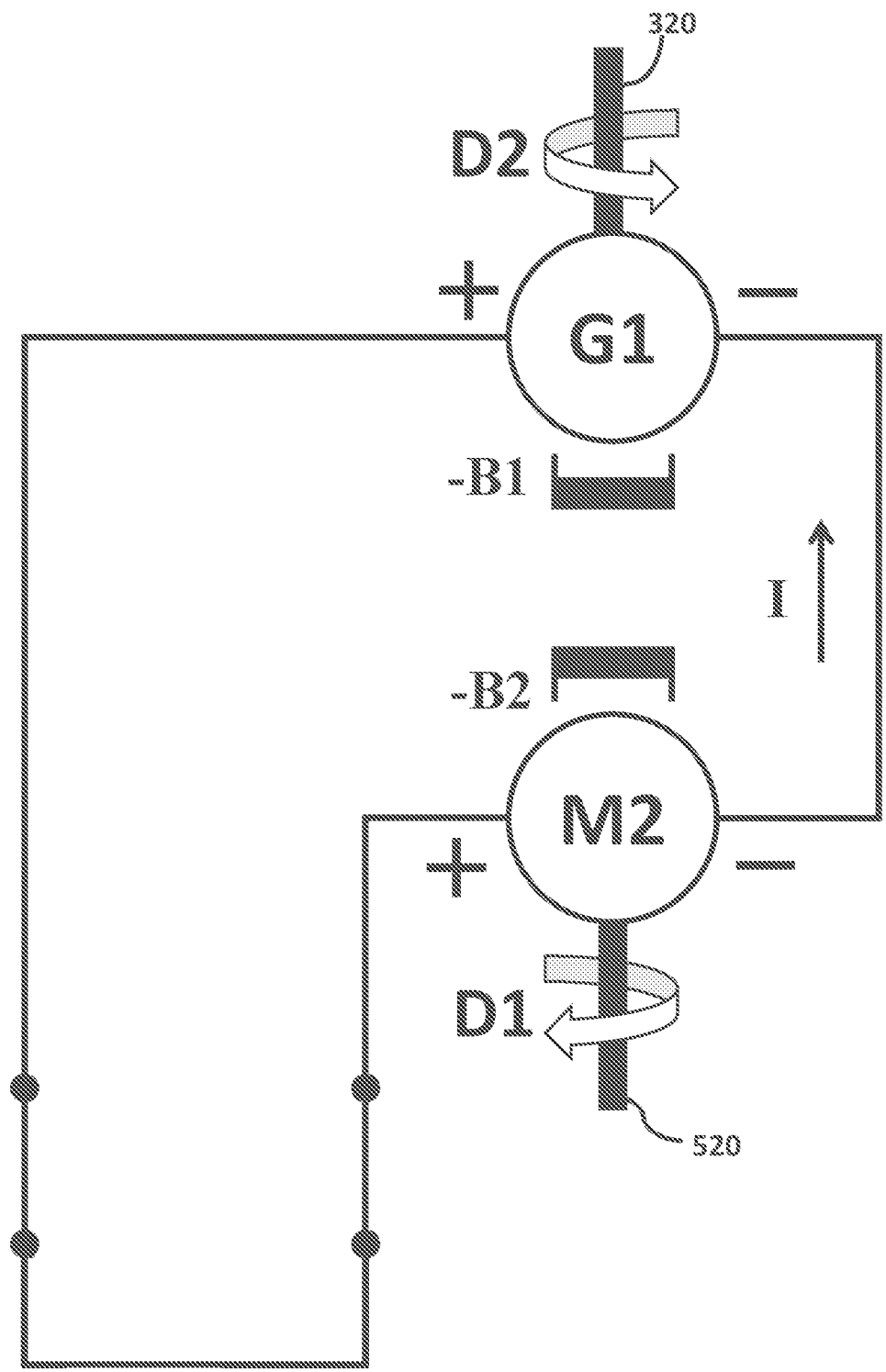
FIG. 7D is an equivalent circuit diagram of the DC dynamo 70, 70' and 70" of the embodiments 19, 20, and 21 according to this present invention.
Figure 7D:
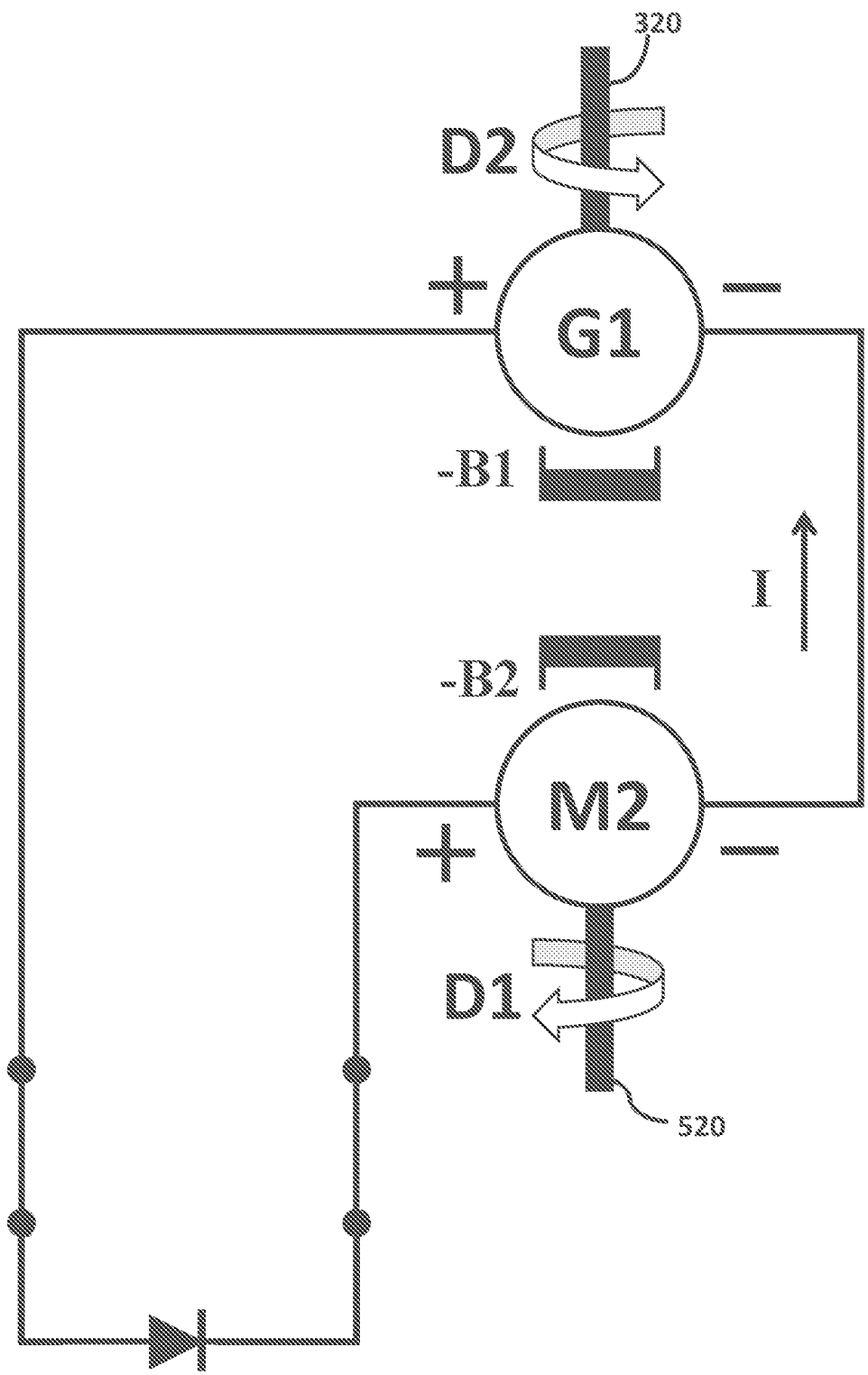

As the equivalent diagram shown in FIG. 7D, when the pair of armature electrodes with a substantially same polarity of electromotive force electrically interconnecting the armature coils 290 and end-terminals of the pair of armature electrodes are directly short together, the current within the armature coils 290 in the first side (not labeled) and the second side (not labeled) of the armature apparatus 200 is shared, and the first magnetic field B1 and the second magnetic field B2 do not interfere to each other because the first side (not labeled) and the second side (not labeled) of the armature apparatus 200 are spaced by a low magnetic material layer or a non-magnetic material layer 1000, and the first magnetic mechanism 300 and the second magnetic mechanism 500 are two independent individuals which can independently rotate relatively to the virtual axis 101 along with different directions and contribute to the first DC generator G1 comprising the first magnetic mechanism 300 and the armature coils 290 in the first side (not labeled) of the armature apparatus 200, and the second DC motor M2 comprising the second magnetic mechanism 500 and the armature coils 290 in the second side (not labeled) of the armature apparatus 200 to rotate along with different directions. Thereby, the DC dynamo 70 can act as a variable transmission apparatus with different rotation directions.

As the equivalent diagram shown in FIG. 7D', the pair of armature electrodes with a substantially same polarity of electromotive force electrically interconnecting the armature coils 290 and end-terminals of the pair of armature electrodes are directly short together and a diode is connected between the end-terminals of the pair of armature electrodes to achieve the purpose of one-way short. As mentioned above, when end-terminals of the pair of armature electrodes are directly short together, the current within the armature coils 290 in the first side (not labeled) and the second side (not labeled) of the armature apparatus 200 is shared, and the first magnetic mechanism 300 and the armature coils 290 in the first side (not labeled) of the armature apparatus 200 acts as a DC generator to drive the second DC motor M2 comprising the second magnetic mechanism 500 and the armature coils 290 in the second side (not labeled) of the armature apparatus 200 to rotate along with different directions. Moreover, the shared current within the armature coils 290 in the first side (not labeled) and the second side (not labeled) of the armature apparatus 200 can only flow in one-way owing to one-way short by the diode, thereby the second DC motor M2 can only be driven in one direction, so the DC dynamo 70 can act as a one-way variable transmission apparatus with different rotation directions.

As the equivalent diagram shown in FIG. 7D", when one of the armature electrodes (not labeled) with a substantially same polarity of electromotive force electrically interconnecting the armature coils 290 and an outer system (not shown) for example but not limited to a control module 1500 and a battery module 2000. The battery module 2000 provides a battery electromotive force and drive the second magnetic mechanism 500 of the second DC motor M2 to rotate together with the first DC generator G1 under the operation of the control module 1500, or the first DC generator G1 of the DC dynamo 50 drives the second DC motor M2 and charges the battery module 2000 under the operation of the control module 1500.

As mentioned above, the DC dynamo 70 of embodiment 19 acts as a DC-generator-DC motor complex, and the DC dynamo 70 acts as a continuous variable transmission in other embodiments The first central area 310 of the first magnetic mechanism 300 and the second central area 510 of the second magnetic mechanism 500 further comprise a first rotation axis 320 and a second rotation axis 520, wherein the first rotation axis 320 can be driven to rotate by the first DC generator G1 of the DC generator-DC motor complex, and the second rotation axis 520 can be driven to rotate by the second DC motor M2 of the DC generator-DC motor complex. The first rotation axis 320 can be regarded as a power input axis of the continuous variable transmission, and the second rotation axis 520 can be regarded as a power output axis of the continuous variable transmission. The rotation ratio of the first rotation axis 320 acted as the power input axis to the second rotation axis 520 acted as the power output axis and the rotation ratio of DC generator to the DC motor equals to r2, and the ratio of the density of the first magnetic lines of flux of the first magnetic field B1 passing through the first air gap to the density of the second magnetic lines of flux of the second magnetic field B2 passing through the second air gap is r1, wherein r1 and r2 are in reverse tendency or in substantially inverse proportion, thereby the rotation ratio of the first rotation axis as the power input axis to the second rotation axis as the power output axis and the rotation ratio of DC generator to the DC motor equaling to r2 can be changed by adjusting the ratio of r1 to achieve the purpose of continuously variable transmission.

Next, please refer to FIG. 7C' illustrating a cross-sectional view of the DC dynamo 70' of the embodiments 20 along with the sectional line VII-VII'. As shown in FIG. 76C', the DC dynamo 70' acts as a DC generator, and the structure of the DC dynamo 70' is similar to the DC dynamo 70 of the embodiment 19, and the main difference therebetween is the first permanent magnet 600 and the second permanent magnet 650 of the DC dynamo 70' are used to replace the first electromagnetic coil 400 and the second electromagnetic coil 450 of DC dynamo 70 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 7C', almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 70' of Embodiment 20 acts as a first DC generator G1, and the second magnetic mechanism 500, the second permanent magnet 650, and one of the armature coils 290 in the second side (not labeled) of the armature apparatus 200 of the DC dynamo 70' of Embodiment 20 acts as a second DC motor M2, wherein the rotation directions of the first DC generator G1 and the second DC motor M2 are different, and the rotation speeds of the first magnetic mechanism 300 and the second magnetic mechanism 500 can be changed by adjust the amplitude of the first magnetic field B1 and the amplitude of the second magnetic field B2, thereby the DC dynamo 60' of the embodiment 17 according to this invention can act as a variable transmission with opposite rotation directions. The equivalent circuit diagrams corresponding thereof are illustrated as that shown in FIG. 7D, 7D' and FIG. 7D".

The DC dynamo 70' of the embodiment 20 according to this invention can operate as the DC dynamo 70 of the embodiment 19, and repeated description is omitted.

Next, please refer to FIG. 7C" illustrating a cross-sectional view of the DC dynamo 70" of the embodiments 21 along with the sectional line VII-VII'. As shown in FIG. 7C", the structure of the DC dynamo 70" is similar to the DC dynamos 70 and 70', the main difference therebetween is the first electromagnetic coil 400, the second electromagnetic coil 450 of the DC dynamo 70 and the first permanent magnet 600, the second permanent magnet 650 of the DC dynamo 70' are used to generate the first magnetic field B1 and the second magnetic field B2. As shown in FIG. 7C", almost all of the first magnetic lines of flux of the first magnetic field B1 substantially and orthogonally pass through the first air gap 260 from the armature coils 290 to the first peripheral area 330 of the first magnetic mechanism 300, and almost all of the second magnetic lines of flux of the second magnetic field B2 substantially and orthogonally pass through the second air gap 280 from the armature coils 290 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 70" of Embodiment 21 acts as a first DC generator G1, and the second magnetic mechanism 500, the second permanent magnet 650, and one of the armature coils 290 in the second side (not labeled) of the armature apparatus 200 of the DC dynamo 70" of Embodiment 18 acts as a second DC motor M2, wherein the rotation directions of the first DC generator G1 and the second DC motor M2 are opposite, and the rotation speeds of the first magnetic mechanism 300 and the second magnetic mechanism 500 can be changed by adjust the amplitude of the first magnetic field B1 and the amplitude of the second magnetic field B2, thereby the DC dynamo 70' of the embodiment 18 according to this invention can act as a variable transmission with opposite rotation directions. The equivalent circuit diagrams corresponding thereof are illustrated as that shown in FIG. 7D, 7D' and FIG. 7D".

The DC dynamo 70" of the embodiment 21 according to this invention can operate as the DC dynamos 70 and 70' of the embodiments 19 and 20, and repeated description is omitted.

The armature apparatus 200 of the DC dynamo 70, 70' and 70" are stators, and the first magnetic mechanism 300 and the second magnetic mechanism 500 are rotators.

The first and the second central areas 310, 510 of the first and the second magnetic mechanisms 300, 500 of the DC dynamo 70, 70' and 70" of the embodiments 19, 20 and 21 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 70, 70' and 70" of the embodiments 19, 20 and 21 according to this invention rotate relatively to the armature apparatus 200 thereof.

The first and the second central areas 310, 510 of the first and the second magnetic mechanisms 300, 500 of the DC dynamo 70, 70' and 70" of the embodiments 19, 20 and 21 according to this invention can further comprise a plurality of balls placed between the first rotation axis 320 and the first bearing 370, and the second rotation axis 520 and the second bearing 570.

Embodiments 22, 23 and 24

Figure 8A:
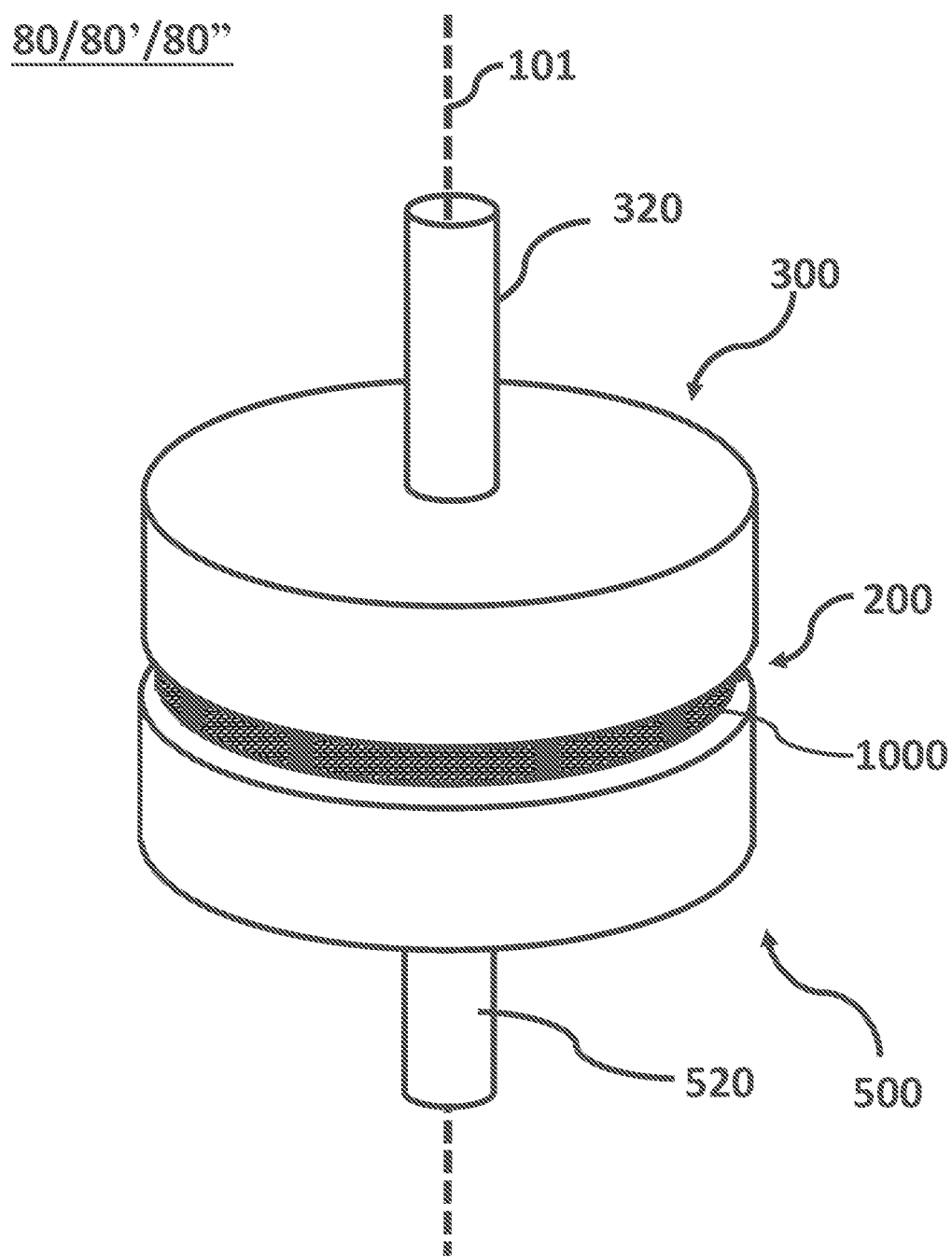
FIG. 8A is a stereoscopic assembly drawing of the DC dynamo 80, 80' and 80" of the embodiments 22, 23, and 24 according to this present invention.
Figure 8B:
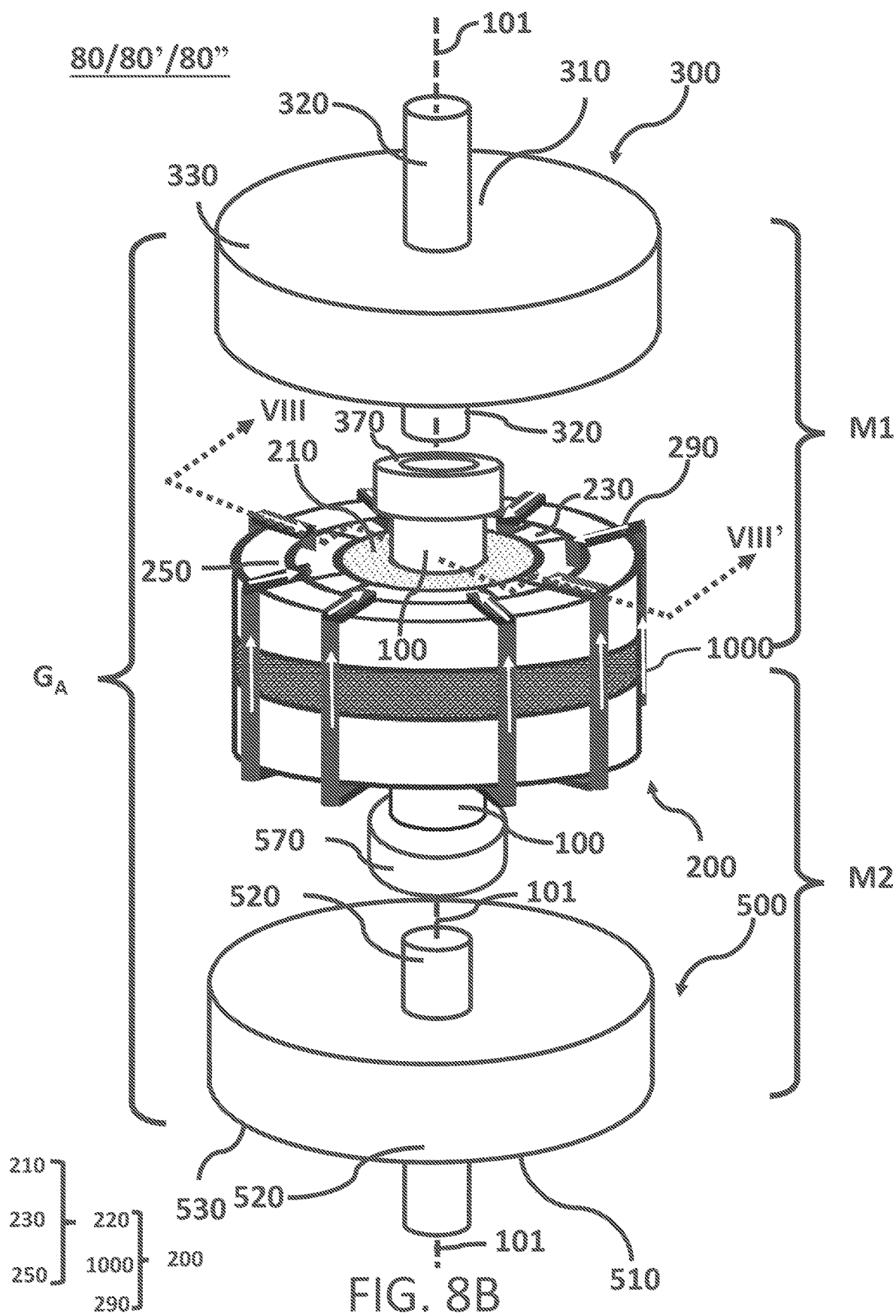
FIG. 8B is a stereoscopic exploded drawing of the DC dynamo 80, 80' and 80" as shown in FIG. 8A.

First, please refer to FIG. 8A illustrating a stereoscopic assembly drawing of the DC dynamo 80, 80' and 80" of the embodiments 22, 23 and 24 according to this present invention, and FIG. 8B illustrating a stereoscopic exploded drawing of the DC dynamo 80, 80' and 80" as shown in FIG. 8A.

As shown in FIG. 8A and FIG. 8B, the DC dynamos 80, 80' and 80" of embodiments 22, 23 and 24 acts as DC generator-DC motor complexes, and their structures are similar to the DC dynamos 50, 50' and 50" of embodiments 13, 14 and 15, wherein the pair of armature electrodes with a substantially same polarity of electromotive force electrically interconnecting the armature coils 290 thereof and end-terminals of the pair of armature electrodes are connected to each other for example but not limited to directly short together, but the main difference therebetween is that the armature apparatuses of the DC dynamos 80, 80' and 80" can be driven to generate an induced electromotive force $\varepsilon$, and the first magnetic mechanism and the second magnetic mechanism thereof can be driven by the induced electromotive force $\varepsilon$ to rotate in the same direction as that of the armature apparatus.

Figures 1, 8C:
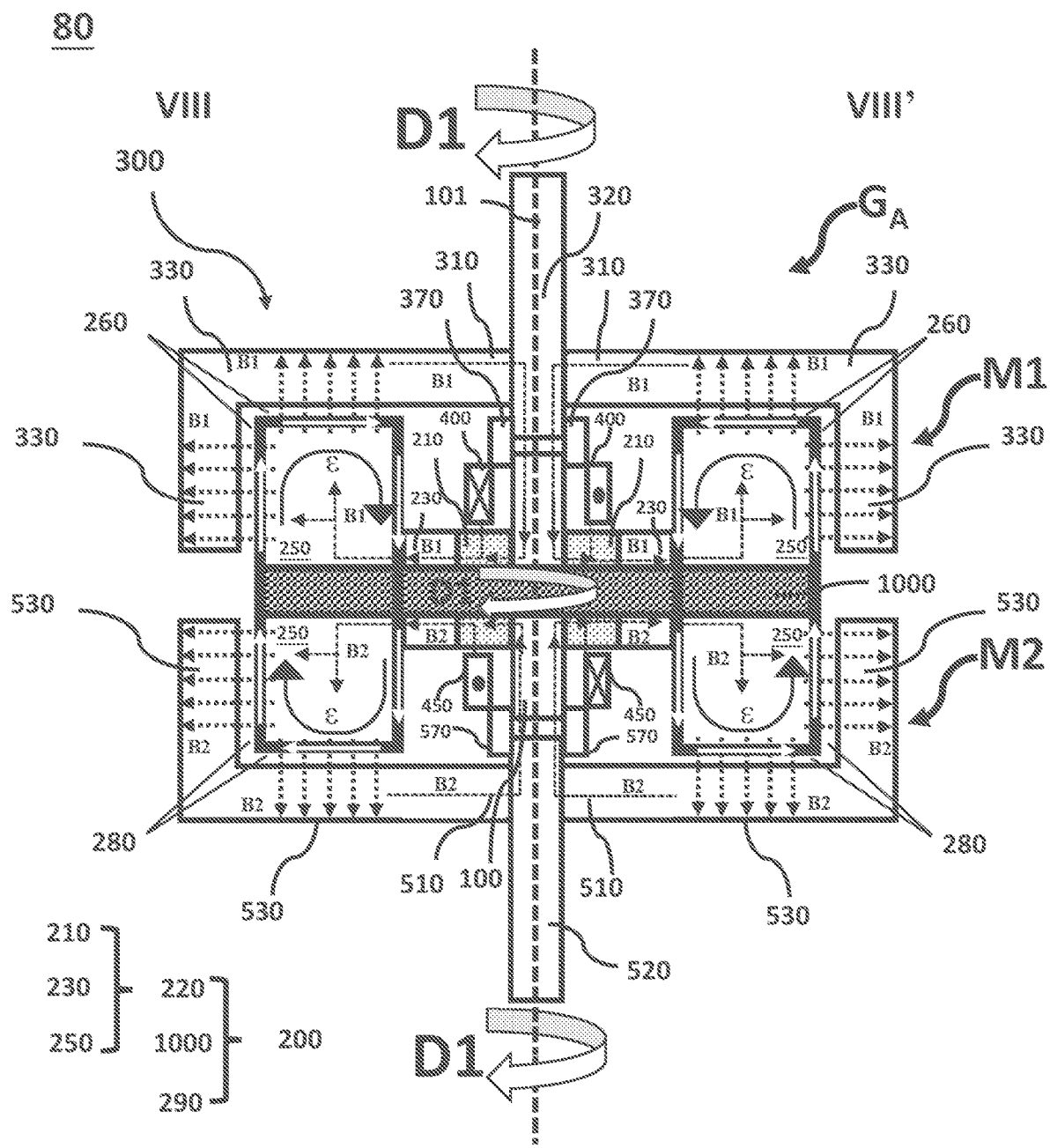
FIGS. 8C-1 and 8C-2 are cross-sectional views of the DC dynamo 80 of the embodiments 22 along with the sectional line VIII-VIII' as shown in FIG. 8B under different operation modes.
Figures 2, 8C:
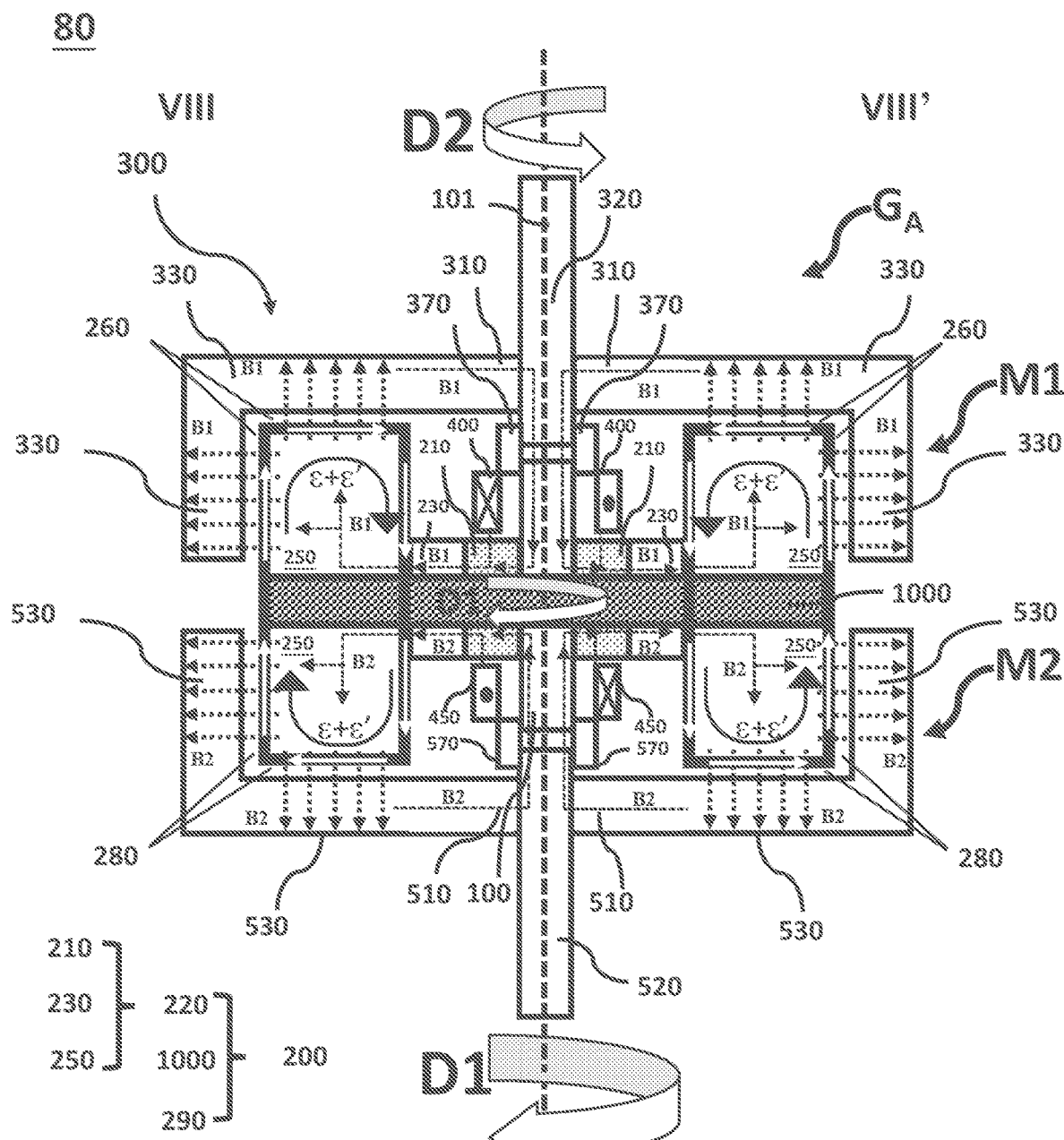
Figure 8C:
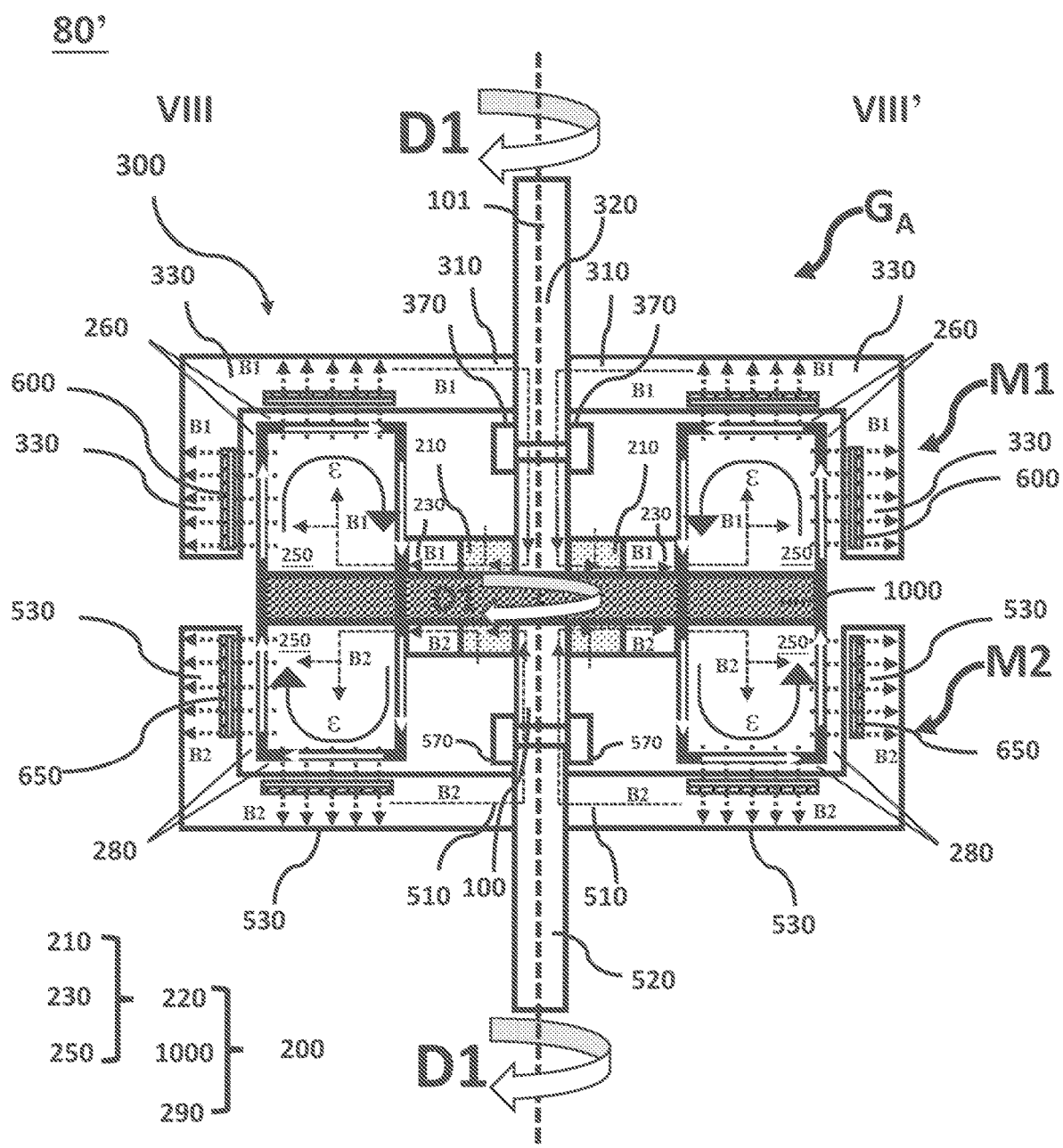

Next, please refer to FIG. 8C-1 illustrating a cross-sectional view of the DC dynamo 80 of the embodiments 22 along with the sectional line VIII-VIII'. As shown in FIG. 8C-1, the structure of the DC dynamo 80 is similar to the DC dynamo 50 of the embodiment 13, wherein the first magnetic lines of flux of the first magnetic field B1 flow between the first magnetic mechanism 300 and the first side (not labeled) of the armature apparatus 200 by the central axis 100, and almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500. As shown in FIG. 8C-1, when the armature apparatus 200 of the DC dynamo 80 is driven by for example but not limited to an outer system to rotate relatively to the virtual axis 101 along with the first rotation direction D1, a counterclockwise induced electromotive force $\varepsilon$ will be generated in the right side of the longitudinal section of the virtual axis 101 and a clockwise induced electromotive force $\varepsilon$ will be generated in the left side of the longitudinal section of the virtual axis 101, thereby the first magnetic mechanism 300 and the second magnetic mechanism 500 will be driven to rotate relatively to the virtual axis 101 along with the first rotation direction D1 by the induced electromotive force $\varepsilon$. The first magnetic mechanism 300, the first electromagnetic coil 400, and one of the armature coils 290 in the first side (not labeled) of the armature apparatus 200 of the DC dynamo 80 acts as a first DC motor M1; the second magnetic mechanism 500, the second electromagnetic coil 450, and one of the armature coils 290 in the second side (not labeled) of the armature apparatus 200 of the DC dynamo 80 acts as a second DC motor M2; the first magnetic mechanism 300, the electromagnetic coil 400, the armature apparatus 200, the second electromagnetic coil 450, and the second magnetic mechanism 500 acts as a DC armature generator $G_A$; and M1, M2 and $G_A$ are connected in series. The equivalent circuit diagrams corresponding thereof are illustrated as that shown in FIG. 8D and FIG. 8D'.

The first magnetic mechanism 300 or the second magnetic mechanism 500 will reversely rotate relative to the original first rotation direction D1 (i.e. rotate along with the second rotation direction D2) when sensing reverse braking force, and a counterclockwise induced electromotive force $\varepsilon$ will be generated in the right side of the longitudinal section of the virtual axis 101 and a clockwise induced electromotive force $\varepsilon'$ will be generated in the left side of the longitudinal section of the virtual axis 101, thereby the first magnetic mechanism 300 and the second magnetic mechanism 500 which do don't sense the reverse braking force will be driven to rotate relatively to the virtual axis 101 along with the first rotation direction D1 by the induced electromotive force $\varepsilon$ and $\varepsilon'$. Therefore, the DC dynamo 80 of embodiment 22 can act as a differential transmission for the automobile.

Figure 8D:
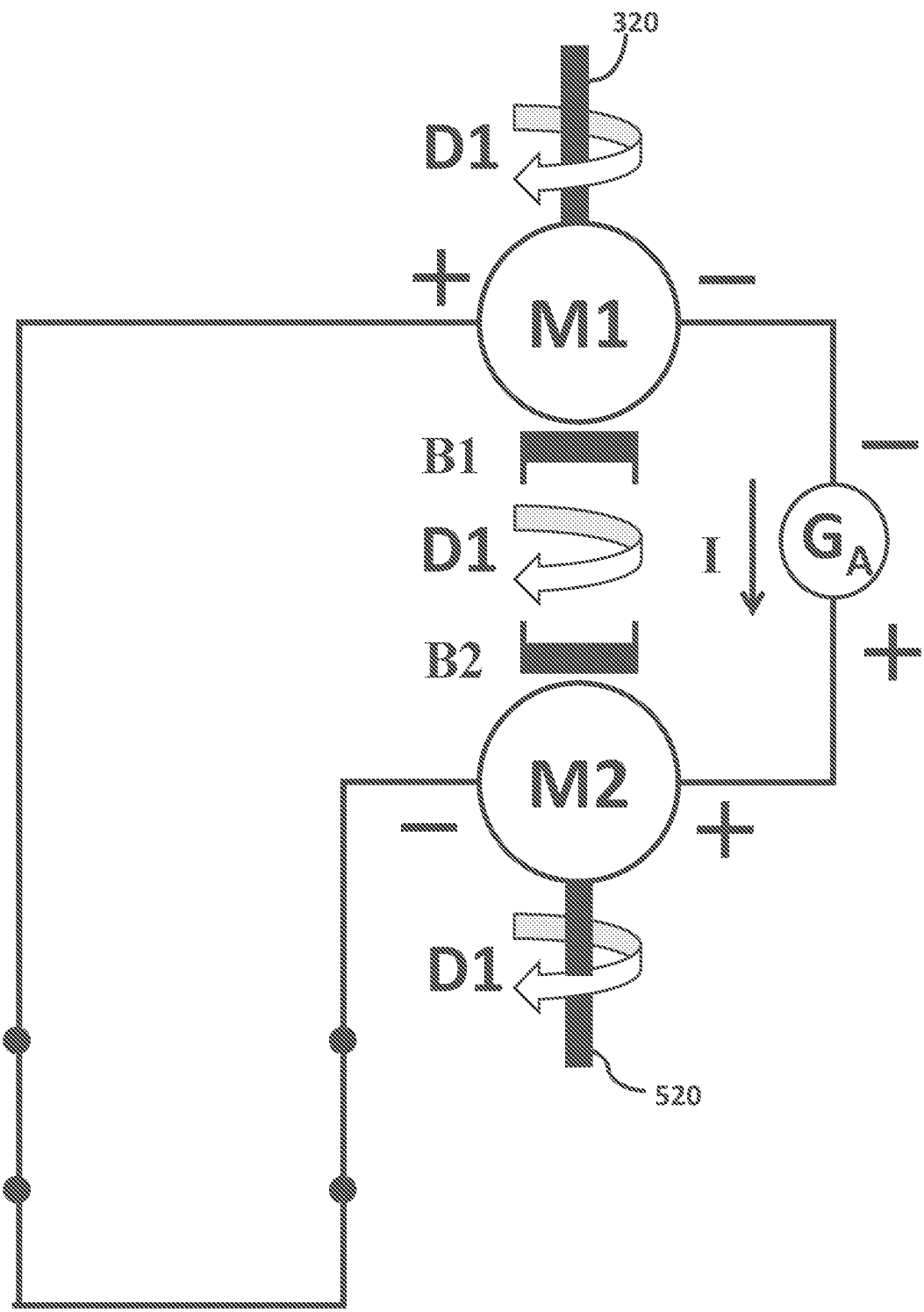
FIG. 8D is an equivalent circuit diagram of the DC dynamo 80, 80' and 80" of the embodiments 22, 23, and 24 according to this present invention.
Figure 8D:
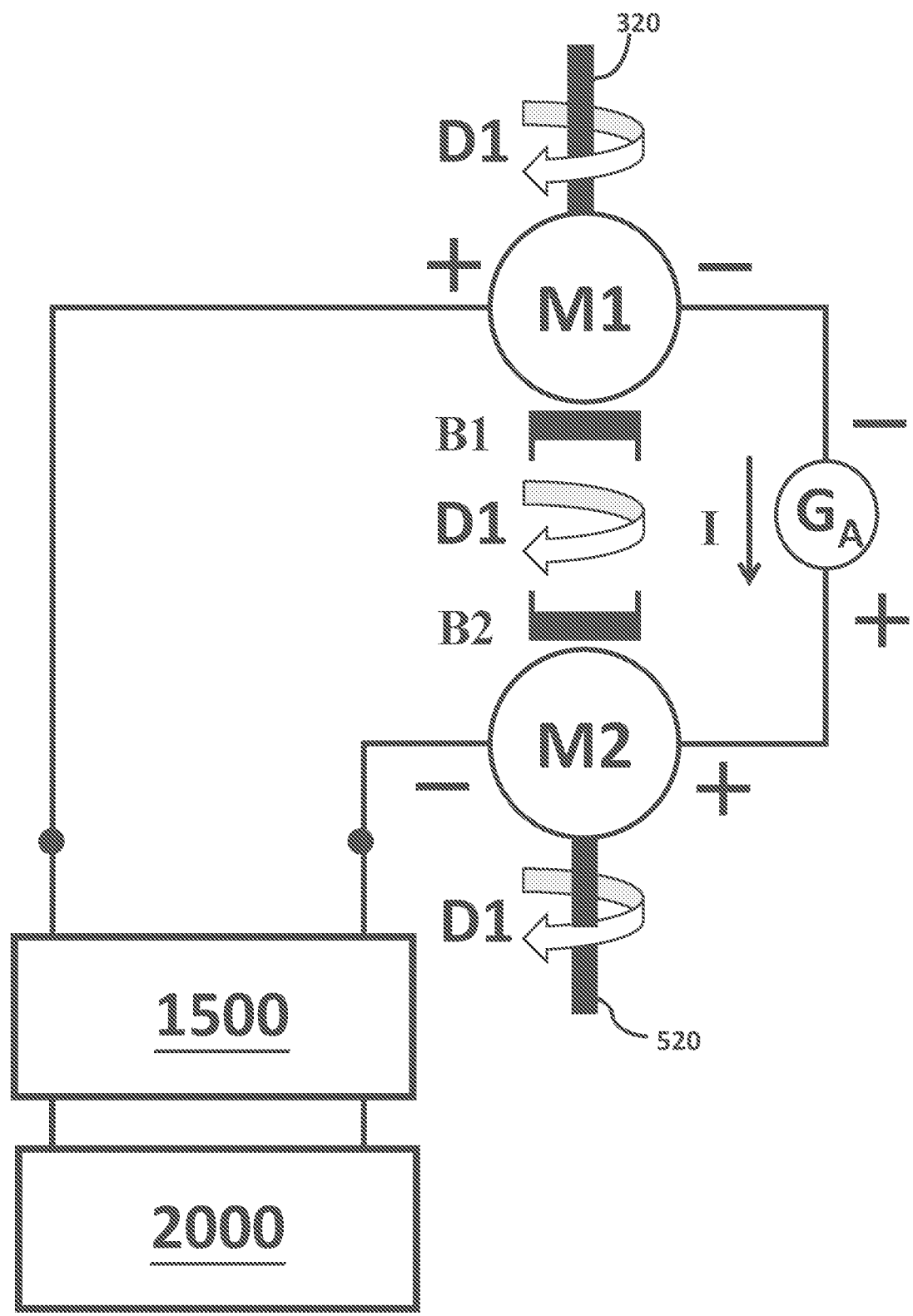

As the equivalent diagram shown in FIG. 8D', when one of the armature electrodes (not labeled) with a substantially same polarity of electromotive force electrically interconnecting the armature coils 290 and an outer system (not shown) for example but not limited to a control module 1500 and a battery module 2000. The battery module 2000 provides a battery electromotive force and assistant the armature apparatus 200 to be driven to generate an induced electromotive force $\varepsilon$, thereby the first magnetic mechanism 300 and the second magnetic mechanism 500 can be driven to rotate along with the same rotation direction as that of the armature apparatus 200, or the armature apparatus 200 can be driven to rotate and generate an induced electromotive force $\varepsilon$ to drive the first magnetic mechanism 300 and the second magnetic mechanism 500 to rotate along with the same rotation direction as that of the armature apparatus 200 and charge to the battery module 2000 under the operation of the control module 1500.

Next, please refer to FIG. 8C' illustrating a cross-sectional view of the DC dynamo 80' of the embodiments 23 along with the sectional line VIII-VIII'. As shown in FIG. 8C', the structure of the DC dynamo 80' is similar to the DC dynamo 80 of the embodiment 22, and the main difference therebetween is the first permanent magnet 600 and the second permanent magnet 650 of the DC dynamo 80' are used to replace the first electromagnetic coil 400 and the second electromagnetic coil 450 of DC dynamo 80 to generate the first magnetic field B1 and the second magnetic field B2. The first permanent magnet 600 is placed in the first peripheral area 330 corresponding to the armature coils 290 in the first side (not labeled) of the armature apparatus 200, for example but not limited to the first peripheral area 330 adjacent to the first air gap 260, thereby to generate a closed-loop first magnetic field B1 between the first magnetic mechanism 300 and the first side (not labeled) of the armature apparatus 200; the second permanent magnet 650 is placed in the second peripheral area 330 corresponding to the armature coils 290 in the second side (not labeled) of the armature apparatus 200, for example but not limited to the second peripheral area 330 adjacent to the second air gap 260, thereby to generate a closed-loop second magnetic field B1 between the second magnetic mechanism 500 and the second side (not labeled) of the armature apparatus 200. As shown in FIG. 8C', almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first permanent magnet 600, and one of the armature coils 290 in the first side (not labeled) of the armature apparatus 200 of the DC dynamo 80' of embodiment 23 acts as a first DC motor M1; the second magnetic mechanism 500, the second permanent magnet 650, and one of the armature coils 290 in the second side (not labeled) of the armature apparatus 200 of the DC dynamo 80' acts as a second DC motor M2; the first magnetic mechanism 300, the permanent magnet 600, the armature apparatus 200, the second permanent magnet 650, and the second magnetic mechanism 500 acts as a DC armature generator $G_A$; and M1, M2 and $G_A$ are connected in series. The equivalent circuit diagrams corresponding thereof are illustrated as that shown in FIG. 8D and FIG. 8D'.

The DC dynamo 80' of the embodiment 23 according to this invention is similar to the DC dynamo 80 of embodiment 22 according to this invention, they both can act as a DC-generator-DC motor complex, so repeated description is omitted.

Next, please refer to FIG. 8C" illustrating a cross-sectional view of the DC dynamo 80" of the embodiments 24 along with the sectional line VIII-VIII'. As shown in FIG. 8C", the structure of the DC dynamo 80" is similar to the DC dynamo 80 of the embodiment 22 and the DC dynamo 80' of the embodiment 23, and the main difference therebetween is that first electromagnetic coil 400 and the second electromagnetic coil 650 of the DC dynamo 80 of the embodiment 22 and the first permanent magnet 600 and the second permanent magnet 650 of the DC dynamo 80' of the embodiment 23 are used as the first magnetic field generator and the second magnetic field to generate the first magnetic field B1 and the second magnetic field B2. As shown in FIG. 8C", almost all of the first magnetic lines of flux of the first magnetic field B1 substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 substantially and orthogonally pass through the second air gap 280 from the armature coils 290 in the second side (not labeled) of the armature apparatus 200 to the second peripheral area 530 of the second magnetic mechanism 500.

The first magnetic mechanism 300, the first electromagnetic coil 400, the first permanent magnet 600, and one of the armature coils 290 in the first side (not labeled) of the armature apparatus 200 of the DC dynamo 80' of embodiment 23 acts as a first DC motor M1; the second magnetic mechanism 500, the second electromagnetic coil 450, the second permanent magnet 650, and one of the armature coils 290 in the second side (not labeled) of the armature apparatus 200 of the DC dynamo 80' acts as a second DC motor M2; the first magnetic mechanism 300, the first electromagnetic coil 400, the permanent magnet 600, the armature apparatus 200, the second electromagnetic coil 450, the second permanent magnet 650, and the second magnetic mechanism 500 acts as a DC armature generator $G_A$; and M1, M2 and $G_A$ are connected in series. The equivalent circuit diagrams corresponding thereof are illustrated as that shown in FIG. 8D and FIG. 8D'.

The DC dynamo 80" of the embodiment 24 according to this invention is similar to the DC dynamo 80 of embodiment 22 and the DC dynamo 80' of embodiment 23 according to this invention, they both can act as a DC-generator-DC motor complex, so repeated description is omitted.

As shown in FIGS. 8C, 8C' and 8C", almost all of the first magnetic lines of flux of the first magnetic field B1 of the DC dynamo 80, 80' and 80" substantially and orthogonally pass through the first air gap 260 from the armature coils 290 in the first side (not labeled) of the armature apparatus 200 to the first peripheral area 330 of the first magnetic mechanism 300, and almost all of the second magnetic lines of flux of the second magnetic field B2 of the DC dynamo 80, 80' and 80" substantially and orthogonally pass through the second air gap 280 from the armature coils 290 in the second side (not labeled) of the armature apparatus 200 to the second peripheral area 530 of the second magnetic mechanism 500. Alternatively, other embodiments according to this invention, almost all of the first magnetic lines of flux of the first magnetic field B1 of the DC dynamo 80, 80' and 80" substantially and orthogonally pass through the first air gap 260 from the first peripheral area 330 of the first magnetic mechanism 300 to the armature coils 290 in the first side (not labeled) of the armature apparatus 200, and almost all of the second magnetic lines of flux of the second magnetic field B2 of the DC dynamo 80, 80' and 80" substantially and orthogonally pass through the second air gap 280 from the second peripheral area 530 of the second magnetic mechanism 500 to the armature coils 290 in the second side (not labeled) of the armature apparatus 200.

The first and the second central areas 310, 510 of the first and the second magnetic mechanisms 300, 500 of the DC dynamo 80, 80' and 80" of the embodiments 22, 23 and 24 according to this invention can further comprise a first rotation axis 320 and a second rotation axis 520, and the central axis 100 adjacent to two terminals of the first magnetic mechanism 300 and the second magnetic mechanism 500 can further comprise a first bearing 370 for the first central axis 370 to pass through and a second bearing 570 for the second central axis 570 to pass through, which make the first magnetic mechanism 300 and the second magnetic mechanism 500 of the DC dynamo 80, 80' and 80" of the embodiments 22, 23 and 24 according to this invention rotate relatively to the armature apparatus 200 thereof.

The first and the second central areas 310, 510 of the first and the second magnetic mechanisms 300, 500 of the DC dynamo 80, 80' and 80" of the embodiments 22, 23 and 24 according to this invention can further comprise a plurality of balls placed between the first rotation axis 320 and the first bearing 370, and the second rotation axis 520 and the second bearing 570.

This preset invention has been described by way of example and in terms of the preferred embodiments, it is to be understood that the invention is not limited to the disclosed-loop embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC dynamo, comprising:
   a central axis;
   an armature apparatus with a first side and a second side opposite to each other and spaced by a low magnetic material layer or a non-magnetic material layer, comprising a body and a plurality of armature coils, and wherein the body includes a central body coupled to the central axis, a peripheral body surrounding the central body and a plurality of middle bodies for connecting the central body and the peripheral body, wherein the low magnetic material layer or the non-magnetic material layer is passed through by the armature coils, and the first side and the second side of the peripheral body are wound by part of the armature coils, and the number of the armature coils is equal or greater than 1;
   a first magnetic mechanism adjacent to the first side of the armature apparatus, comprising a first central area, a first peripheral area surrounding the first central area, wherein part or whole of the first peripheral area corresponds to the armature coils, and there is a first air gap between the first magnetic mechanism and the armature coils;
   a first magnetic field generator for generating a closed-loop first magnetic field between the first magnetic mechanism and the armature apparatus, wherein the first magnetic lines of flux are flowing between the first magnetic mechanism and the armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along with a virtual axis along with the same direction as that of the central axis;
   a second magnetic mechanism adjacent to the second side of the armature apparatus, comprising a second central area, a second peripheral area surrounding the second central area, wherein part or whole of the second peripheral area corresponds to the armature coils, and there is a second air gap between the second magnetic mechanism and the armature coils;
   a second magnetic field generator for generating a closed-loop second magnetic field between the second magnetic mechanism and the armature apparatus, wherein the second magnetic lines of flux are flowing between the second magnetic mechanism and the armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along with a virtual axis along with the same direction as that of the central axis; and
   a pair of armature electrodes with a substantially same polarity of electromotive force electrically interconnecting the armature coils and an outer system.

2. The DC dynamo as claimed in claim 1, wherein the first magnetic field generator is an electromagnetic coil and/or a first permanent magnet.

3. The DC dynamo as claimed in claim 2, wherein the first magnetic field generator is a first electromagnetic coil located between the first magnetic mechanism and the armature apparatus to generate a closed-loop first magnetic field, wherein almost all of the first magnetic lines of flux substantially and orthogonally pass through the first air gap from the armature coils to the first peripheral area of the first magnetic mechanism or substantially and orthogonally pass through the first air gap from the first peripheral area of the first magnetic mechanism to the armature coils.

4. The DC dynamo as claimed in claim 2, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

5. The DC dynamo as claimed in claim 2, wherein the second magnetic field generator is a second electromagnetic coil located between the second magnetic mechanism and the armature apparatus to generate a closed-loop second magnetic field, wherein almost all of the second magnetic lines of flux substantially and orthogonally pass through the second air gap from the armature coils to the second peripheral area of the second magnetic mechanism or substantially and orthogonally pass through the second air gap from the second peripheral area of the second magnetic mechanism to the armature coils.

6. The DC dynamo as claimed in claim 2, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

7. The DC dynamo as claimed in claim 1 is a DC motor.

8. The DC dynamo as claimed in claim 7, wherein the outer system is a power supply.

9. The DC dynamo as claimed in claim 7, wherein the outer system comprises a control module and a battery module electrically connected to the control module, and the first magnetic mechanism and the second magnetic mechanism are driven by operation of the control module.

10. The DC dynamo as claimed in claim 1 is a DC generator.

11. The DC dynamo as claimed in claim 10, wherein the outer system is a battery module.

12. The DC dynamo as claimed in claim 10, wherein the outer system comprises a control module and a battery module electrically connected to the control module, and the battery module is charged by operation of the control module.

13. A DC dynamo, comprising:
    a central axis;
    an armature apparatus with a first side and a second side opposite to each other and spaced by a low magnetic material layer or a non-magnetic material layer, comprising a body and a plurality of armature coils, and wherein the body includes a central body coupled to the central axis, a peripheral body surrounding the central body and a plurality of middle bodies for connecting the central body and the peripheral body, wherein the low magnetic material layer or the non-magnetic material layer is passed through by part of the armature coils, and the first side and the second side of the peripheral body are wound by part of the armature coils, and the number of the armature coils is equal or greater than 1;

a first magnetic mechanism adjacent to the first side of the armature apparatus, comprising a first central area, a first peripheral area surrounding the first central area, wherein part or whole of the first peripheral area corresponds to the armature coils, and there is a first air gap between the first magnetic mechanism and the armature coils;

a first magnetic field generator for generating a closed-loop first magnetic field between the first magnetic mechanism and the first armature apparatus, wherein the first magnetic lines of flux are flowing between the first magnetic mechanism and the first armature apparatus, and almost all of the first magnetic lines of flux substantially and orthogonally pass through the first air gap between each of the armature coils and the first magnetic mechanism in the same direction to drive the armature apparatus and the first magnetic field to respectively rotate along with a virtual axis along with the same direction as that of the central axis;

a second magnetic mechanism adjacent to the second side of the armature apparatus, comprising a second central area, a second peripheral area surrounding the second central area, wherein part or whole of the second peripheral area corresponds to the armature coils, and there is a second air gap between the second magnetic mechanism and the armature coils;

a second magnetic field generator for generating a closed-loop second magnetic field between the second magnetic mechanism and the armature apparatus, wherein the second magnetic lines of flux are flowing between the second magnetic mechanism and the armature apparatus, and almost all of the second magnetic lines of flux substantially and orthogonally pass through the second air gap between each of the armature coils and the second magnetic mechanism in the same direction to drive the armature apparatus and the second magnetic field to respectively rotate along with a virtual axis along with the same direction as that of the central axis; and a pair of armature electrodes with a substantially same polarity of electromotive force electrically interconnecting the armature coils and end-terminals of the pair of armature electrodes are connected to each other.

14. The DC dynamo as claimed in claim 13, wherein the first magnetic field generator is an electromagnetic coil and/or a first permanent magnet.

15. The DC dynamo as claimed in claim 14, wherein the first magnetic field generator is a first electromagnetic coil located between the first magnetic mechanism and the armature apparatus to generate a closed-loop first magnetic field, wherein almost all of the first magnetic lines of flux substantially and orthogonally pass through the first air gap from the armature coils to the first peripheral area of the first magnetic mechanism or substantially and orthogonally pass through the first air gap from the first peripheral area of the first magnetic mechanism to the armature coils.

16. The DC dynamo as claimed in claim 14, wherein the first magnetic field generator is a first permanent magnet located in the first peripheral area corresponding to the armature coils to generate a closed-loop first magnetic field, wherein almost all of the first magnetic lines of flux substantially and orthogonally pass through the first air gap from the armature coils to the first peripheral area or substantially and orthogonally pass through the first air gap from the first peripheral area to the armature coils.

17. The DC dynamo as claimed in claim 14, wherein the second magnetic field generator is a second electromagnetic coil located between the second magnetic mechanism and the armature apparatus to generate a closed-loop second magnetic field, wherein almost all of the second magnetic lines of flux substantially and orthogonally pass through the second air gap from the armature coils to the second peripheral area of the second magnetic mechanism or substantially and orthogonally pass through the second air gap from the second peripheral area of the second magnetic mechanism to the armature coils.

18. The DC dynamo as claimed in claim 14, wherein the second magnetic field generator is a second permanent magnet located in the second peripheral area corresponding to the armature coils to generate a closed-loop second magnetic field, wherein almost all of the second magnetic lines of flux substantially and orthogonally pass through the second air gap from the armature coils to the second peripheral area or substantially and orthogonally pass through the second air gap from the second peripheral area to the armature coils.

19. The DC dynamo as claimed in claim 13 is a DC generator-DC motor complex, and the first magnetic mechanism and the second magnetic mechanism are rotors, and the armature apparatus is a stator.

20. The DC dynamo as claimed in claim 19, wherein the pair of armature electrodes of the DC dynamo are directly shorted to connect to each other, wherein the DC generator comprises the first magnetic mechanism, the first magnetic field generator and the armature coils in the first side of the armature apparatus, and the DC motor comprises the second magnetic mechanism, the second magnetic field generator and the armature coils in the second side of the armature apparatus, and the ratio of the density of the first magnetic lines of flux passing through the first air gap to the density of the second magnetic lines of flux passing through the second air gap is r1, and the ratio of the rotation speed of the DC generator to the rotation speed of the DC motor is r2, r1 and r2 are in reverse tendency or in substantially inverse proportion, thereby the rotation speed of the DC motor can be changed by adjusting the ratio of r1.

21. The DC dynamo as claimed in claim 20, wherein the DC generator-DC motor complex acts as a continuously variable transmission, wherein the first central area of the first magnetic mechanism further comprises a first rotation axis, and the second central area of the second magnetic mechanism further comprises a second rotation axis, and the first rotation axis can be driven to rotate by the first magnetic mechanism of the DC generator, and the second rotation axis can be driven to rotate by the second magnetic mechanism of the DC generator, wherein the first rotation axis can act as the power input axis of the continuously variable transmission, and the second rotation axis can act as the power output axis of the continuously variable transmission, and the rotation ratio of the first rotation axis to the second rotation axis and the rotation ratio of DC generator to the DC motor equals to r2, and the ratio of the density of the first magnetic lines of flux passing through the first air gap to the density of the second magnetic lines of flux passing through the second air gap is r1, r1 and r2 are in reverse tendency or in substantially inverse proportion, thereby the rotation ratio of the first rotation axis to the second rotation axis and the rotation ratio of DC generator to the DC motor equaling to r2 can be changed by adjusting the ratio of r1 to achieve the purpose of continuously variable transmission.

22. The DC dynamo as claimed in claim 19, further comprising a diode connected between the end-terminals of the pair of armature electrodes to achieve the purpose of one-way short.

23. The DC dynamo as claimed in claim 19, further comprising an outer system connected between the end-terminals of the pair of armature electrodes, wherein the outer system comprises a control module and a battery module electrically connected to the control module.

24. The DC dynamo as claimed in claim 23, wherein the battery module provides a battery electromotive force to assist the DC generator of the DC dynamo to drive the second magnetic mechanism to rotate.

25. The DC dynamo as claimed in claim 23, wherein the battery module is charged by driving the second magnetic mechanism to rotate by the DC generator of the DC dynamo by operation of the control module.

26. The DC dynamo as claimed in claim 13 is a DC generator-DC motor complex, wherein the first magnetic field in the first side of the armature coils passing through the first air gap from the armature coils to the first peripheral area of the first magnetic mechanism and the second magnetic field in the second side of the armature coils passing through the second air gap from the armature coils to the second peripheral area of the magnetic mechanism, or the first magnetic field in the first side of the armature coils passing through the first air gap from the first peripheral area of the first magnetic mechanism to the armature coils and the second magnetic field in the second side of the armature coils passing through the second air gap from the second peripheral area of the second magnetic mechanism to the armature coils, thereby the armature apparatus can be driven to rotate and generate an induced electromotive force to drive the first magnetic mechanism and the second magnetic mechanism to rotate in the same direction as that of the armature apparatus.

27. The DC dynamo as claimed in claim 26, wherein the pair of armature electrodes of the DC dynamo are directly shorted to connect to each other, wherein the DC generator-DC motor complex comprises a DC generator and a DC motor, and the DC generator comprises the first magnetic mechanism, the first magnetic generator, the armature apparatus, the second magnetic generator and the second magnetic mechanism, and the DC motor comprises a first DC motor and a second DC motor, wherein the first DC motor comprises the first magnetic mechanism, the first magnetic generator and the armature coils in the first side of the armature apparatus, and the second DC motor comprises the second magnetic mechanism, the second magnetic generator and the armature coils in the second side of the armature apparatus.

28. The DC dynamo as claimed in claim 26, further comprising an outer system connected between the end-terminals of the pair of armature electrodes, wherein the outer system comprises a control module and a battery module electrically connected to the control module.

29. The DC dynamo as claimed in claim 28, wherein the battery module provides a battery electromotive force to assist the armature apparatus to rotate to generate an induced electromotive force to drive the first magnetic mechanism and the second magnetic mechanism to rotate in the same direction as that of the armature apparatus.

30. The DC dynamo as claimed in claim 28, wherein the induced electromotive force generated by the armature apparatus driven to rotate by the operation of the control module can simultaneously drive the first magnetic mechanism and the second magnetic mechanism to rotate in the same direction as that of the armature apparatus and charge to the battery module.

* * * * *